United States Patent [19]
Sano et al.

[11] Patent Number: 6,091,690
[45] Date of Patent: Jul. 18, 2000

[54] OPTICAL HEAD DEVICE AND OPTICAL INFORMATION PROCESSING APPARATUS

[75] Inventors: Kousei Sano, Neyagawa; Shin-ichi Kadowaki, Sanda, both of Japan

[73] Assignee: Matsushita Electric Industrial Co., Ltd., Osaka, Japan

[21] Appl. No.: 09/018,255

[22] Filed: Feb. 4, 1998

[30]   Foreign Application Priority Data

Feb. 6, 1997  [JP]  Japan ..................................... 9-023419
Mar. 10, 1997  [JP]  Japan ..................................... 9-054559

[51] Int. Cl.[7] ........................................................ G11B 7/09
[52] U.S. Cl. ......................... 369/112; 369/94; 369/44.35
[58] Field of Search ............................. 369/44.35, 44.27, 369/44.28, 44.29, 44.32, 44.23, 44.14, 44.12, 94, 93, 112, 103, 109

[56]   References Cited

U.S. PATENT DOCUMENTS 5,754,512  5/1998  Komma et al. ....................... 369/94 X
5,802,037  9/1998  Lee et al. .............................. 369/94 X
5,867,468  2/1999  Mori et al. ........................... 369/94 X

FOREIGN PATENT DOCUMENTS 9-161282  6/1997  Japan .

*Primary Examiner*—Muhammad Edun
*Attorney, Agent, or Firm*—Ratner & Prestia

[57]   ABSTRACT

An optical head apparatus comprises: a light source for emitting light; a front-end converging optical system for converging the light emitted from the light source onto a multi-layer information storage medium; a back-end converging optical system for reconverging the light reflected from a layer on the multi-layer information storage medium; wavefront converting means for accepting the reconverged light, and for forming an wavefront to enable detection of a focus error signal and/or a tracking error signal; and a photodetector for receiving the light from the wavefront converting means, and for outputting a signal proportional to the amount of the received light.

32 Claims, 35 Drawing Sheets

Fig. 3
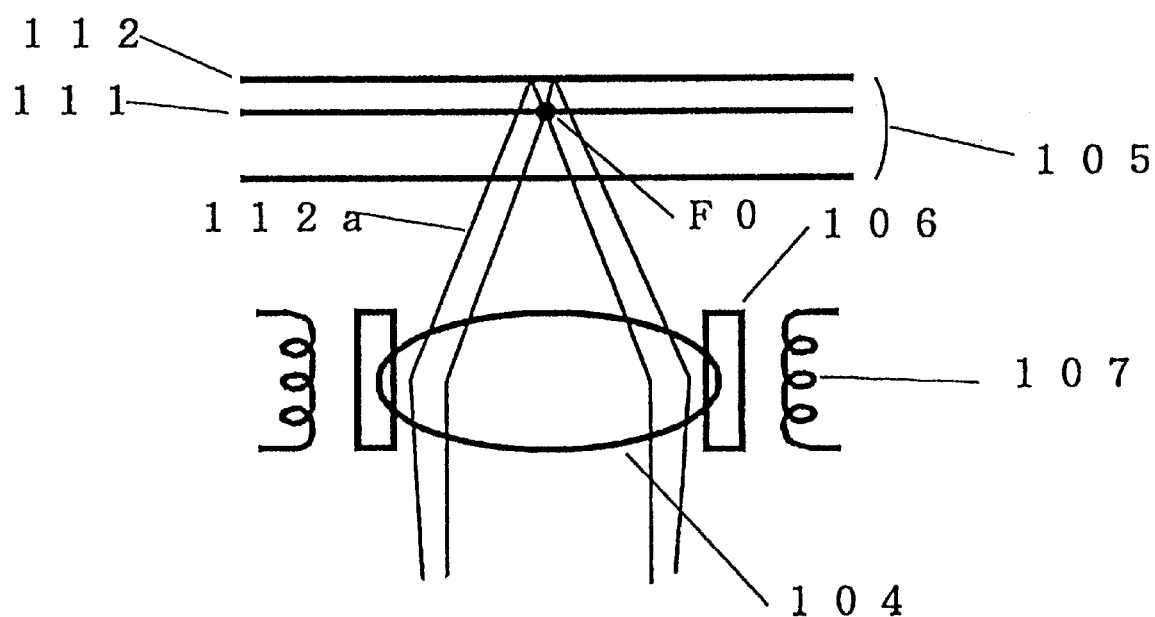
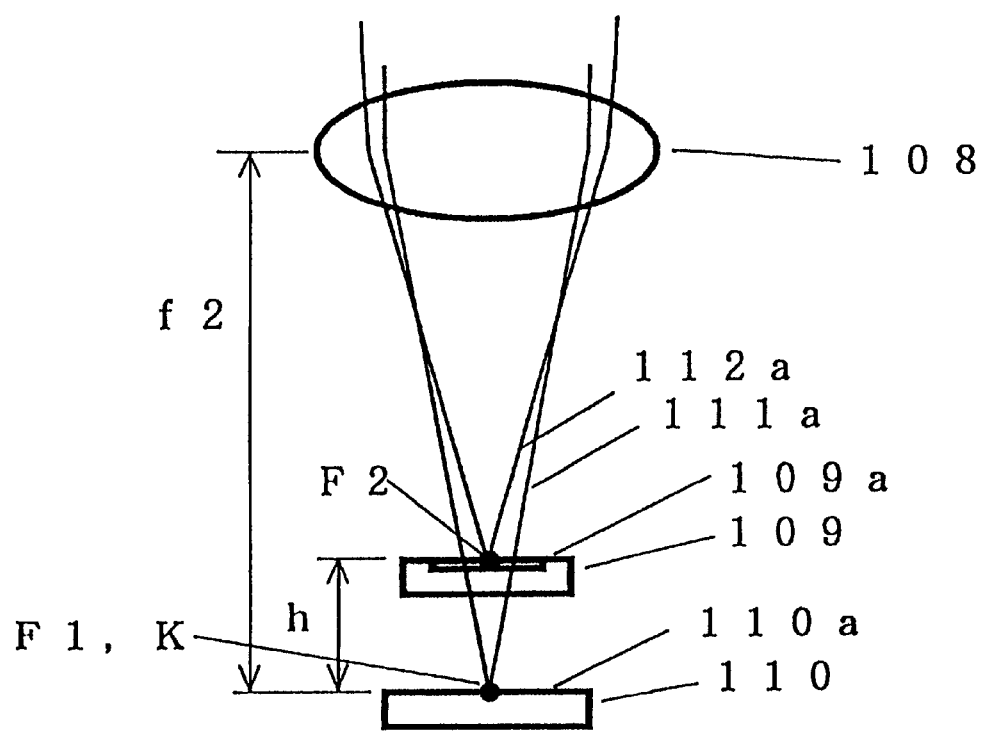

Fig. 7
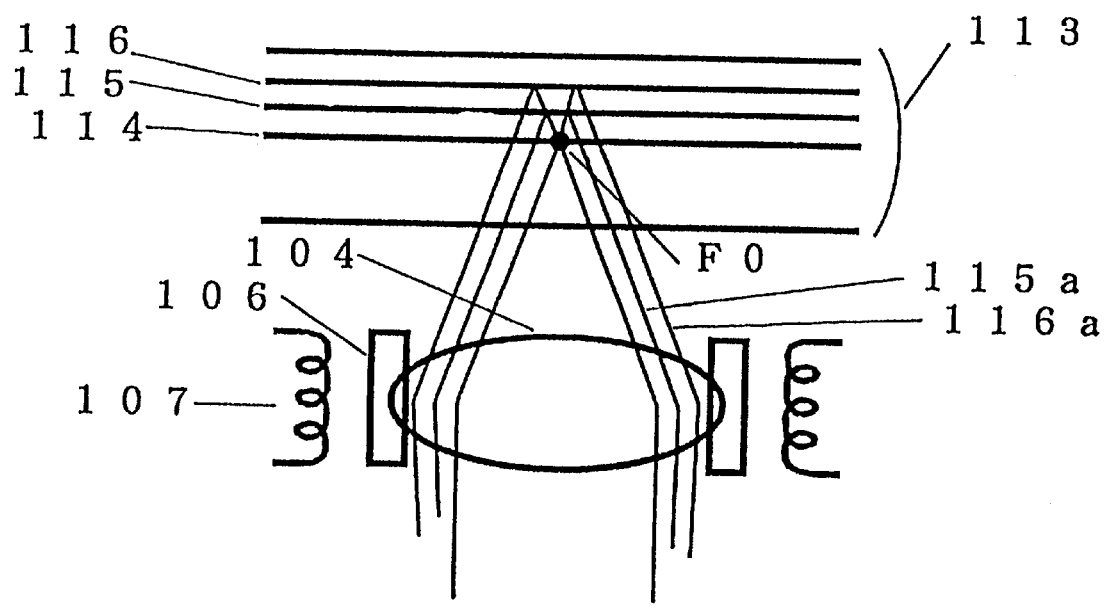
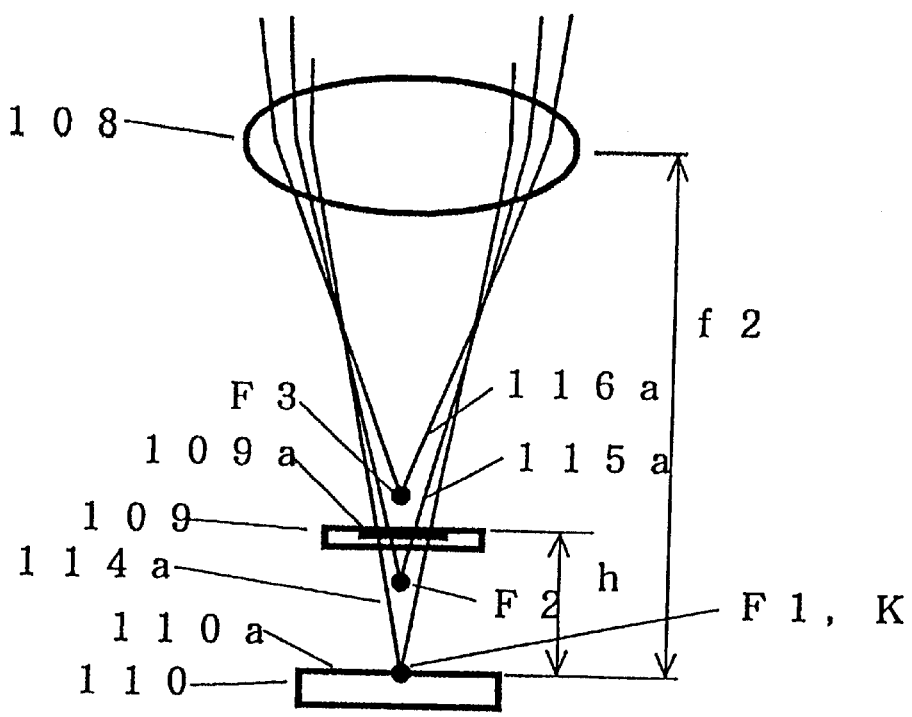

RELATIONSHIP BETWEEN SPOT AND SPLIT LINES
WITH NO DEVIATION
REAR FOCAL POINT  FRONT FOCAL POINT
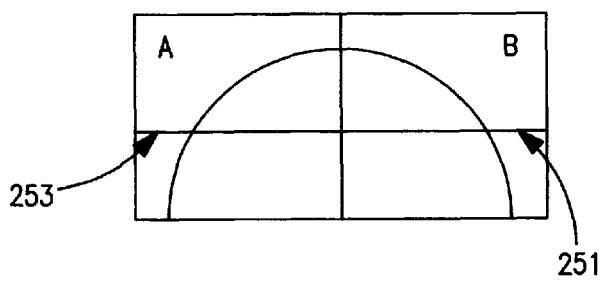
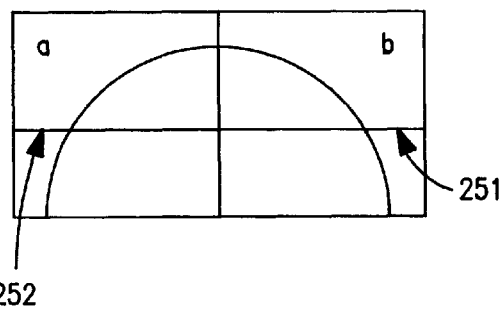
FIG. 30

OPTICAL HEAD DEVICE AND OPTICAL INFORMATION PROCESSING APPARATUS

BACKGROUND OF THE INVENTION

1. Field of the Invention

The present invention relates to an optical head apparatus and an optical information processing apparatus for recording/reproducing or erasing information on an information storage medium such as an optical disk or an optical card.

2. Description of the Related Art

Optical memory technology that uses optical disks or optical cards as high-density, large-capacity information storage media has been expanding its application from digital audio disks to video disks, document file disks, and further to data files, etc. In this optical memory technology, information is recorded and reproduced with high accuracy and reliability by using a light beam focused into a microscopic spot.

The construction and operation of an optical head apparatus that uses a holographic device as a wavefront converting means, and that employs a spot size method as a method of focus error signal detection and a phase difference method as a method of tracking error signal detection, will be described as a prior art example of the optical head apparatus. FIG. 32 shows a side view of the prior art optical head apparatus. Light emitted from a semiconductor laser 101 as a light source is converted by a collimator lens 102 into a parallel beam of light, which is then reflected by a beam splitter 103 and converged by an objective lens 104 onto an information layer 131 on an optical disk 130 which is a single-layer information storage medium. The focal point of the light converged by the objective lens 104 is designated by F0. An actuator 107 moves the objective lens 104 together with its holding means 106 in such a manner as to follow disk movements associated with the surface warping and eccentricity of the optical disk 130.

The light diffracted and reflected by the information layer 131 is again passed through the objective lens 104 and becomes a parallel beam of light. This parallel beam of light passes through the beam splitter 103 and is converged by a detection lens 108. The converged light enters a holographic device 109 acting as awavefront converting means which, to generate a focus error signal, produces diffracted rays of light having their focuses at points respectively displaced along the direction of the optical axis. These diffracted rays of light are received by a photodetector 110. When the focal point F0 of the objective lens 104 is kept at the information layer 131 on the optical disk 130, the diffracted light that focuses at a point nearer to the detection lens 108 than a detection surface 110a of the photodetector 110 is equal, in terms of the cross sectional area on the detection surface 110a, to the diffracted light that focuses at a point on the side of the detection surface 110a opposite from the detection lens 108.

FIG. 33 shows a zone splitting pattern of the holographic device 109, detection regions 201 to 207 of the photodetector 110, and the cross sectional shapes of the diffracted rays on the detection surface 110a. The holographic device 109 is split into a large number of rectangular zones. Reflected beam 131a is diffracted by the holographic device 109. Here, −1st order diffracted light 131b is used for the detection of the focus error signal and +1st order diffracted light 131c for the detection of the tracking error signal. Symbols attached to the respective zones correspond to the symbols attached to the cross sections of the diffracted rays of light on the photodetector 110 in FIG. 33. The −1st order diffracted light 131b generated from the zones with the uppercase characters A to D is brought to a focus rearwardly of the detection surface 110a of the photodetector 110, as viewed from the detection lens 108. On the other hand, the −1st order diffracted light 131b generated from the zones with the lowercase characters a to d is brought to a focus forwardly of the detection surface 110a of the photodetector 110, as viewed from the detection lens 108. The holographic device 109 is so designed that when the focal point F0 of the objective lens 104 is at the information layer 131 on the optical disk 130, the detection spot designated by each uppercase character on the detection surface 110a of the photodetector 110 is equal in size to the detection spot designated by each lowercase character. Signals obtained according to the amounts of light received at the detection regions 201 to 203 are denoted by P1 to P3, respectively. The focus error signal FE is then obtained by calculating the following equation (equation 1).

$$FE = P1 + P3 - P2 \qquad \text{(equation 1)}$$

The +1st order diffracted light 131c is detected at the detection regions 204 to 207. Signals obtained according to the amounts of light received at the detection regions 204 to 207 of the photodetector 110 are denoted by t1 to t4, respectively. The tracking error signal TE according to the phase difference method is then obtained by comparing the phase of (t1+t3) with the phase of (t2+t4).

An RF signal for reproducing information is obtained by RFf or RFt in the following equation or by the sum of the two.

$$RFf = P1 + P2 + P3$$

$$RFt = t1 + t2 + t3 + t4$$

As the storage capacity of information storage media increases, there have been proposed multi-layer information storage media having on one side thereof multiple information layers capable of recording or reproducing information. One example of such media is the dual-layer DVD disk, in which two information layers are formed close to each other, and the reflectivity of the information layer nearer to the readout surface of the medium is reduced to transmit light while keeping the reflectivity of the information layer farther from the readout surface substantially at 100% as in the previous media, thereby making reproduction from one side possible.

The optical head apparatus that uses a holographic device to obtain focus and/or tracking error signals on a single-layer storage medium, as described above as the prior art example, has been implemented independently of multi-layer information storage media, and an optical head apparatus that uses a holographic device to obtain focus and/or tracking error signals on a multi-layer storage medium has not been implemented yet.

Further, the prior art optical head apparatus has the problem that when recording or reproducing information on a multi-layer storage medium capable of recording/ reproduction from one side thereof, focus control becomes unstable by being affected by light reflected from an information layer other than the target information layer.

Next, a description will be given of a prior art circuit for obtaining the tracking error signal, which is different from the prior art example described above. FIG. 34 shows a circuit diagram of the prior art example that uses the phase difference method to obtain the tracking error signal. An adder 401 takes as inputs the signals t1 and t3 obtained according to the amounts of light received at the detection regions 204 and 206, and outputs a signal representing their sum. Similarly, an adder 402 accepts at its inputs the signals t2 and t4 obtained according to the amounts of light received at the detection regions 205 and 207, and outputs a signal representing their sum.

A phase difference signal generating circuit 308 accepts at its inputs the output signals from the adders 401 and 402, detects the temporal phase difference between these signals, and outputs a tracking error signal TE0. On the other hand, an adder 403 accepts at its inputs the output signals from the adders 401 and 402, and outputs a signal representing their sum. The output signal of the adder 403 is derived as the RF signal RFt for reproducing information.

A defect detection circuit 310 accepts at its input the output signal from the adder 403, and outputs a defect detection signal DED. The defect detection signal DED is output when there occurs a decrease in the input RF signal in a frequency band lower than the frequency band of the signal recorded on the optical disk 130 because of contamination, etc. of the surface of the optical disk 130.

A sample-and-hold circuit 311 takes the tracking error signal TE0 output from the phase difference signal generating circuit 308 and, when the defect detection signal DED indicates a defect detected state, outputs the tracking error signal TE0 held therein that was taken immediately before entering the defect detected state; on the other hand, when the signal DED indicates a no-defect detected state, the input signal is directly output.

The prior art circuit for obtaining the tracking error signal for the optical head apparatus by the phase difference method, however, has had the problem that the sensitivity of the tracking error signal due to the beam's deviation from a split line on the holographic device, when the beam is accurately focused on the track, rapidly degrades.

Also, the prior art optical head apparatus has had the problem that tracking control becomes unstable if the defect detection that is necessary when obtaining the tracking error signal is to be achieved by using the total amount of light output from the holographic device.

In addition to the above-described problems associated with the two prior art examples, there is also the problem that an offset is created in the focus error signal when the objective lens moves to follow the movement of the track that is caused by disk eccentricity, or when the spot on the disk moves across the track.

Next, a prior art optical information processing apparatus that uses the above-described optical head apparatus will be described for reference purposes. FIG. 35 shows the construction of an optical disk drive as the optical information processing apparatus. The optical disk 130 is rotated by a motor 501. The optical head apparatus 502 is moved between the inner and outer circumferential portions of the optical disk 130 by means of a head transport device 503. The optical head apparatus 502 shines a beam of light onto the optical disk 130, receives the reflected light, and outputs a signal proportional to it. A control circuit 504 receives the signal output from the optical head apparatus 502, and outputs a servo control signal to the optical head apparatus 502. A data generation circuit 505 receives the signal from the optical head apparatus 502, and reproduces the information recorded on the optical disk 130. If the optical disk drive has a recording facility, a signal to be recorded on the optical disk is generated from information input to the data conversion circuit and the signal is supplied to the optical head disk 502.

SUMMARY OF THE INVENTION

The present invention is aimed at accomplishing the following objects (1) to (4).

(1) To provide an optical head apparatus and an optical information processing apparatus capable of obtaining stable focus and/or tracking error signals on a multi-layer information storage medium by using a holographic device or the like and by suppressing the effects of light reflected from an information layer other than the target information layer.

(2) To provide an optical head apparatus capable of obtaining a stable focus error signal, and an optical information processing apparatus capable of achieving stable focus control, even if the objective lens moves to follow track eccentricity or if the spot on the disk moves across the track, when obtaining the focus error signal by using a holographic device or the like.

(3) To provide an optical head apparatus capable of obtaining a stable tracking error signal, and an optical information processing apparatus capable of achieving stable tracking control, by suppressing the degradation of the tracking error signal if the beam split position is displaced when obtaining the tracking error signal by the phase difference method by using a holographic device or the like.

(4) To provide an optical head apparatus capable of obtaining a stable tracking error signal, and an optical information processing apparatus capable of achieving stable tracking control, by suppressing the degradation of the tracking error signal if the beam split position is displaced when obtaining the tracking error signal by the phase difference method.

To accomplish the above objects, the optical head apparatus and the optical information processing apparatus according to the present invention are characterized by any one of the constructions (1) to (8) described below.

(1) The construction comprises: a light source for emitting light; a front-end converging optical system for converging the light emitted from the light source onto a multi-layer information storage medium; a back-end converging optical system for reconverging the light reflected from a layer on the multi-layer information storage medium; a wavefront converting means for accepting the reconverged light, and for forming an wavefront to enable detection of a focus error signal and/or a tracking error signal; and a photodetector for receiving the light from the wavefront converting means, and for outputting a signal proportional to the amount of the received light.

(2) The construction is characterized in that light reflected from an information layer other than a desired layer on the multi-layer information storage medium is not brought to a focus on the wavefront converting means.

(3) The construction is characterized in that the wavefront converting means is constructed from a holographic device, and in that when the light emitted from the light source is focused by the front-end converging optical system onto the desired information layer on the multi-layer information storage medium, the size of a light beam reflected from an information layer other than the desired information layer, and projected on the holographic device by being reconverged by the back-end converging optical system, is larger than the grating interval of the holographic device.

(4) In a construction comprising a light source, a magnification converting means, a beam splitting means, and a photodetector, the construction is characterized in that when an optical path leading from the light source to an information storage medium is designated as an optical axis, the information storage medium has two information layers one separated from the other in the direction of the optical axis, and in that when light emitted from the light source is focused on a desired layer of the information layers, a split line running in the direction along which light reflected from the information layer other than the desired layer is converged in the form of a focal line does not align parallel to the focal line.

(5) In a construction comprising a light source, a converging optical system, and a photodetector, wherein a tracking error signal is obtained by a phase difference method, the construction is characterized in that the tracking error signal according to the phase difference method is generated by obtaining signals only from regions where the amount of light is smaller in a tangential direction or where the cross sectional area is smaller.

(6) The construction is characterized in that a defect detection signal is generated only from the signals that are used for the generation of the tracking error signal.

(7) In a construction comprising a light source, a converging optical system, a wavefront converting means for accepting light reflected from an information storage medium having a track, and for forming a wavefront to enable detection of a focus error signal, and a photodetector, the construction is characterized in that when projected on the photodetector, the cross sectional shape of a light beam having a wavefront converted by the wavefront converting means is converged in a direction substantially perpendicular to the track.

(8) In a construction comprising a light source, a converging optical system, a wavefront converting means for accepting light reflected from an information storage medium having a track, and for forming a wavefront to enable detection of a focus error signal, and a photodetector, the construction is characterized in that the wavefront converting means generates a first wavefront that converges forwardly of the photodetector and a second wavefront that converges rearwardly thereof, and in that light beams having the wavefronts generated from a first region of the wavefront converting means for generating the first wavefront and an adjacent second region thereof for generating the second wavefront, respectively, are symmetric to each other with respect to a straight line substantially perpendicular to the track.

With the above construction, the present invention offers the useful advantages that the optical head apparatus of the present invention can provide an optical head apparatus that outputs stable focus and/or tracking error signals, and that the optical information processing apparatus can accomplish stable focus and/or tracking control, achieving information recording/reproduction with low error rates.

BRIEF DESCRIPTION OF THE DRAWINGS

FIG. 3 is a side view showing the optical system near an objective lens and photodetector when recording/reproduction is performed on a dual-layer disk by an optical head apparatus according to a prior art example and according to a sixth embodiment of the present invention.

FIG. 7 is a side view showing an optical system when recording/reproduction is performed on a three-layer disk by an optical head apparatus according to a third embodiment of the present invention.

FIG. 30 is a diagram showing the positions of split lines of the photodetector on the holographic device from the relationship between the split lines and a spot on the photodetector when there is no deviation in the optical head apparatus according to the 11th embodiment of the present invention.

DESCRIPTION OF THE PREFERRED EMBODIMENTS

Embodiments of the present invention will be described below with reference to drawings.

Embodiment 1

The construction and operation of an optical head apparatus and an optical information processing apparatus according to a first embodiment of the present invention will be described assuming the use of a dual-layer optical disk recordable/reproducible from one side thereof.

Figure 1:
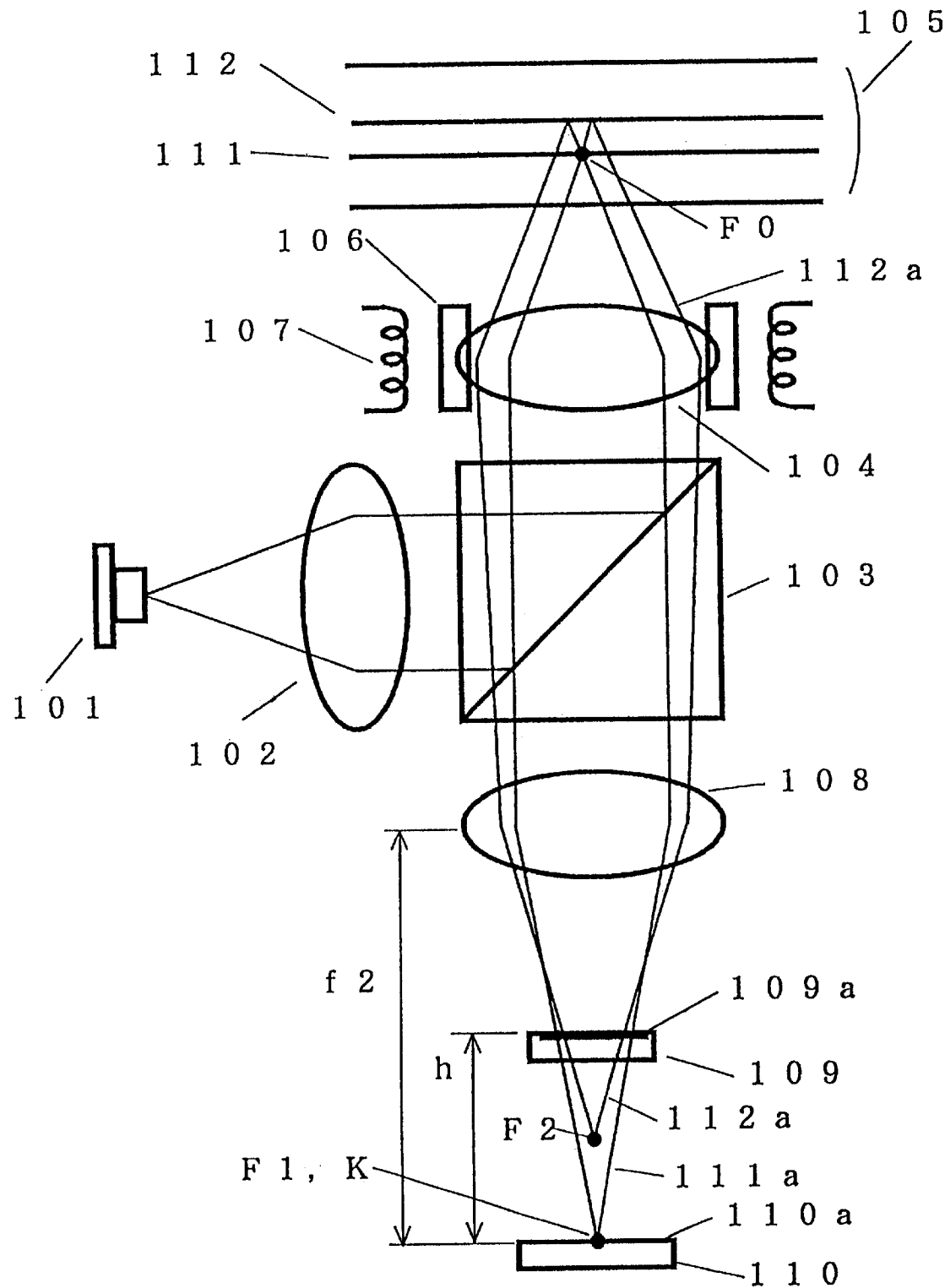
FIG. 1 is a side view showing an optical system when recording/reproduction is performed on a dual-layer disk by an optical head apparatus according to a first embodiment of the present invention.

FIG. 1 shows a side view of an optical system according to the first embodiment. Light emitted from a semiconductor laser 101 is converted by a collimator lens 102 into a parallel beam of light, which, after being reflected by a beam splitter 103, is converged by an objective lens 104 and focused onto a first information layer 111 or a second information layer 112 on an optical disk 105. The focal point of the light converged by the objective lens is denoted by F0. An actuator 107 moves the objective lens 104 together with its holding means 106 in such a manner as to follow disk movements associated with the surface warping and eccentricity of the optical disk 105.

Reflected beams 111a and 112a, generated by diffraction/reflection at the first and second information layers 111 and 112 on the optical disk 105, are again passed through the objective lens 104 and become substantially parallel beams of light. The substantially parallel light beams pass through the beam splitter 103 and are converged by a detection lens 108. The converged beams of light enter a holographic device 109 and diffracted by a holographic surface 109a. The method of deriving the focus error signal and tracking error signal is essentially the same as that of the prior art and, therefore, will not be described in detail here. The construction of the optical information processing apparatus also is essentially the same as that of the prior art example shown in FIG. 35 and, therefore, will not be described in detail here.

When recording/reproducing information by bringing the focal point F0 to the first information layer 111 on the optical disk 105, which layer lies nearer to the objective lens 104, as shown in FIG. 1, the reflected beam 112a from the second information layer 112 lying farther from the objective lens 104 is converged by the detection lens 108 to a point F2 nearer to the detection lens 108 than the focal point F1 to which the reflected beam 111a from the first information layer 111 is convergedbythe detection lens 108. When the optical distance between the first information layer 111 and the second information layer 112 is denoted by t, and the longitudinal magnification of the detection optics, which is determined by the objective lens 104 and the detection lens 108, is denoted by β, the optical distance between the focal points F1 and F2 is given by 2×t×β.

Here, the optical distance is obtained by dividing the physical distance between two points by the refractive index of the medium separating them. It is the distance that light would traverse through a medium of refractive index 1.

The optical distance between the detection lens 108 and the focal point F1 of the reflected beam 111a, when the focal point F0 is at the first information layer 111, is denoted by f2. The point located at a distance of f2 away from the detection lens 108 in the direction of the photodetector 110 is defined as point K. The position of the point K is determined by the optics of the optical head apparatus, and does not move even if the distance between the objective lens 104 and the optical disk 105 changes. When the focal point F0 is at the first information layer 111, the focal point F1 of the reflected beam 111a coincides with the point K.

The optical distance between the point K and the holographic surface 109a of the holographic device 109 is denoted by h. If h is approximately equal to $2 \times t \times \beta$, the focal point F2 of the reflected beam 112a is located near the holographic surface 109a of the holographic device 109, as shown in FIG. 3, when the focal point F0 is at the first information layer 111. At this time, if a split line of the holographic device 109 lies within the cross section of the reflected beam 112a projected on the holographic surface 109a, unexpected diffraction of light occurs. If the area near the split line of the holographic device 109 is large compared with the cross sectional area of the reflected beam 112a on the holographic surface 109a, the unexpected diffraction produced in the reflected beam 112a to the photodetector 110 increases in intensity, introducing external disturbances into the focus and/or tracking error signals related to the reflected beam 111a from the first information layer 111, and control thus becomes unstable.

Figure 4:
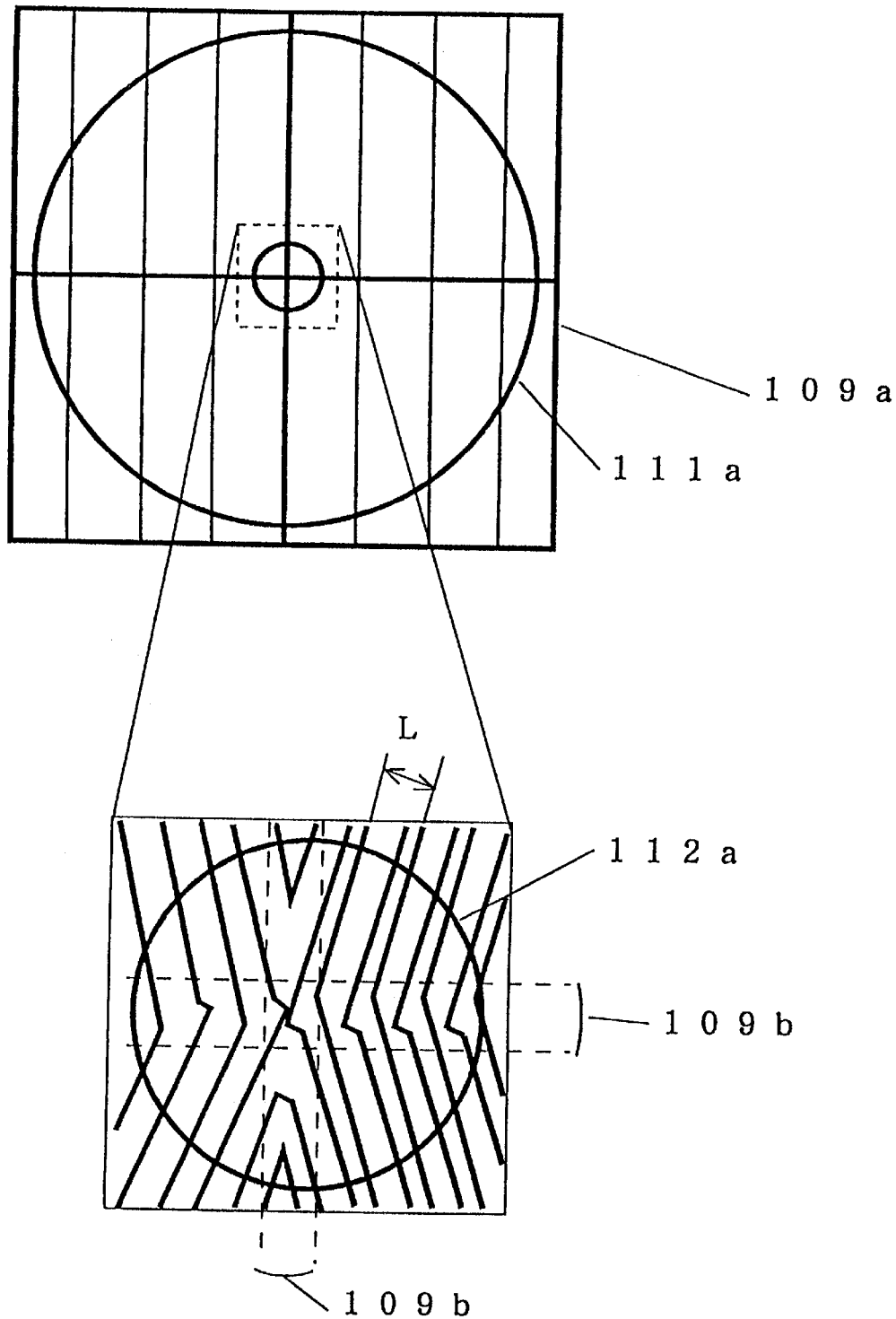
FIG. 4 is a diagram showing a zone splitting pattern of a holographic device, along with an enlarged view thereof near split lines, in the optical head apparatus according to the first embodiment of the present invention.

FIG. 4 shows an entire view of the holographic surface 109a of the holographic device 109 and an enlarged view of a portion near the center thereof. The holographic surface 109a is split into several rectangular zones. The enlarged view schematically shows the grating pattern near zone split lines on the holographic surface 109a. Since the split line width which defines a joint in the holographic device 109 is approximately equal to the grating interval, the structure of the holographic device 109 is disrupted at the joint of the holographic device 109. In the enlarged view of FIG. 4, the joint region 109b is shown enclosed by dashed lines.

Light falling on the joint region 109b undergoes unexpected diffraction, causing the light to be diffracted in directions different from the originally designed direction.

When the focal point F0 is at the first information layer 111, as shown in FIG. 3, the cross sectional area of the reflected beam 111a on the holographic surface 109a is sufficiently large compared with the area of the joint region 109b, so that the effects of the unexpected diffraction occurring at the joint region 109b can be ignored. However, when the focal point F2 of the reflected beam 112a from the second information layer 112 is located near the holographic surface 109a, and the area of the joint region 109b lying within the cross section of the reflected beam 112a on the holographic surface 109a is relatively large, most of the light rays contained in the reflected beam 112a are diffracted, and the diffracted rays of light act as external disturbances to the focus and/or tracking error signals related to the reflected beam 111a on the photodetector 110, and control thus becomes unstable.

The optical distance, t, between the first information layer 111 and the second information layer 112 varies depending on the optical disk 105 used. Considering this variation, the maximum value of t is denoted by tmax. In the first embodiment, the optical head apparatus is constructed so that the optical distance, h, between the holographic surface 109a of the holographic device 109 and the point K satisfies the relation $h > 2 \times tmax \times \beta$. With this construction, when recording/reproducing information on the first information layer 111, since the cross sectional area on the holographic surface 109a of the reflected beam 112a from the second information layer 112 becomes satisfactorily large, the effects of the joint region 109b can be reduced. This reduces the unexpected diffraction of light, making it possible to obtain stable focus and/or tracking error signals in relation to the reflected beam 111a from the first information layer 111. In the prior art construction, if an external disturbance is caused to the focus error signal, a defocus of 0.5 µm or greater may result. On the other hand, in the case of the first embodiment, the defocus can be held within 0.1 µm. Accordingly, the optical information processing apparatus using the first embodiment is capable of information recording/reproduction with low error rates.

As an example of the optical disk 105, it is assumed that the maximum value of the variation of the interlayer thickness between the first information layer 111 and the second information layer 112 is 70 µm and the minimum value of the variation of the refractive index is 1.45. At this time, the maximum value, tmax, of the optical distance is about 48 µm. As an example of the optical head apparatus, it is assumed that the optical distance, f1, between the objective lens 104 and the focal point F0 is 3 mm and the optical distance, f2, between the detection lens 108 and the point K is 20 mm. The longitudinal magnification β of the detection optics is given by $\beta = (f2 \ast f2)/(f1 \ast f1)$. In this example, the longitudinal magnification β of the detection optics is about 44×. Consequently, when the focal point F0 is at the first information layer 111, the focal point F2 of the reflected beam 112a from the second information layer 112 is located at a distance of 4.3 mm away from the point K in the direction of the detection lens 108. Then, the optical head apparatus is designed so that the optical distance from the holographic surface 109a of the holographic device 109 to the point K becomes greater than 4.3 mm. By so doing, stable focus and/or tracking error signals can be obtained in relation to the reflected light from the desired information layer on any optical disk 105 having variation in the optical distance between the two information layers. This achieves information recording/reproduction with low error rates.

Further, if the area of the joint region 109b of the holographic device 109 is about one-fifth or less of the cross sectional area of the reflected beam 112a projected on the holographic surface 109a, the effects of the unexpected diffraction from the joint region 109b can, in effect, be suppressed sufficiently.

When substantially parallel rays of light of wavelength λ are converged by a lens of numerical aperture NA, if the distance, d, from the converging point is greater than $\lambda/(NA \ast NA)$, then the diameter D of the cross section of the converged rays of light is proportional to d and is given by $D = NA \ast d$.

Here, it is assumed that the numerical aperture NA of the detection lens is 0.09 and the wavelength λ of the semiconductor laser 101 is 650 nm. It is also assumed that the zone split lines on the holographic surface 109a are two straight lines intersecting with each other at the center of the cross section of the reflected beam 112a, as shown in the enlarged view of FIG. 4, and that the grating interval L of the holographic device 109 is about 10 µm. Then, the area of the joint region 109b is about one-fifth or less of the cross sectional area of the reflected beam 112a if the radius of the cross section of the reflected beam 112a on the holographic surface 109a is 60 μm or larger. Accordingly, the holographic surface 109a of the holographic device 109 should be separated by about d=1.4 mm or more from the focal point F2 of the reflected beam 112a. In this case, if the distance between the holographic surface 109a of the holographic device 109 and the point K is set equal to or greater than 4.3+1.4=5. 7 mm, the effects of the zone split lines of the holographic device 109 can be completely eliminated, making it possible to provide stable focus and/or tracking error signals at all times even if the optical disk 105 is a marginal disk in the allowable range of variation of the interlayer distance. This achieves information recording and reproduction with low error rates on an information storage medium having two information layers recordable/reproducible from one side thereof.

In the first embodiment, specific numeric values have been assumed for the interlayer thickness and the refractive index of the interlayer medium on the dual-layer optical disk 105, the optical distance between the objective lens 104 and the focal point F0, the optical distance between the detection lens 108 and the point K, the numerical aperture of the detection lens 108, and the wavelength of the semiconductor laser 101, but it will be appreciated that they are not limited to the specific numeric values assumed here.

Further, in the first embodiment, since the construction is such that the optical distance between the holographic device 109 and the photodetector 110 is made large, the advantage is that it is easy to adjust the optical system for obtaining the focus and/or tracking error signals in relation to the reflected light from the desired information layer.

Embodiment 2

The construction and operation of an optical head apparatus and an optical information processing apparatus according to a second embodiment of the present invention will be described assuming the use of a dual-layer optical disk recordable/reproducible from one side thereof.

Figure 6:
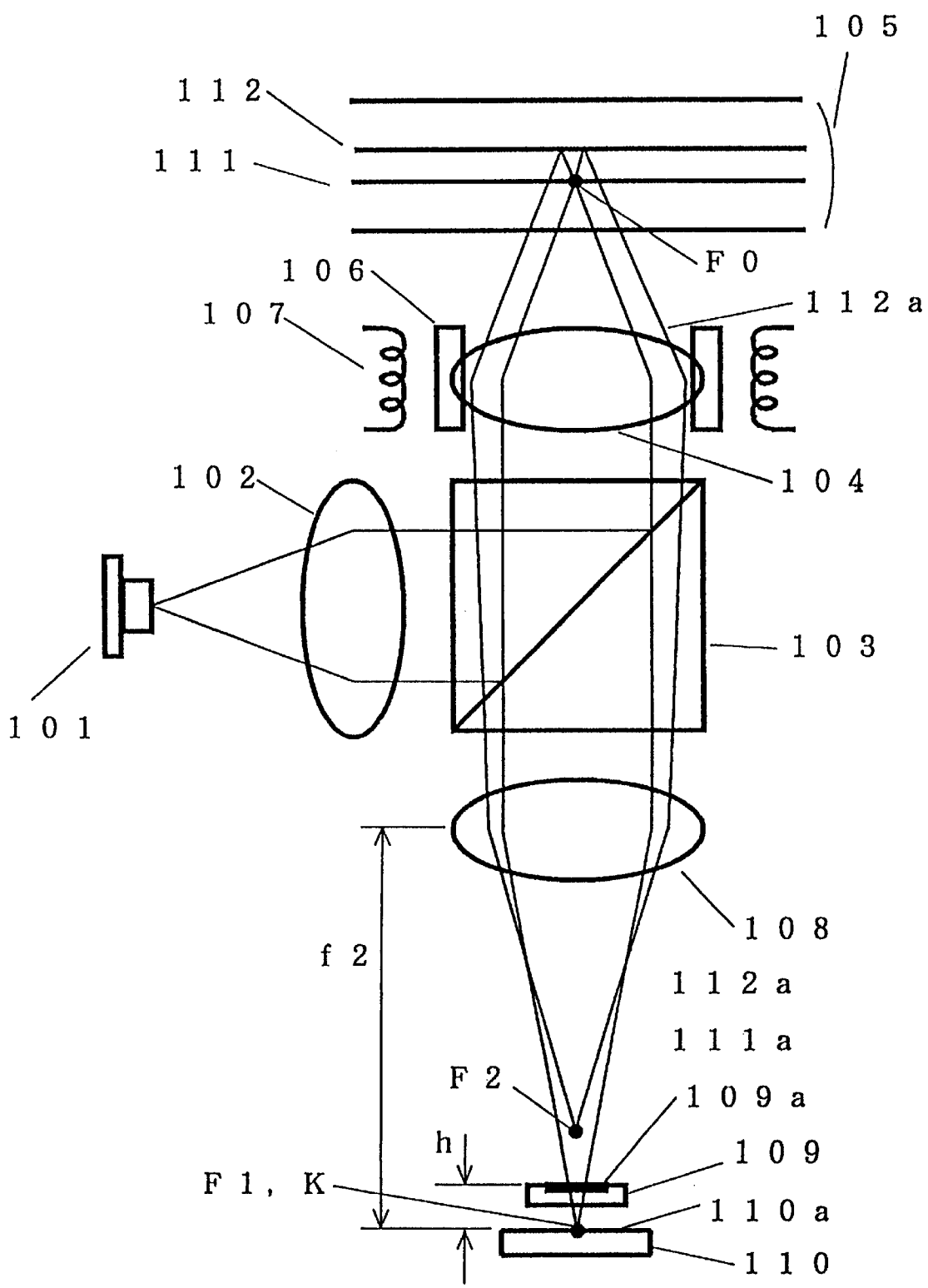
FIG. 6 is a side view showing the optical system of an optical head apparatus according to a second embodiment of the present invention.

FIG. 6 shows a side view of an optical system according to the second embodiment. Elements that are functionally the same as those in the first embodiment and points and the like defined similarly to those in the first embodiment are designated by the same reference characters. The second embodiment deals with the case where the optical distance between the holographic surface 109a of the holographic device 109 and the point K located at distance f2 from the detection lens 108 is reduced.

Considering the variation of the interlayer spacing in the dual-layer optical disk 105 recordable/reproducible from one side thereof, the optical head apparatus is constructed so that the optical distance, h, between the holographic surface 109a of the holographic device 109 and the point K satisfies the relation h<2×tmin×β, where tmin is the minimum value of the optical distance between the first information layer 111 and the second information layer 112, and β is the longitudinal magnification of the detection optics. With this construction, when recording/reproducing information on the first information layer 111, since the cross sectional area on the holographic surface 109a of the reflected beam 112a from the second information layer 112 becomes satisfactorily large, the effects of the joint region 109b can be reduced. This reduces the unexpected diffraction of light at the joint region 109b, making it possible to obtain stable focus and/or tracking error signals in relation to the reflected beam 111a from the first information layer 111. In the case of the second embodiment also, the defocus can be held within 0.1 μm, which is a significant improvement compared with the 0.5 μm or greater defocus in the prior art example. This achieves information recording/reproduction with low error rates.

As an example of the optical disk 105, it is assumed that the minimum value of the variation of the interlayer spacing between the first information layer 111 and the second information layer 112 is 40 μm and the maximum value of the variation of the refractive index is 1.65. At this time, the minimum value, tmin, of the optical distance is about 24 μm. As an example of the optical head apparatus, it is assumed that the optical distance, f1, between the objective lens 104 and the focal point F0 is 3 mm and the optical distance, f2, between the detection lens 108 and the point K is 20 mm. In this example, the longitudinal magnification β of the detection optics is about 44×. Consequently, when the focal point F0 is at the first information layer 111, the focal point F2 of the reflected beam 112a from the second information layer 112 is located at a distance of 2.1 mm away from the point K in the direction of the detection lens 108. Then, the optical head apparatus is designed so that the optical distance from the holographic surface 109a of the holographic device 109 to the point K becomes smaller than 2.1 mm.

By so doing, stable focus and/or tracking error signals can be obtained in relation to the reflected light from the desired information layer on any optical disk 105 having variation in the optical distance between the two information layers, and information recording/reproduction with low error rates can thus be achieved.

Further, if the area of the joint region 109b of the holographic device 109 is about one-fifth or less of the cross sectional area of the reflected beam 112a projected on the holographic surface 109a, the effects of the unexpected diffraction from the joint region 109b can, in effect, be suppressed sufficiently.

As an example of the optics, it is assumed that the numerical aperture NA of the detection lens is 0.09 and the wavelength λ of the semiconductor laser 101 is 650 nm. In this example, from the same assumption and calculation as described in the first embodiment, it follows that the holographic surface 109a of the holographic device 109 should be separated by about d=1.4 mm or more from the focal point F2 of the reflected beam 112a. In this case, if the distance between the holographic surface 109a of the holographic device 109 and the point K is set equal to or less than 2.1−1.4=0.7 mm, the effects of the zone split lines of the holographic device 109 can be completely eliminated, making it possible to provide stable focus and/or tracking error signals at all times even if the optical disk 105 is a marginal disk in the allowable range of variation of the interlayer distance. The optical information processing apparatus of the present invention can thus achieve information recording and reproduction with low error rates on an information storage medium having two information layers recordable/reproducible from one side thereof.

In the second embodiment, specific numeric values have been assumed for the interlayer thickness and the refractive index of the interlayer medium on the dual-layer optical disk 105, the optical distance between the objective lens 104 and the focal point F0, the optical distance between the detection lens 108 and the point K, the numerical aperture of the detection lens 108, and the wavelength of the semiconductor laser 101, but it will be appreciated that they are not limited to the specific numeric values assumed here.

Further, in the second embodiment, since the optical distance between the holographic device 109 and the photodetector 110 can be reduced, the advantage is that the whole construction of the optical head apparatus can be made small.

Embodiment 3

The construction and operation of an optical head apparatus and an optical information processing apparatus according to a third embodiment of the present invention will be described assuming the use of a three-layer optical disk recordable/reproducible from one side thereof.

FIG. 7 shows a simplified schematic view of the structure of the optical disk 113 according to the third embodiment and a side view of the photodetector 110 and its adjacent elements in the optical system. Elements that are functionally the same as those in the first or second embodiment and points and the like defined similarly to those in the foregoing embodiments are designated by the same reference characters. The optical disk 113 has a first information layer 114, a second information layer 115, and a third information layer 116. Reflected beams 114a, 115a, and 116a from the first, second, and third information layers 114, 115, and 116, respectively, are converged by the detection lens 108 to the respective focal points F1, F2, and F3. The focal point F1 of the reflected beam 114a converged by the detection lens 108 when the focal point F0 is at the first information layer 114 is defined as point K, and the distance between the point K and the detection lens 108 is denoted by f2.

It is assumed that the interlayer spacing between the first information layer 114 and the second information layer 115 and that between the second information layer 115 and the third information layer 116 are both 40 μm, and that the refractive index of the medium separating each information layer is 1.5. It is also assumed that the longitudinal magnification β of the detection optics is 44×. When the focal point F0 of the objective lens 104 is at the first information layer 114, the focal points F2 and F3 of the reflected beams 115a and 116a from the second and third information layers 115 and 116 are located at distances of 2.4 mm and 4.7 mm, respectively, away from the point K in the direction of the detection lens 108. Therefore, the optical head apparatus should be designed so that the optical distance between the holographic surface 109a of the holographic device 109 and the point K becomes 3.6 mm. By so doing, it becomes possible to suppress the effects of the unexpected diffraction occurring at the holographic surface 109a in the reflected beam 115a and/or the reflected beam 116a, and focus and/or tracking error signals can be obtained with reduced external disturbances to the reflected beam 114a from the first information layer 114; stable control can thus be achieved. In this case also, the defocus can be held within 0.1 μm, which is a significant improvement compared with the 0.5 μm or greater defocus in the prior art example.

In this way, by using the optical head apparatus and optical information processing apparatus of the third embodiment, an optical disk having two or more information layers can be recorded/reproduced with low error rates.

In the third embodiment, specific numeric values have been assumed for the interlayer thickness between each information layer and the refractive index of the interlayer medium on the three-layer optical disk 105, and the longitudinal magnification β of the detection optics, but they are not limited to the specific numeric values assumed here, and it will be appreciated that the same effect can also be obtained in the case of optical disks having a larger number of layers.

Embodiment 4

The construction and operation of an optical head apparatus according to a fourth embodiment of the present invention will be described which assumes the use of a dual-layer optical disk recordable/reproducible from one side thereof, and in which a beam shaping prism is inserted in the path of the detection optics and the longitudinal magnification of the detection optics varies according to the direction thereof.

In an optical head apparatus used for the recording/reproduction of information on an optical disk as an information storage medium, beam shaping is performed to efficiently use the light from the semiconductor laser and to obtain a circularly focused spot. This is accomplished by using a beam shaping prism and raising the capture ratio at the wider side of the spreading angle of the beam emitted from the semiconductor laser relative to that at the narrower side of the spreading angle.

A numerical example of the spreading angle of the semiconductor laser will be given here. In terms of the full width at half maximum of the light amount distribution, the angle at the narrower side is 9 degrees and that at the wider side is 24 degrees. Therefore, if the 9-degree spread at the narrower side is optically increased in its spreading direction by a factor 2.5, the light amount distribution will have a substantially uniform spreading regardless of the direction.

Figure 8:
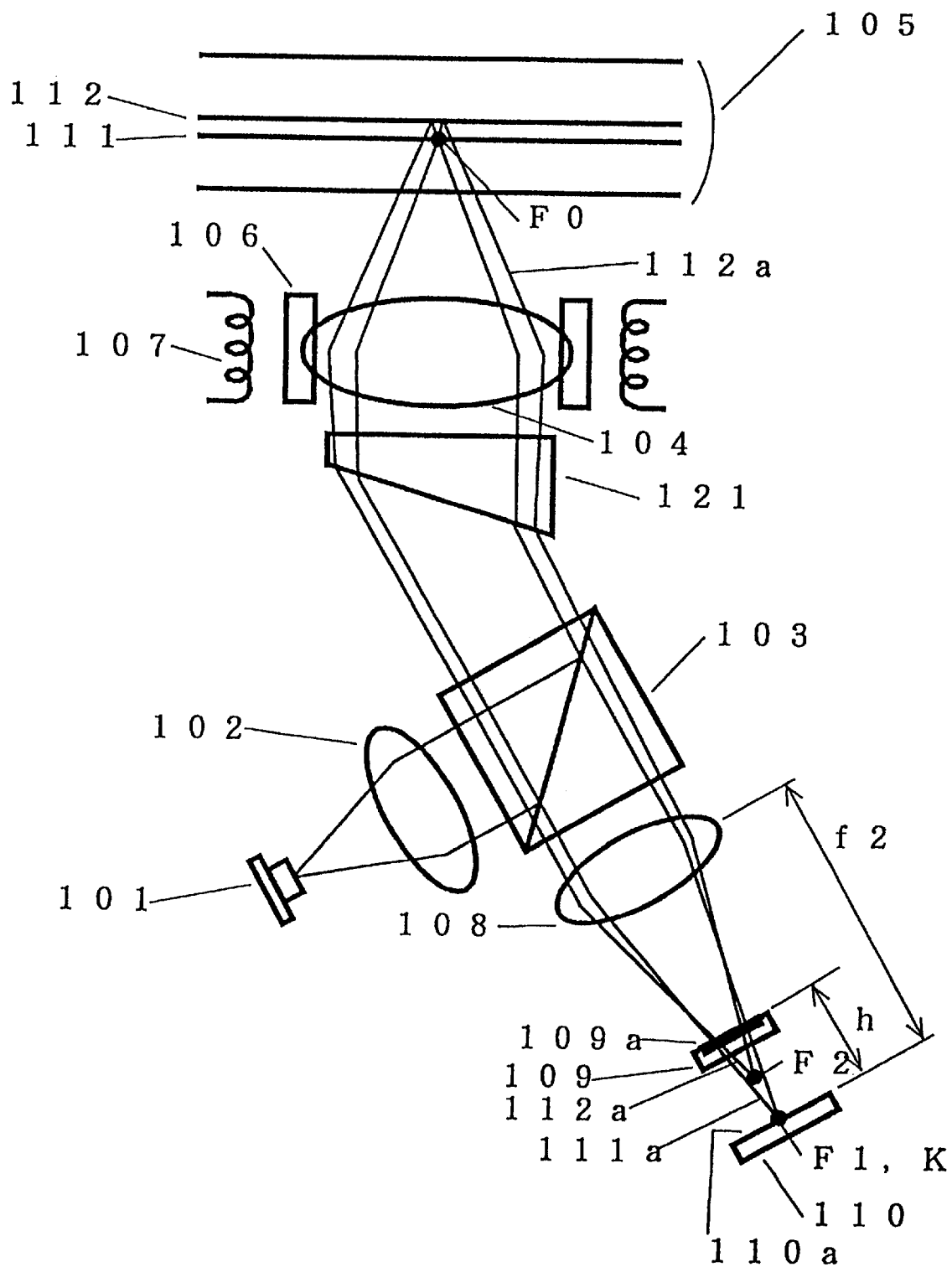
FIG. 8 is a side view showing the optical system of an optical head apparatus according to a fourth embodiment of the present invention.

FIG. 8 shows a side view of the optical system according to the fourth embodiment. Elements that are functionally the same as those in the foregoing embodiments and points and the like defined similarly to those in the foregoing embodiments are designated by the same reference characters. Light emitted from the semiconductor laser 101 is converted by the collimator lens 102 into a parallel beam of light and reflected by the beam splitter 103. The beam is then deflected in a particular direction by the beam shaping prism 121 acting as a magnification converting means, and is spread in that direction. The beam is converged by the objective lens 104 onto the optical disk 105. The focal point of the beam exiting the objective lens 104 is designated by F0. Light reflected/diffracted by the first information layer 111 or the second information layer 112 in the optical disk 105 is again passed through the objective lens 104 and becomes a parallel beam of light. This parallel beam of light is again deflected by the beam shaping prism 121 acting as the magnification converting means, and emerges from it with the beam spreading reduced in the particular direction. The beam then passes through the beam splitter 103 and is converged by the detection lens 108. Further, the beam is diffracted by the holographic device 109 and is received by the photodetector 110.

Figure 9:
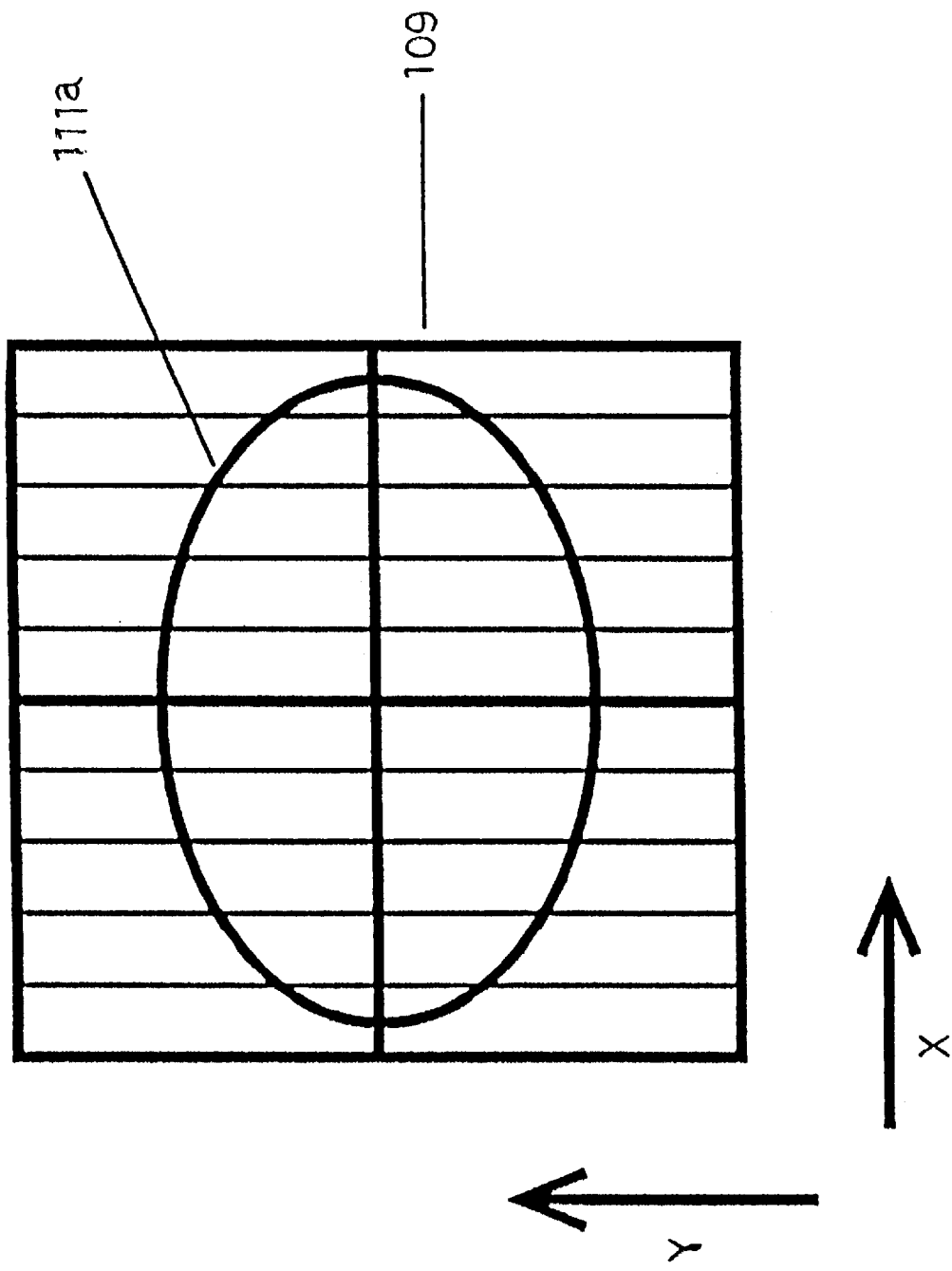
FIG. 9 is a front view showing the cross sectional shape of a beam reflected from an information layer onto the holographic device when the focal point of the objective lens is at the information layer, in the optical head apparatus according to the fourth embodiment of the present invention.

The beam shaping prism 121 as the magnification converting means acts to vary the longitudinal magnification of the detection optics in a particular direction. The longitudinal magnification of the detection optics remains unchanged in the direction of a plane parallel to the plane containing the optical axes of the beams before and after the deflection, but varies in the direction of a plane perpendicular to the plane containing the optical axes of the beams before and after the deflection. FIG. 9 shows the shape of the cross section, on the holographic surface 109a of the holographic device 109, of the reflected beam 112a from the second information layer 112 when the focal point F0 is at the first information layer 111. Here, since the spreading of the reflected beam 112a is reduced in the particular direction (the Y direction in FIG. 9) by the action of the beam shaping prism 121 as the magnification converting means, the cross section of the reflected beam 112a on the holographic surface 109a becomes elliptical. Since the longitudinal magnification of the detection optics is higher in the Y direction than in the X direction, when the distance between the second information layer 112 and the objective lens 104 changes, the diameter of the cross section on the holographic surface 109a changes greatly in the Y direction compared with the change in the X direction.

The position of the focal point F1 to which the reflected beam 111a from the first information layer 111 converges by the action of the detection lens 108 when the focal point F0 of the objective lens 104 is at the first information layer 111, is defined as point K, and the distance between the point K and the detection lens 108 is denoted by f2. The point along the Y direction at which the reflected beam 112a from the second information layer 112 is focused as a line converged in the Y direction by the action of the beam shaping prism 121 as the magnification converting means and the detection lens 108, is defined as the focal point F2 in the Y direction.

The maximum value of the variation of the optical distance between the two information layers in the optical disk 105 is denoted by tmax, the longitudinal magnification of the detection optics in the Y direction is denoted by $\beta 1$, and the optical distance between the holographic surface 109a of the holographic device 109 and the point K is denoted by h.

Figure 10:
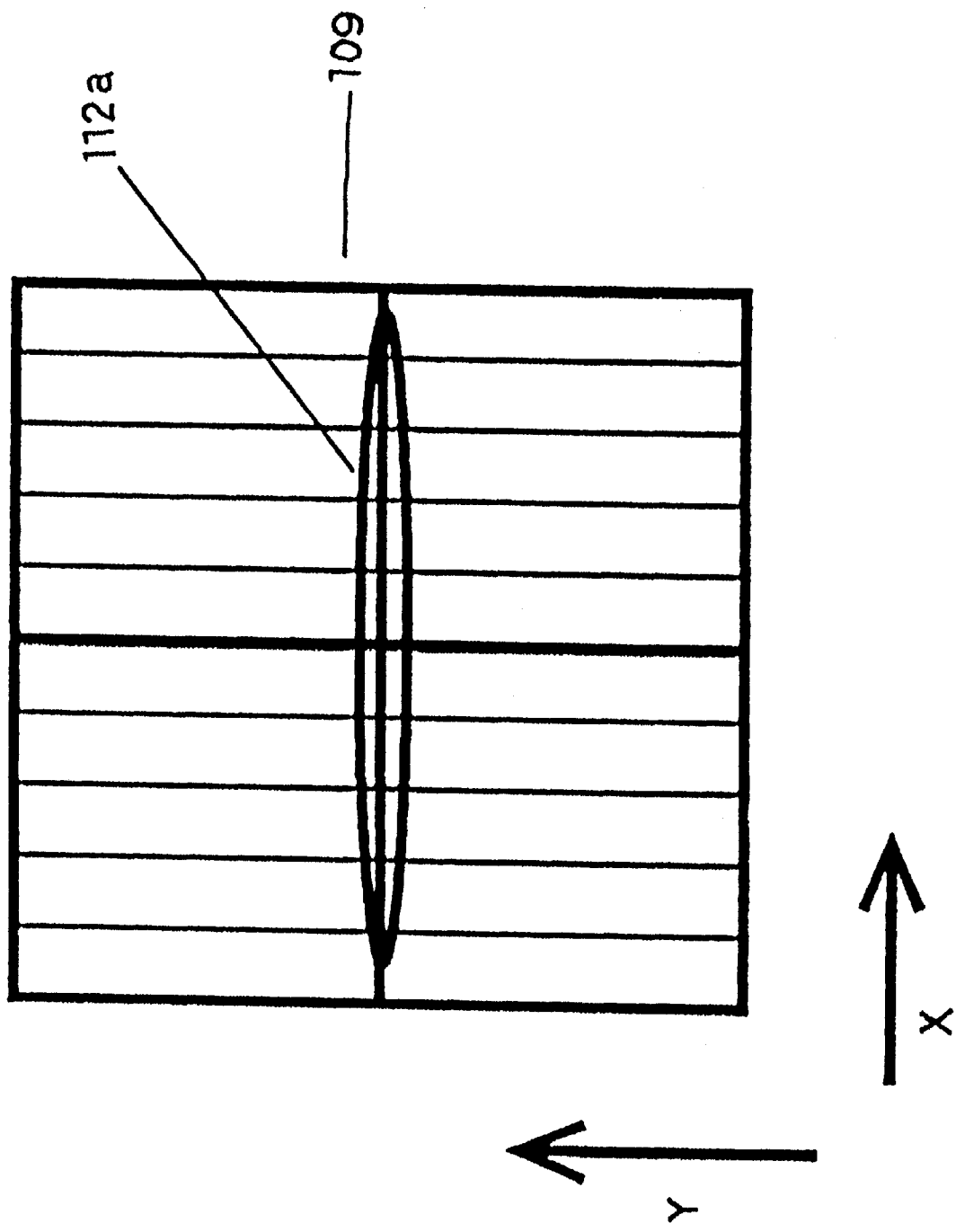
FIG. 10 is a front view showing the cross sectional shape of the beam reflected from the information layer onto the holographic device when the holographic device is located near the focal point of the reflected beam focused in Y direction, in the optical head apparatus according to the fourth embodiment of the present invention.

It is assumed here that h is approximately equal to $2 \times tmax \times \beta 1$. At this time, when the focal point F0 is brought onto the first information layer 111, the focal point F2 is located near the holographic surface 109a, and the reflected beam 112a from the second information layer 112, when projected on the holographic surface 109a, is converged only in the Y direction, as shown in FIG. 10, the beam's cross section thus being substantially reduced to a straight line. At this time, if the reflected beam 112a converged in the Y direction happens to lie over a split line on the holographic surface 109a, unexpected diffraction of light occurs, and stable focus and/or tracking error signals cannot be obtained.

In the fourth embodiment, the optical head apparatus is designed so that h satisfies the relation $h > 2 \times tmax \times \beta 1$. The optical information processing apparatus is the same in construction as that of the prior art example shown in FIG. 35 and, therefore, will not be described in detail here.

As an example of the optical disk 105, it is assumed that the maximum value of the variation of the interlayer thickness between the first information layer 111 and the second information layer 112 is 70 µm and the minimum value of the variation of the refractive index is 1.45. At this time, the maximum value, tmax, of the optical distance is about 48 µm. As an example of the optical head apparatus, it is assumed that the optical distance, f1, between the objective lens 104 and the focal point F0 is 3 mm, the magnification, in the Y direction, of the beam shaping as the magnification converting means is 2×, and the optical distance, f2, between the detection lens 108 and the point K is 10 mm. The longitudinal magnification $\beta 1$ of the detection optics in the Y direction is given by $\beta 1 = (f2^* f2^* 2^* 2)/(f1^* f1)$. In this example, the longitudinal magnification $\beta 1$ of the detection optics is about 44×. Consequently, when the focal point F0 is at the first information layer 111, the focal point F2 in the Y direction of the reflected beam 112a from the second information layer 112 is located at a distance of 4.3 mm away from the point K in the direction of the detection lens 108. Then, the optical head apparatus is designed so that the optical distance between the holographic surface 109a of the holographic device 109 and the point K becomes greater than 4.3 mm. By so doing, stable focus and/or tracking error signals can be obtained in relation to the reflected light from the desired information layer on any optical disk 105 having variation in the optical distance between the two information layers. In a prior art construction using a beam shaping prism, a defocus of about 1.0 µm occurs, but in the present embodiment, the defocus can be held within 0.1 µm. Therefore, by using the optical information processing apparatus of the fourth embodiment, information can be recorded/reproduced with low error rates.

Further, if the area of the joint region 109b of the holographic device 109 is about one-fifth or less of the cross sectional area of the reflected beam 112a projected on the holographic surface 109a, the effects of the unexpected diffraction from the joint region 109b can, in effect, be suppressed sufficiently. By designing the optical head apparatus in this way, stable focus and/or tracking error signals can be obtained at all times even if the optical disk 105 is a marginal disk in the allowable range of variation of the interlayer distance.

In the fourth embodiment, specific numeric values have been assumed for the interlayer thickness and the refractive index of the interlayer medium on the dual-layer optical disk 105, and the longitudinal magnification in the Y direction of the beam shaping prism as the magnification converting means, but the effect of the present invention is not limited to using these specific numeric values.

Embodiment 5

Next, an optical head apparatus according to a fifth embodiment will be described, in which a beam shaping prism is inserted in the path of the detection optics, as in the fourth embodiment, and by which an information recording medium having a plurality of information layers is recorded and reproduced from one side thereof. Elements that are functionally the same as those in the foregoing embodiment are designated by the same reference characters.

The construction of the optical system is the same as that of the fourth embodiment and, therefore, will not be described in detail here.

The position of the focal point F1 to which the reflected beam 111a from the first information layer 111 converges by the action of the detection lens 108 when the focal point F0 of the objective lens 104 is at the first information layer 111, is defined as point K, and the distance between the point K and the detection lens 108 is denoted by f2. The point at which the reflected beam 112a from the second information layer 112 is focused as a line converged in the Y direction by the action of the detection lens 108 and the beam shaping prism, is defined as the focal point F2 in the Y direction.

The optical distance between each information layer on the optical disk 105 having a plurality of information layers recordable/reproducible from one side thereof is denoted by t, and the longitudinal magnification of the detection optics in the Y-axis direction is denoted by $\beta 1$. The optical distance between the holographic surface 109a of the holographic device 109 and the point K is denoted by h.

It is assumed here that h is approximately equal to two times the product of t and $\beta 1$. At this time, when the focal point F0 is brought onto the first information layer 111, F2 is located near the holographic surface 109a, and the reflected beam 112a from the second information layer 112, when projected on the holographic surface 109a, is converged only in the Y direction, as shown in FIG. 10, the beam's cross section thus being substantially reduced to a straight line.

Figure 11:
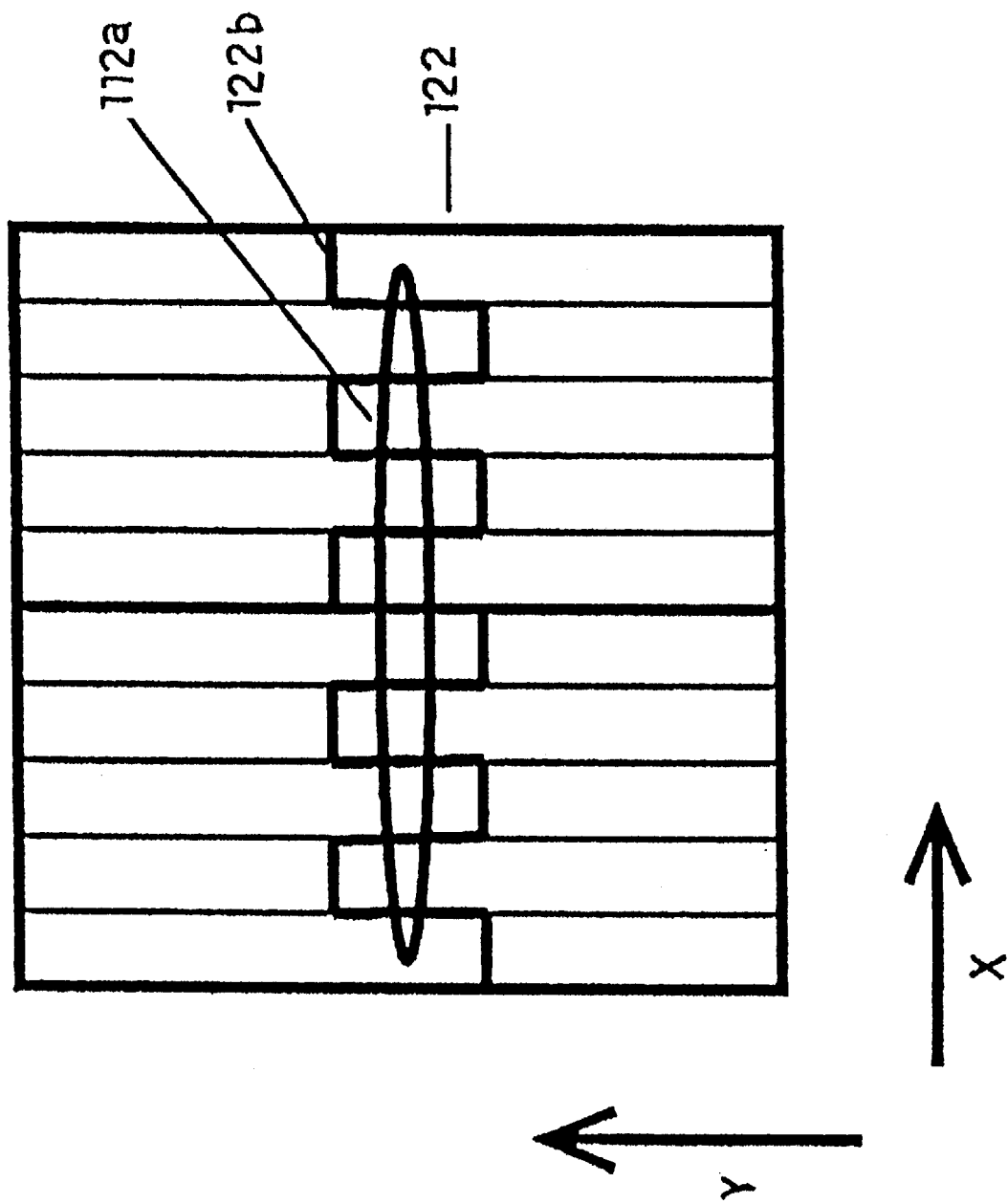
FIG. 11 is a diagram showing a holographic device according to a fifth embodiment, along with the cross sectional shape of the beam reflected from the information layer onto the holographic device when the holographic device is located near the focal point of the reflected beam focused in Y-axis direction, in the optical head apparatus according to the fifth embodiment of the present invention.

In the fifth embodiment of the present invention, a holographic device 122, such as shown in FIG. 11, is used instead of the holographic device 109. In the holographic device 122, the split line parallel to the direction of the X axis is not arranged in a straight line, but is offset from one zone to the next. In FIG. 11, the split line 122b is formed in a rectangular wave-like shape as one technique for achieving this. By so doing, the proportion of the area of the overlap between the reflected beam 112a and the split line can be reduced, thereby reducing the effects of reflected light. Stable focus control can thus be achieved. As compared with the defocus of about 1.0 μm that occurred in the prior art construction, the defocus can be held within 0.2 μm in the fifth embodiment. When the optical information processing apparatus of the fifth embodiment is used, information recording/reproduction with low error rates can be accomplished.

Further, using the holographic device 122 shown in FIG. 11 serves to reduce the rate at which the tracking error signal obtained by the phase difference method drops due to the positional displacement along the Y-axis direction between the reflection beam 112a and the split line 122b on the holographic device 122. This has the effect of increasing the margin for adjustment, and reducing the assembly cost.

Figure 12:
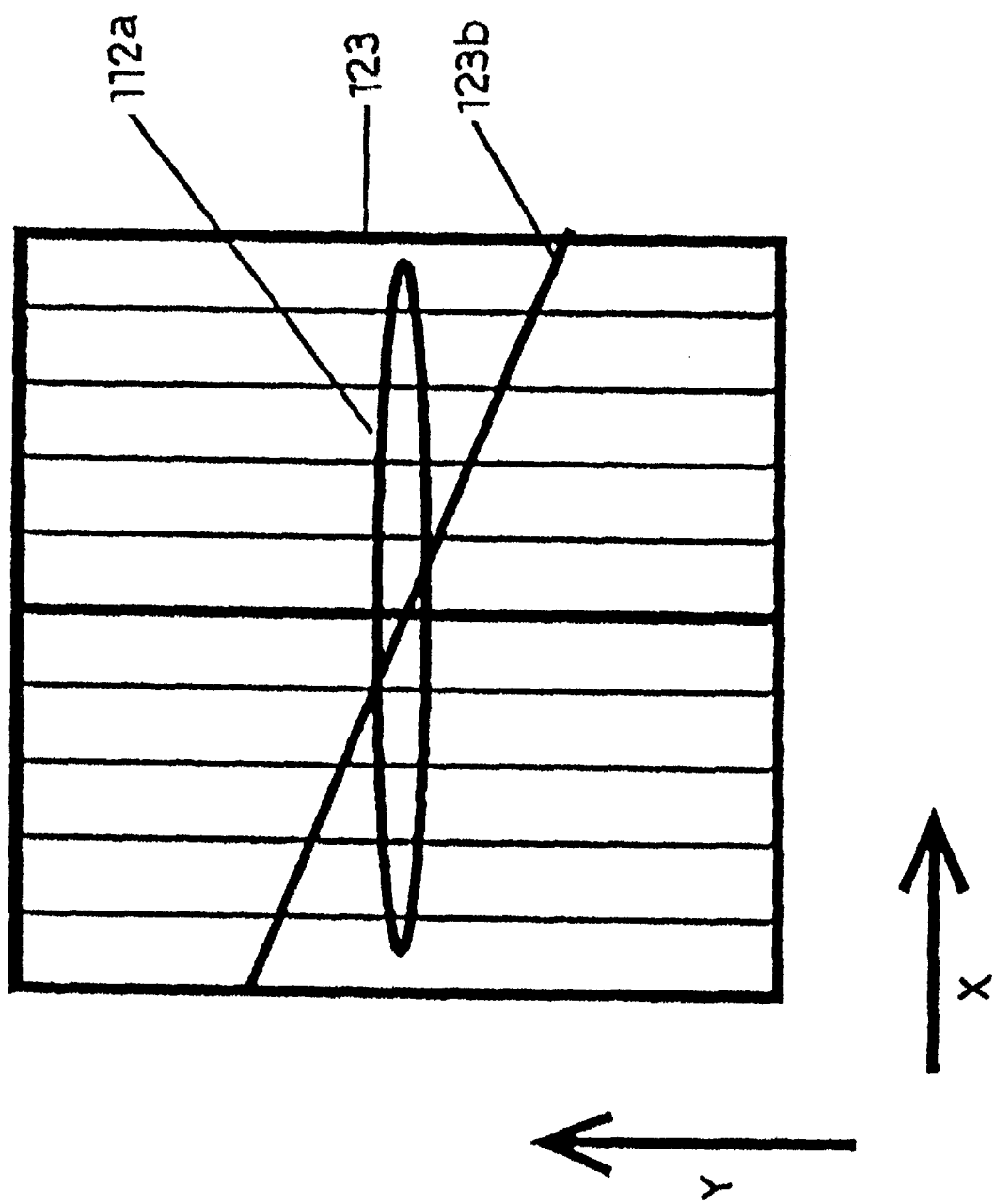
FIG. 12 is a diagram showing another example of the holographic device according to the fifth embodiment, along with the cross sectional shape of the beam reflected from the information layer onto the holographic device when the holographic device is located near the focal point of the reflected beam focused in Y-axis direction, in the optical head apparatus according to the fifth embodiment of the present invention.

As another example, a holographic device 123, such as shown in FIG. 12, may be used instead of the holographic device 122. In the holographic device 123, the split line 123b makes an angle of 5 degrees with the focal line of the reflected beam 112a. In this case also, the area of the overlap between the split line 123b and the reflected beam 112a converged in the Y-axis direction can be reduced, reducing the effects of unexpected light diffraction; therefore, stable focus control can be achieved. In FIG. 12, the split line 123b on the holographic device 123 is shown as making an angle of 5 degrees with the focal line of the reflected beam 112a, but the angle that the split line 123b makes with the focal line of the reflected beam 112a is not limited to 5 degrees; the only requirement here is that the angle should be 5 degrees or larger.

Figure 13:
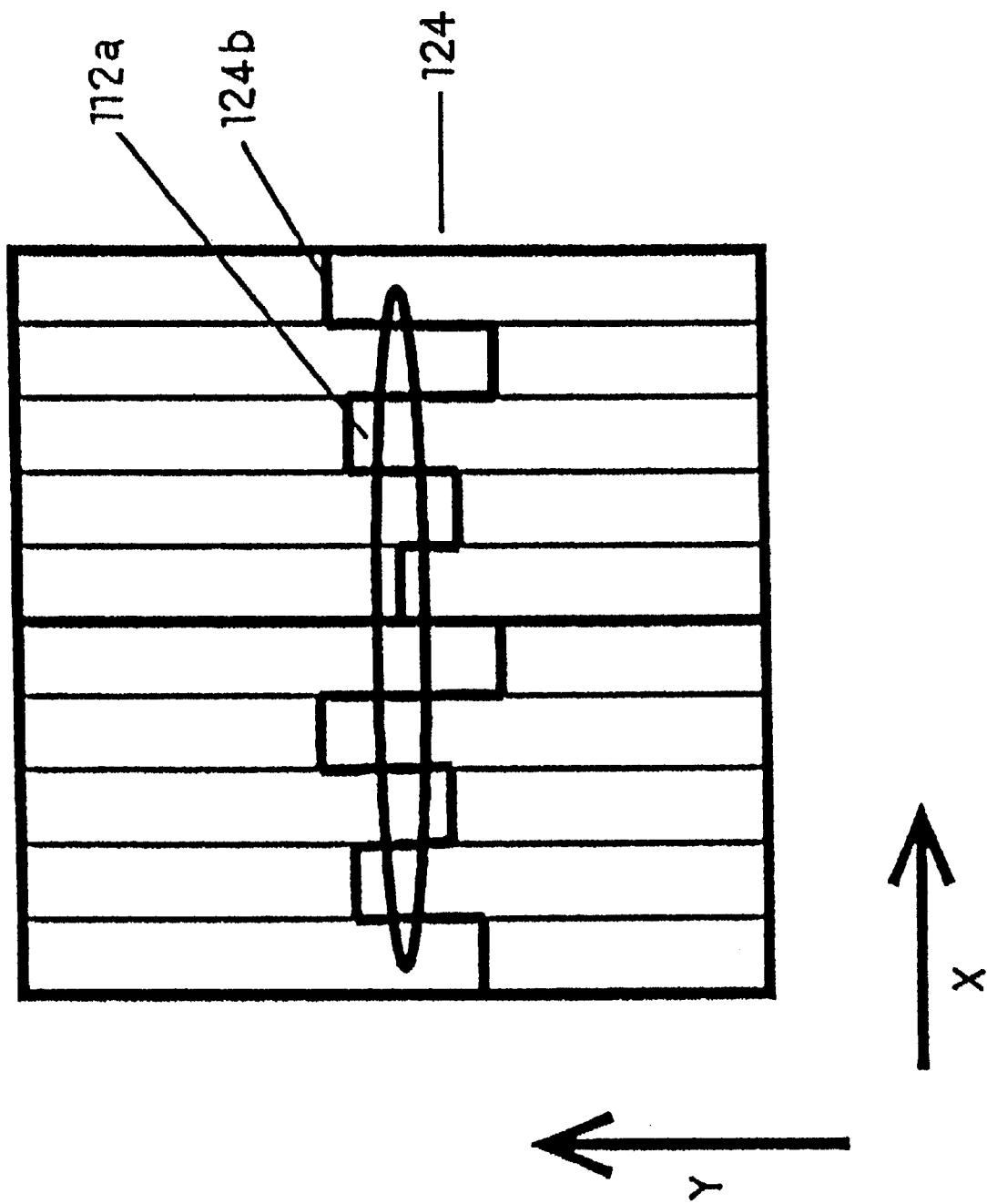
FIG. 13 is a diagram showing still another example of the holographic device according to the fifth embodiment, along with the cross sectional shape of the beam reflected from the information layer onto the holographic device when the holographic device is located near the focal point of the reflected beam focused in Y-axis direction, in the optical head apparatus according to the fifth embodiment of the present invention.

As a still further example, when a holographic device 124 having a randomly arranged split line 124b, such as shown in FIG. 13, is used, the same advantage can be obtained based on the same effect.

Embodiment 6

The construction and operation of an optical head apparatus according to a sixth embodiment of the present invention will be described which assumes the use of a dual-layer optical disk recordable/reproducible from one side thereof, and in which the constraint is imposed that when a holographic device is used as the wavefront converting means, the diameter of the cross section of the beam reflected from the information layer other than the desired information layer and converged on the holographic device should be approximately equal to the grating interval of the holographic device.

The cross sectional size of a beam converged by the detection optics is determined by the numerical aperture NA of the detection lens and the wavelength λ of the beam.

When the distance d from the focal point of the detection lens in the direction of the optical axis is within the range of d<λ/(NA*NA), the diameter D of the beam's cross section remains substantially unchanged at D=λ/NA.

On the other hand, when d is in the range of d>λ/(NA*NA), the diameter D of the beam's cross section is proportional to the distance d and is given by D=NA*d.

The sixth embodiment will be described with reference to FIG. 3. Elements that are functionally the same as those in the foregoing embodiments and points and the like defined similarly to those in the foregoing embodiments are designated by the same reference characters. Here, we assume the case in which when the focal point F0 is at the first information layer 111 on the optical disk 105, the focal point F2 to which the reflected beam 112a from the second information layer 112 converges by the action of the detection lens 108 is located near the holographic surface 109a of the holographic device 109, as shown in FIG. 3. Even when there are no zone split lines of the holographic surface 109a within the cross section of the reflected beam 112a on the holographic surface 109a, if the diameter D of the cross section of the reflected beam 112a on the holographic surface 109a is smaller than the grating interval L of the holographic device 109, the holographic device 109 does not perform the designed function, and unexpected diffraction of light occurs. This is because the reflected be am 112a falls only on one grooved sloping portion of the holographic device 109 a nd the balance of the diffracted light is disrupted.

Figure 14:
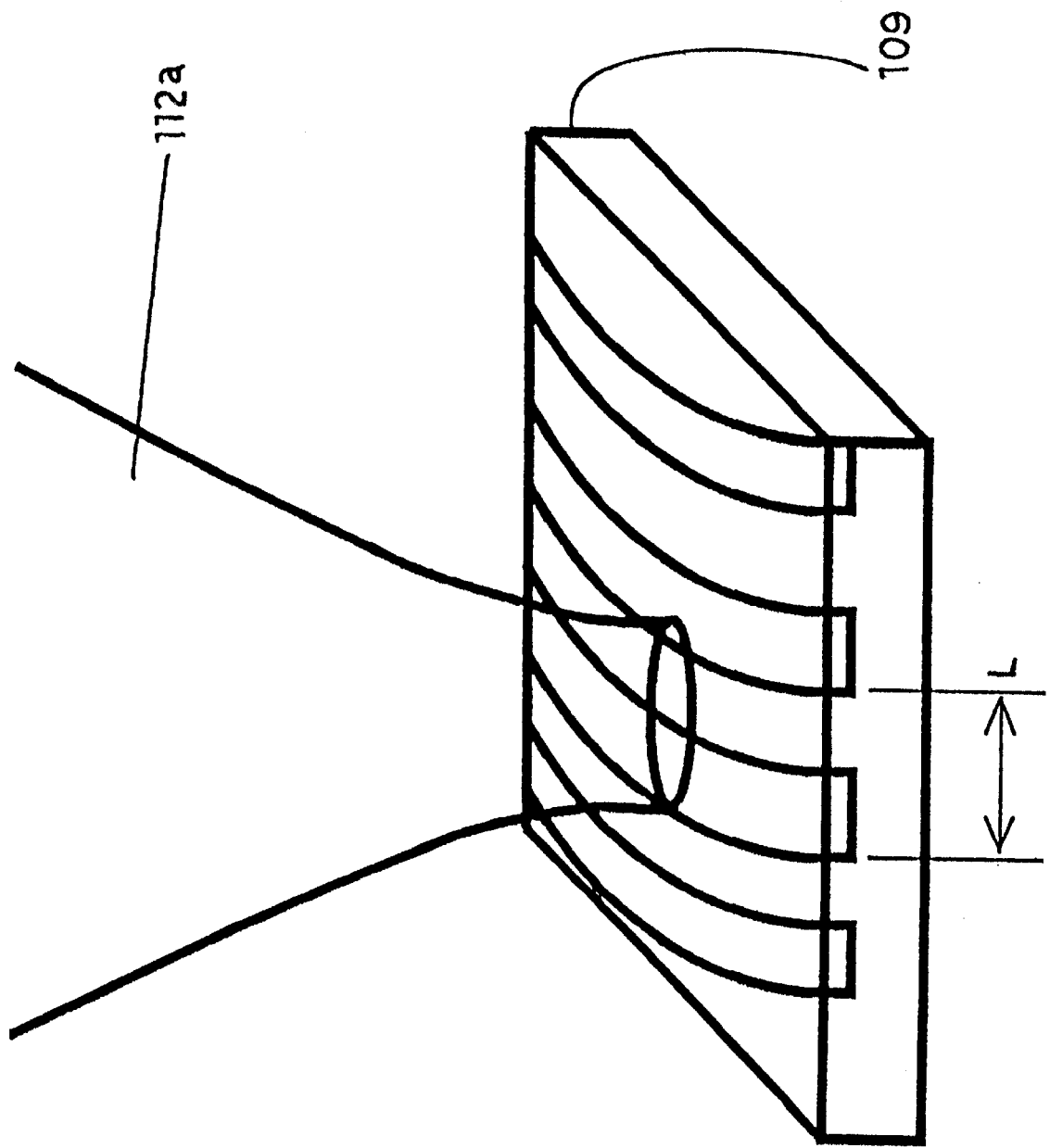
FIG. 14 is a perspective view showing the relationship between the diffraction grating of the holographic device and the cross sectional shape of the beam reflected from the information layer onto the holographic device when the holographic device is located near the focal point of the reflected beam, in an optical head apparatus according to a sixth embodiment of the present invention.

The optical system should, therefore, be designed so that the diameter D of the cross section of the reflected beam 112a, when projected on the holographic surface 109a, becomes larger than the grating interval L of the holographic device 109. FIG. 14 shows a portion of the holographic device 109 and the reflected beam 112a.

If it is assumed that the numerical aperture NA of the detection lens 108 is 0.09 and the wavelength λ of the semiconductor laser 101 is 650 nm, the diameter of the cross section of the reflected beam 112a is about 7 μm at the minimum. There fore, the holographic device 109 should be designed so that the grating interval L is about 7 μm or less. In this case, unexpected diffraction of light can be suppressed regardless of the positional relationship between the holographic surface 109a of the holographic device 109 and the focal point F2 of the reflected beam 112a converged by the detect ion lens 108. In this way, stable focus and/or tracking error signals can be obtained in relation to the reflected beam from the desired information layer. In the prior art construction, where the diameter of the cross section of the reflected beam is smaller than the diffraction grating interval, a defocus of 0.5 μm or larger occurs. On the other hand, in the construction of the present embodiment, the defocus can be held within 0.2 μm. Thus, when the optical information processing apparatus of the present embodiment is used, information recording/reproduction with low error rates can be accomplished.

Alternatively, it is assumed that the grating interval L of the holographic device 109 is about 10 μm. If it is assumed that the numerical aperture NA of the detection lens 108 is 0.09 and the wavelength λ of the semiconductor laser 101 is 650 nm, the diameter of the cross section of the reflected beam 112a on the holographic surface 109a exceeds 10 μm when d=0.11 mm or greater, where d is the distance between the holographic surface 109a and the focal point F2 of the reflected beam 112a converged by the detection lens 108. Therefore, in this case, the distance between the holographic surface 109a of the holographic device 109 and the point K should be made greater at least by 0.11 mm than the case considering the worst value of the optical distance between each layer on the optical disk 105. By so doing, the causes for the occurrence of unexpected light diffraction can be eliminated for any optical disk 105. In this way, stable focus and/or tracking error signals can be obtained in relation to the reflected beam from the desired information layer, and information recording/reproduction with low error rates can thus be accomplished.

In the sixth embodiment, specific numeric values have been assumed for the grating interval L of the holographic device 109, the numerical aperture NA of the detection lens 108, and the wavelength λ of the semiconductor laser 101, but it will be appreciated that the effect of the present invention is not limited to using the specific numeric values assumed here.

In the embodiments described so far, the holographic device 109 is shown as the wavefront converting means, and the semiconductor laser 101 as the light source, unless otherwise noted.

Figure 5:
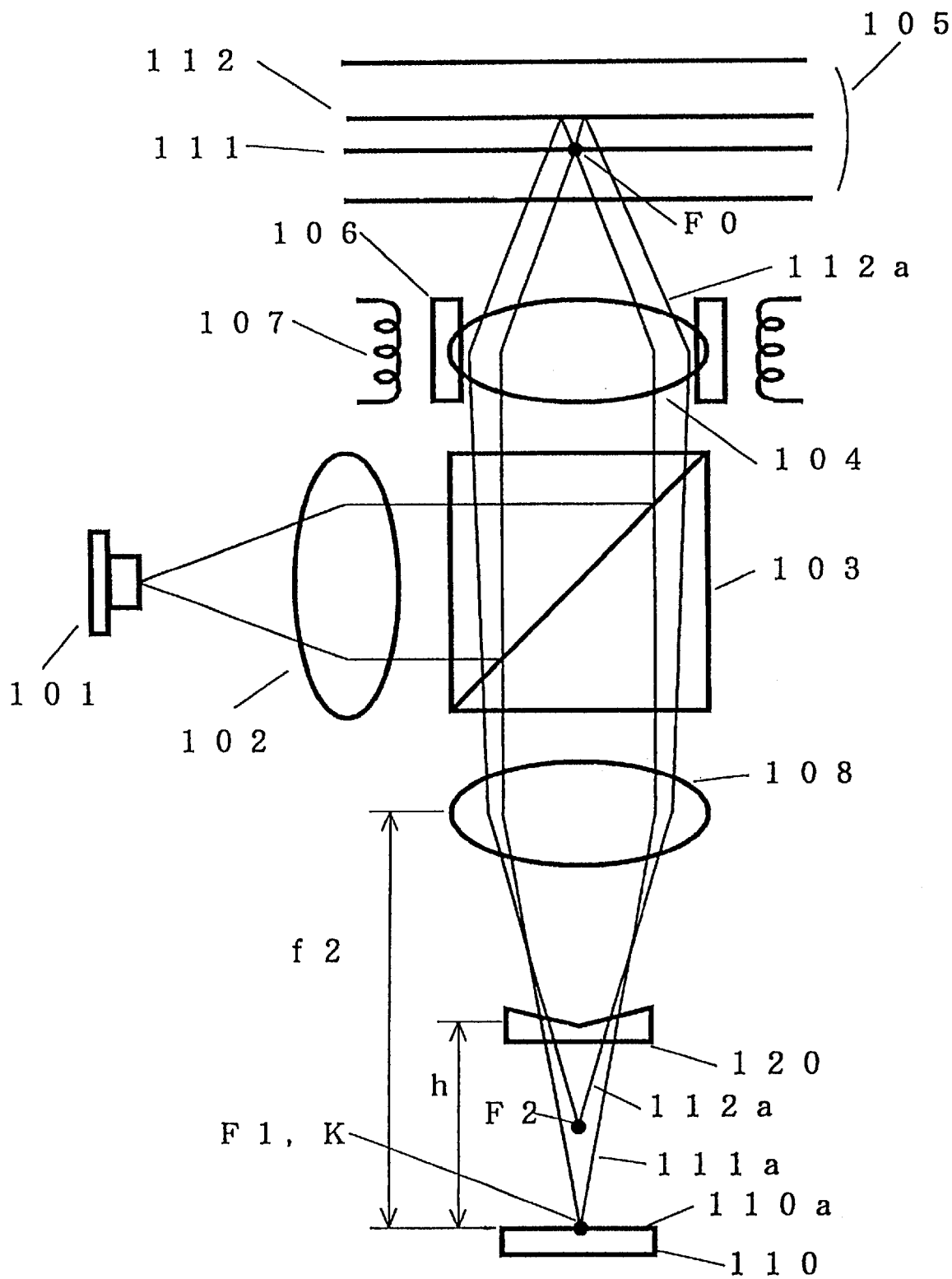
FIG. 5 is a side view showing the optical system when a stepped prism is used in the optical head apparatus according to the first embodiment of the present invention.

A representative example of an optical system in which the wavefront converting means is constructed from a stepped prism 120, not the holographic device 109, is shown in FIG. 5. The reflected beams 111a and 112a, produced by diffraction/reflection at the first information layer 111 or the second information layer 112 on the optical disk 105, are passed through the objective lens 104, the beam splitter 103, and the detection lens 108, and converted by the stepped prism 120 into rays of light from which the focus and/or tracking error signals are detectable.

Even when the stepped prism 120 is used, there are disruptions, etc. at or near the apex and the step, and there still is a stepped region a few micrometers in width where the usual function cannot be expected. Therefore, the optical distance between the stepped prism 120 and the point K should be designed so that when recording/reproducing information on the first information layer 111, the area that the stepped region occupies in the cross sectional area of the reflected beam 112a projected from the second information layer 112 onto the stepped prism 120 is sufficiently reduced. This distance can be determined in the same manner that the distance is determined when the holographic device 109 is used as the wavefront converting means. In this way, according to the present invention, even when the stepped prism 120 is used as the wavefront converting means, stable focus and/or tracking error signals can be obtained, and information recording/reproduction with low error rates can thus be achieved.

Figure 2:
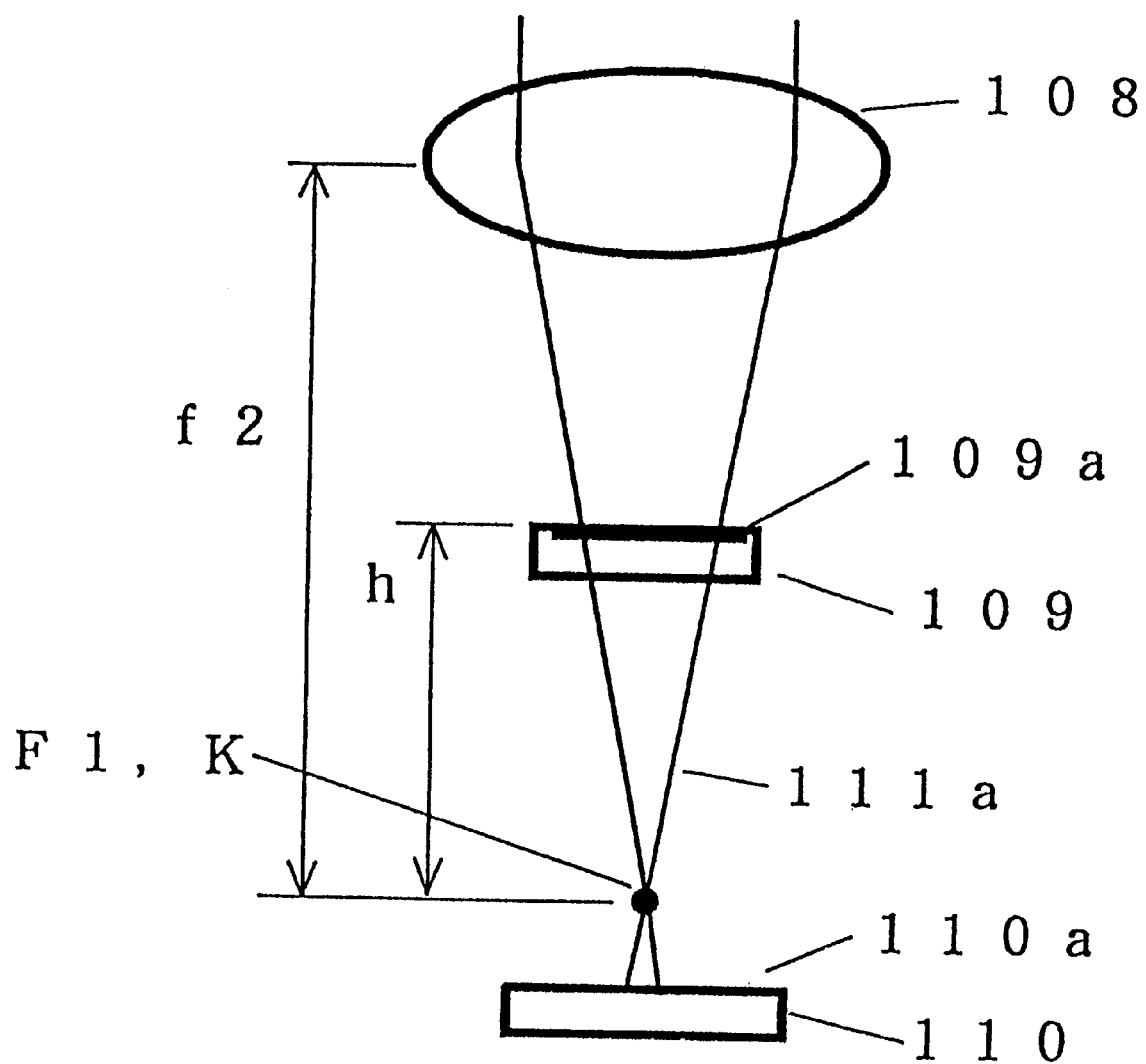
FIG. 2 is a side view showing the optical system near a photodetector in the optical head apparatus according to a first embodiment of the present invention.

The construction where the point K is positioned at the detection surface 110a has been described, as representatively shown in FIG. 1, but the point K need not necessarily be positioned at the detection surface 110a. It will be appreciated that the effect of the present invention can also be obtained if the point K is not positioned at the detection surface 110a, as in the construction shown in FIG. 2.

In the embodiments described so far, the semiconductor laser 101 and the photodetector 110 are provided independently of each other, and light is combined and split by the beam splitter 103; however, the same effect can be obtained in any of the first to sixth embodiments if an LD-PD module is used that combines the semiconductor laser 101 and the photodetector 110 into one unit.

Various type of information layer are assumed, including a read-only information layer formed by transferring microscopic pits and lands onto a substrate of polycarbonate or the like and by evaporating aluminum or the like to provide suitable transmissivity and reflectivity. Others include a recordable information layer formed by depositing a film of a substance whose reflectivity changes according to its crystalline state, a film of a substance whose magnetization direction is controllable, or a film of a dye whose structure changes by heat or light, and an information layer whose refractive index changes according to the structural change of the medium.

The first, second, fourth, fifth, and sixth embodiments of the present invention each have dealt with an optical head apparatus assuming the use of a dual-layer information storage medium, and the third embodiment has dealt with an optical head apparatus assuming the use of a three-layer information storage medium, but it will be appreciated that the present invention is not limited to dual-layer or three-layer information storage media, but is also applicable to multi-layer information storage media having a larger number of information layers.

Multi-layer information storage media having multiple information layers are available in the following structures: in one structure, an information layer is formed on one side of each of a plurality of substrates substantially equal in thickness, and the substrates are laminated together, with the information layers facing each other with an intermediate layer of suitable thickness interposed therebetween, and in the other structure, information layers and intermediate layers are formed one on top of another in alternate fashion on one side of each of a plurality of substrates, and a top protective layer is formed to complete the layered structure.

Embodiment 7

An optical head apparatus and an optical information processing apparatus according to a seventh embodiment of the present invention will be described in which when obtaining a tracking error signal by the phase difference method, the tracking error signal is obtained only from the side where the amount of light is smaller, as taken in the tangential direction of the track.

Figure 15:
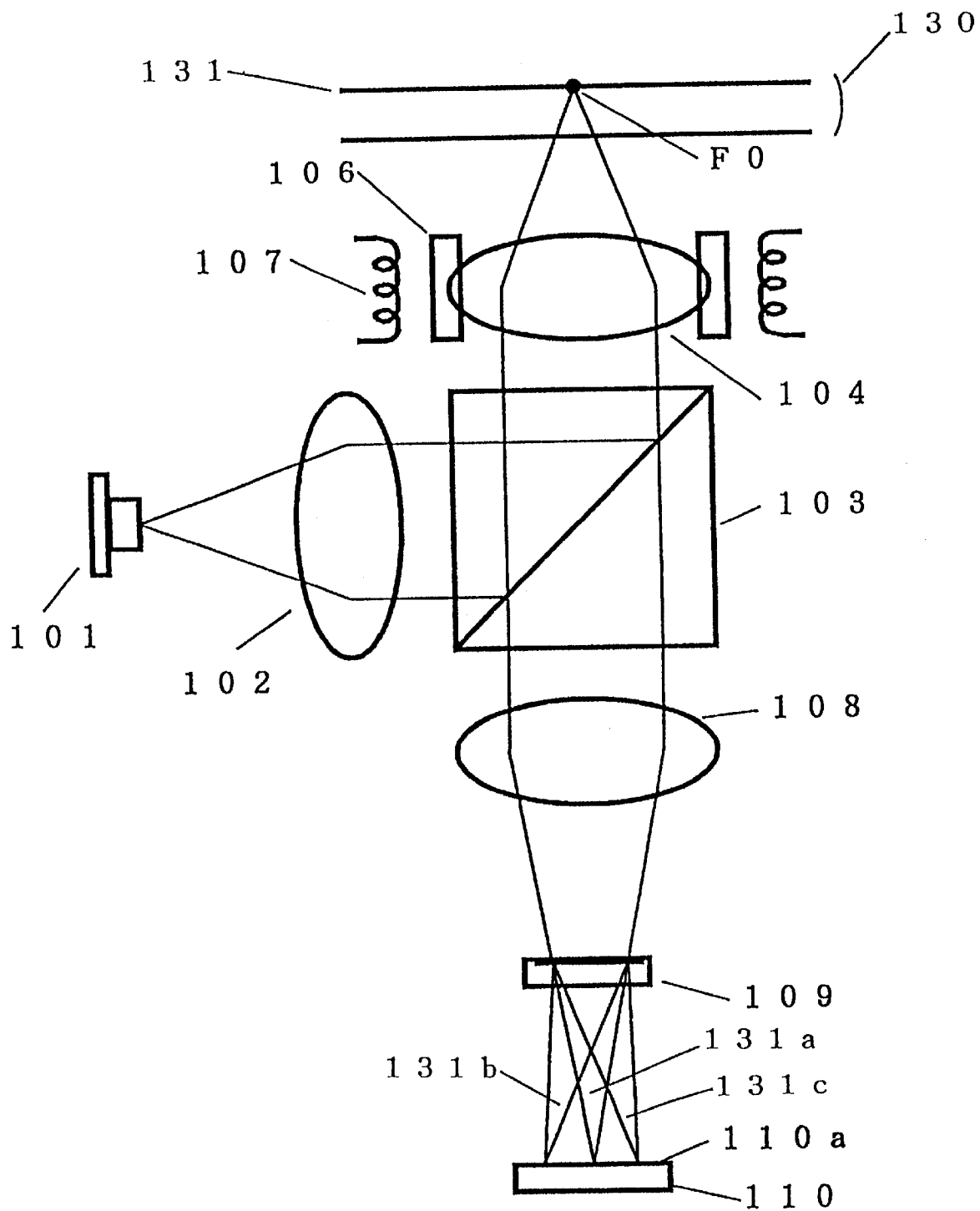
FIG. 15 is a diagram showing the essential parts of the optical system of an optical head apparatus according to seventh and eighth embodiments of the present invention.
Figure 16:
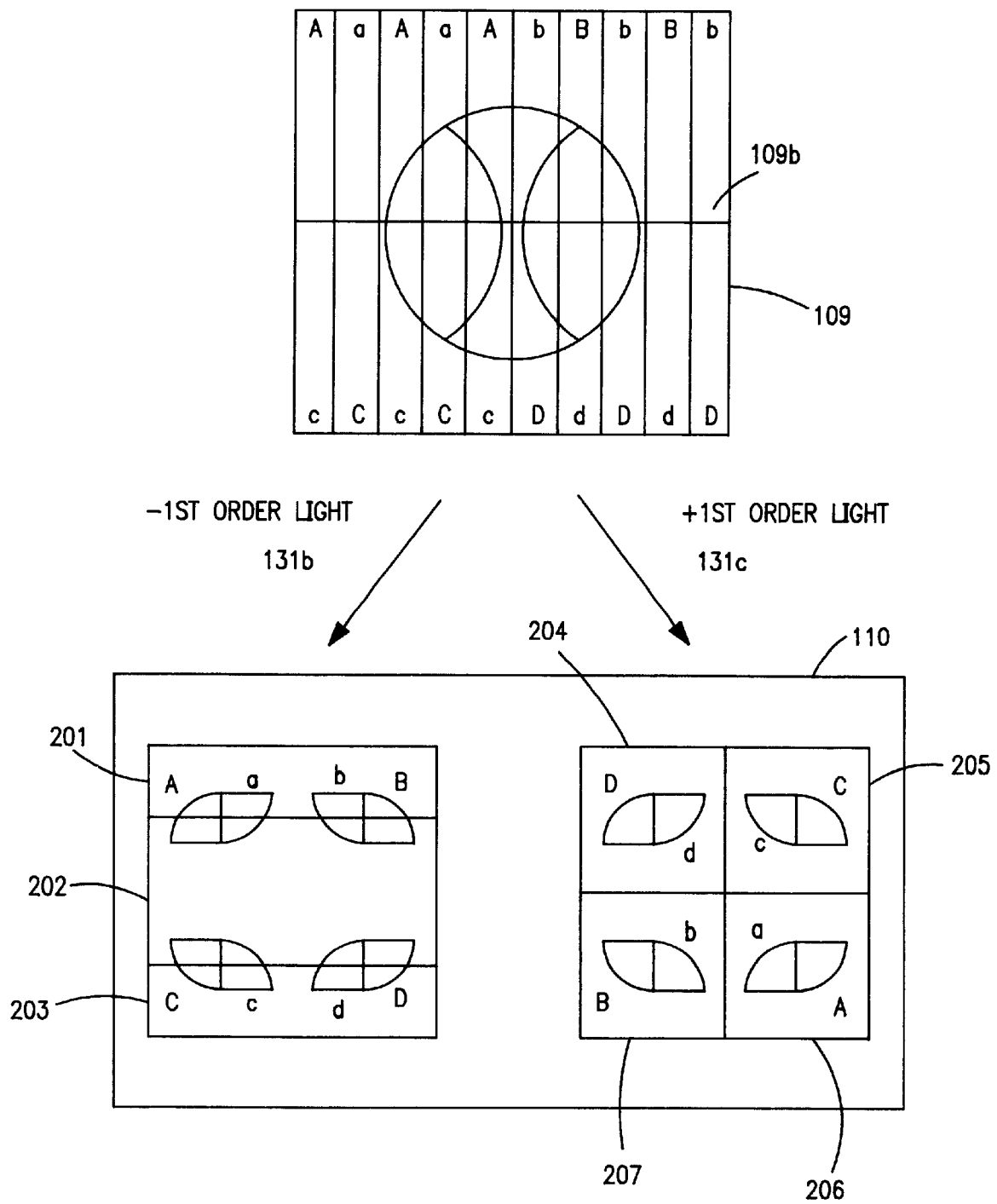
FIG. 16 is a diagram showing the relationship between the zone splitting of the holographic device and the cross sections of diffracted rays of light on the photodetector in the optical head apparatus according to the seventh and eighth embodiments of the present invention.
Figure 32:
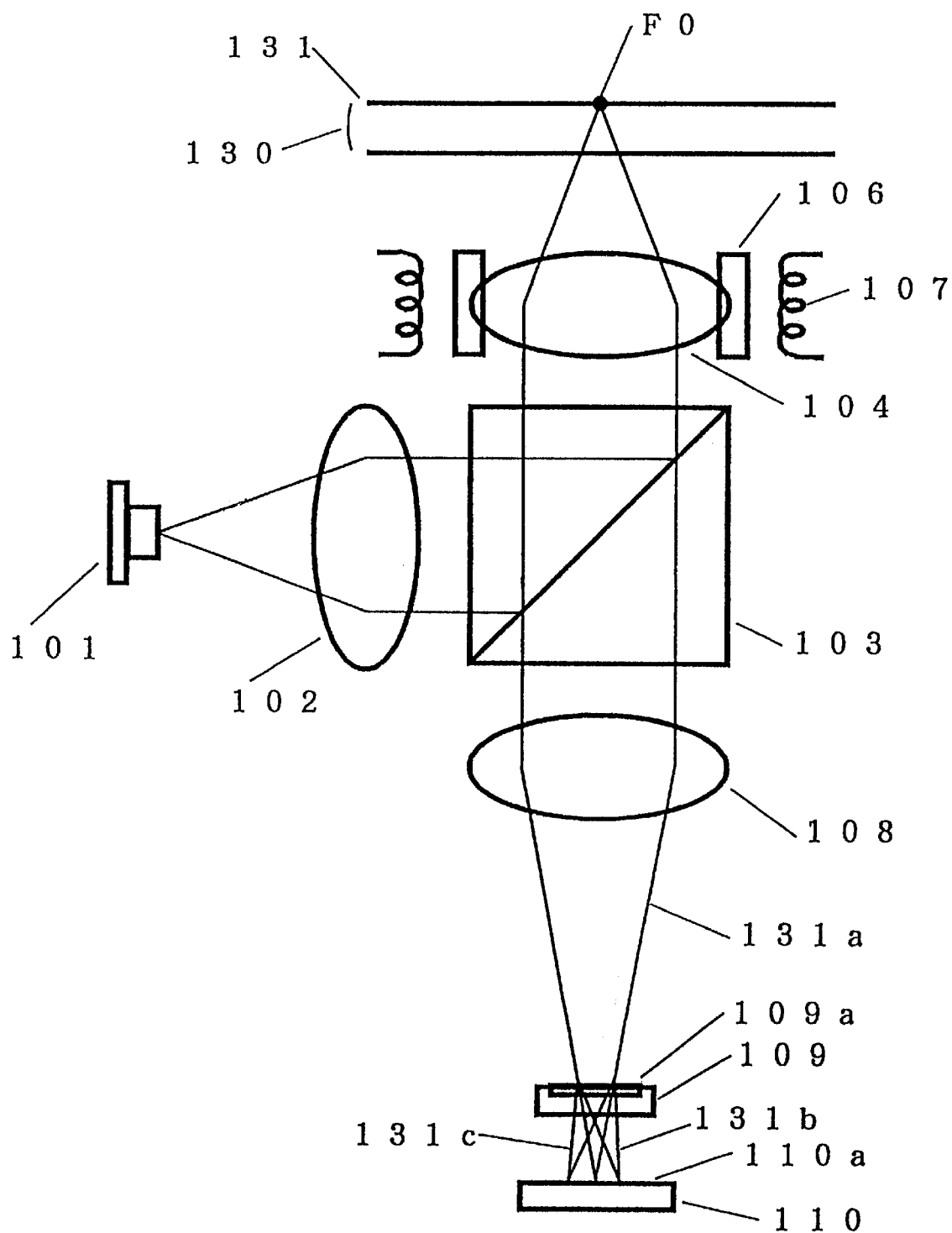
FIG. 32 is a side view showing the optical system of an optical head apparatus according to a prior art example.
Figure 33:
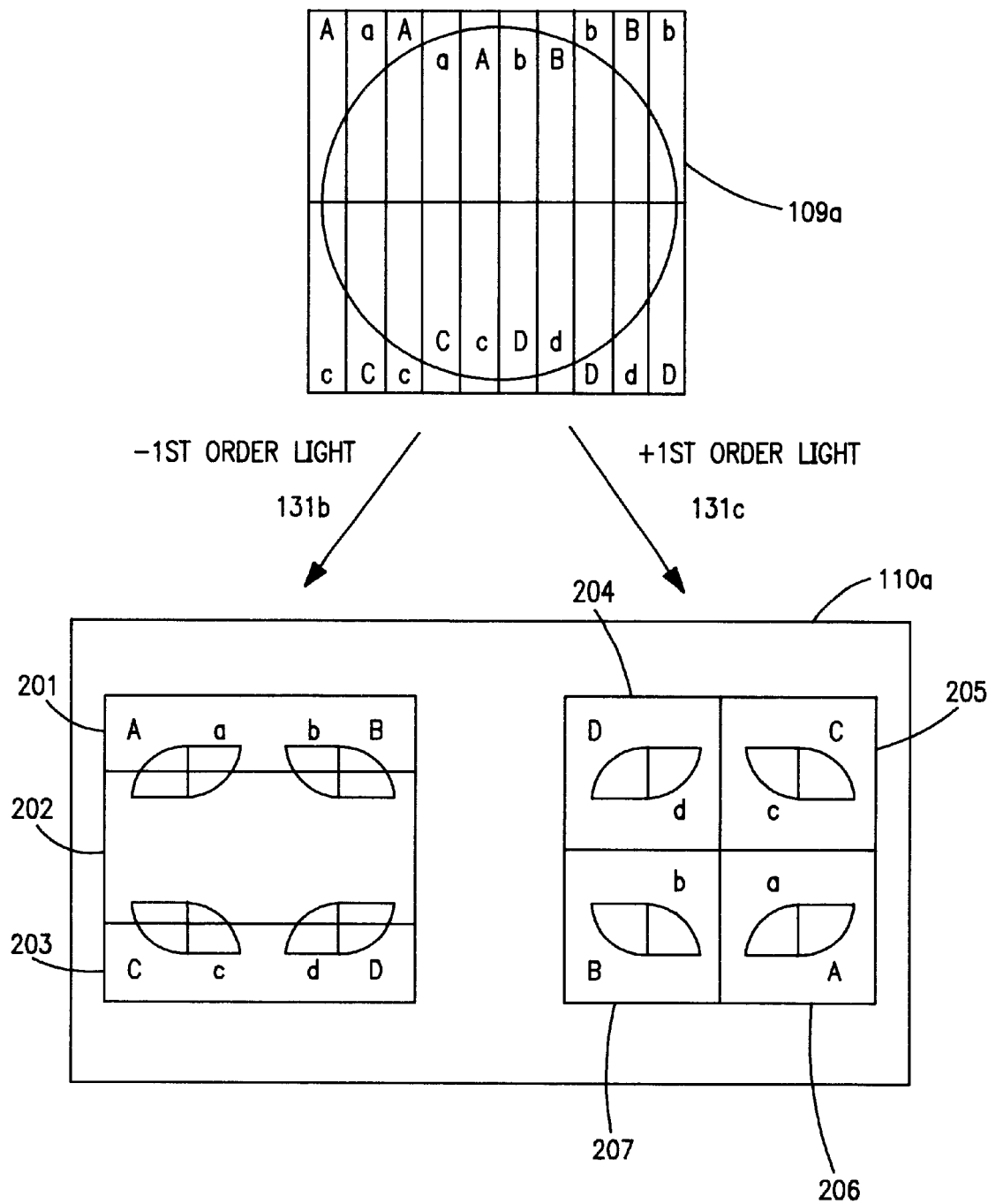
FIG. 33 is a diagram showing the relationship between the zone splitting of the holographic device and the cross sections of diffracted rays of light on the photodetector in the optical head apparatus according to the prior art example.
Figure 34:
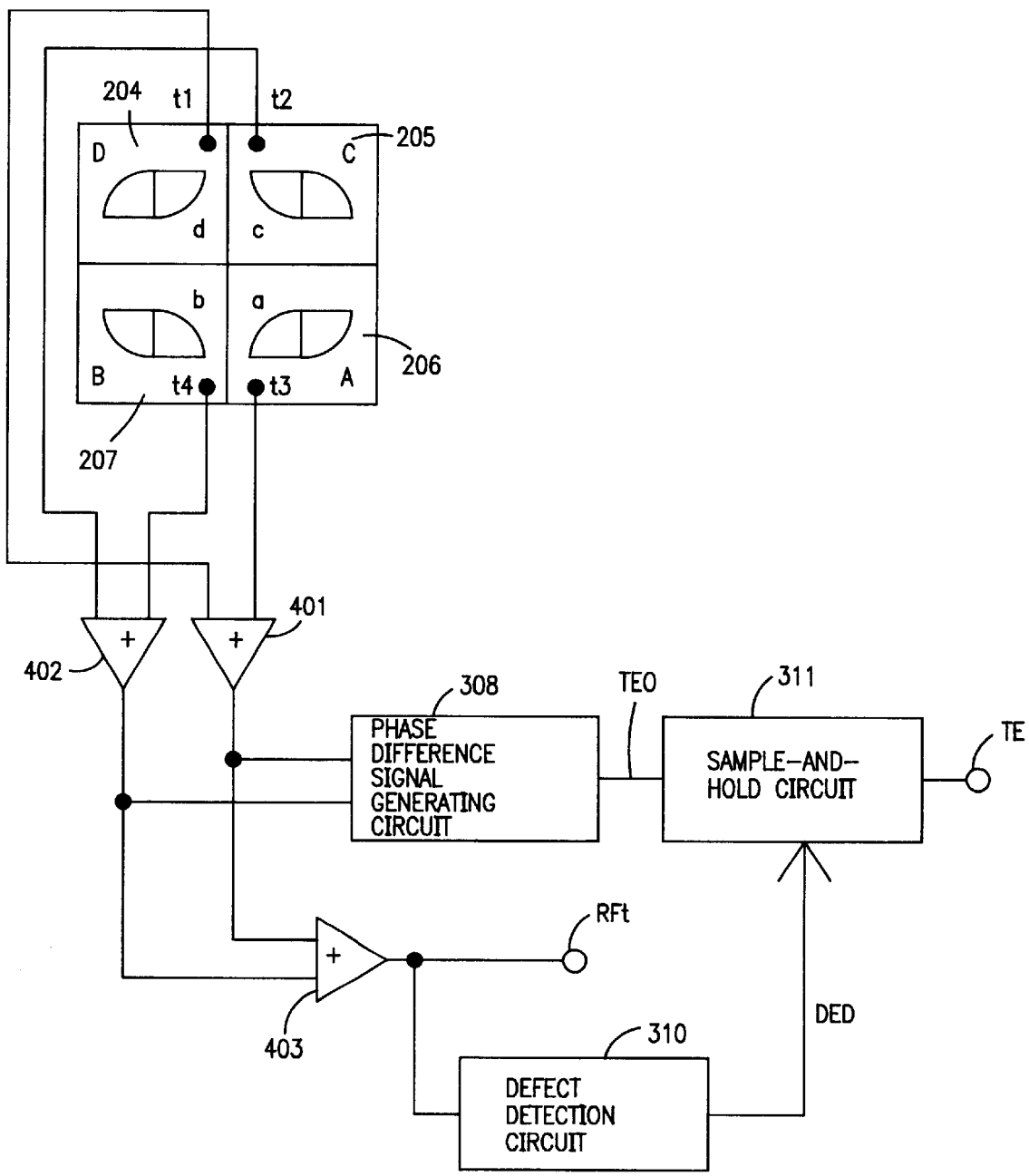
FIG. 34 is a diagram showing the circuit configuration of tracking error signal and defect detection circuits for the optical head apparatus according to the prior art example.

FIG. 15 shows a side view of the optical system according to the seventh embodiment. The construction is the same as that described in the prior art example of FIG. 32, and a detailed description will not be given here. FIG. 16 shows a schematic view of the holographic device 109 and the photodetector 110. FIG. 16 also shows the cross section of the reflected beam 131a from the information surface 131 and the cross sections of the "1st order diffracted rays of light 131b and 131c generated by the holographic device 109 and projected on the detection surface 110a. A detailed description of FIG. 16 will not be given here as it is essentially the same as FIG. 33 explained in the prior art example. Also, the construction of the optical information processing apparatus is the same as that shown in the prior art example of FIG. 35, and will not be described in detail here.

Figure 17:
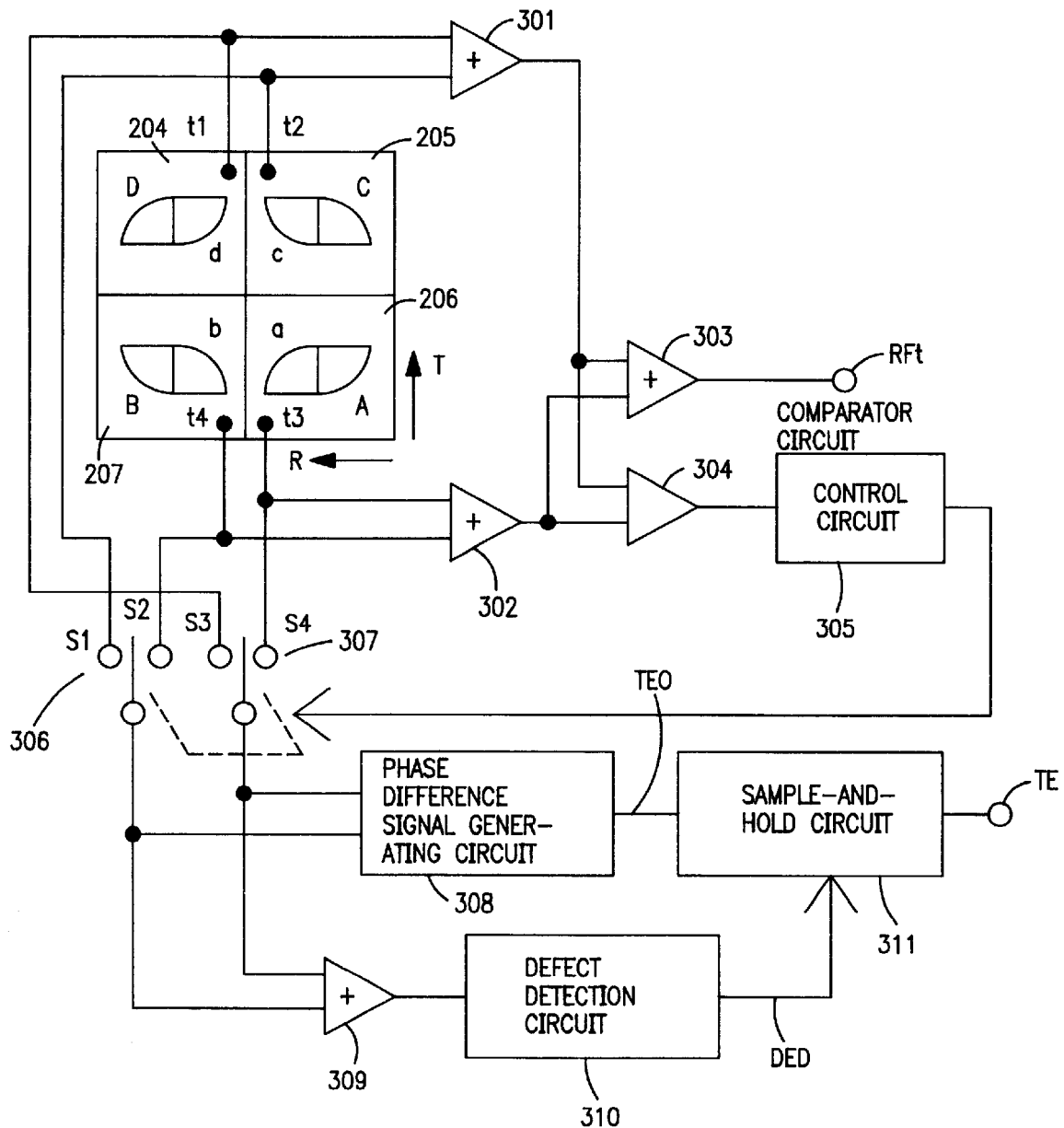
FIG. 17 is a diagram showing the circuit configuration of tracking error signal and defect detection circuits for the optical head apparatus according to the seventh embodiment of the present invention.

FIG. 17 shows a circuit configuration for obtaining the tracking error signal according to the seventh embodiment of the present invention, as well as a circuit configuration for defect detection. An adder 301 takes as inputs the signals t1 and t2 obtained according to the amounts of light received at the detection regions 204 and 205 of the photodetector 110, and outputs a signal representing their sum. An adder 302 takes as inputs the signals t3 and t4 obtained according to the amounts of light received at the detection regions 206 and 207, and outputs a signal representing their sum. An adder 303 takes as inputs the output signals of the adders 301 and 302 and outputs a signal representing their sum. The output signal of the adder 301 is derived as the RF signal RFt.

A comparator circuit 304 takes as inputs the output signals of the adders 301 and 302, extracts, from the input signals, signals lying in the frequency band lower than the frequency band of the RF signal, compares the low frequency components of the two input signals, and outputs the result of the comparison.

A control circuit 305 accepts the output signal of the comparator circuit 304 and controls switches 306 and 307. The switch 306 takes the signal t2 at a contact s1 and the signal t4 at a contact s2, and outputs either one of the signals, t2 or t4, depending on its switched state. The switch 307 takes the signal t1 at a contact s3 and the signal t3 at a contact s4, and outputs either one of the signals, t1 or t3, depending on its switched state.

The control circuit 305 performs control so that the switch 306 is connected to the contact s2 and the switch 307 to the contact s4 when the low frequency component of the output signal of the adder 301 is greater than that of the output signal of the adder 302. On the other hand, when the low frequency component of the output signal of the adder 301 is smaller than that of the output signal of the adder 302, the switch 306 is connected to the contact s1 and the switch 307 to the contact s3. That is, the low frequency component of the sum signal of t1 and t2 is compared with that of the sum signal of t3 and t4, and the signals whose sum is smaller than the other sum are output from the switches 306 and 307.

The output signals from the switches 306 and 307 are fed to a phase difference signal generating circuit 308 which detects the temporal phase difference between them and outputs the tracking error signal TE0. The output signals from the switches 306 and 307 are also supplied to an adder 309 which outputs a signal representing their sum.

A defect detection circuit 310 takes the output signal of the adder 309 and outputs a defect detection signal DED. The defect detection signal DED is output when the input RF signal drops in the frequency band lower than the frequency band of the signal recorded on the optical disk 130 because of contamination, etc. of the surface of the optical disk 130.

A sample-and-hold circuit 311 takes the tracking error signal TE0 output from the phase difference signal generating circuit 308 and, when the defect detection signal DED indicates a defect detected state, outputs the tracking error signal TE0 held therein that was taken immediately before entering the defect detected state; on the other hand, when the signal DED indicates a no-defect detected state, the input signal TE0 is directly output.

Figure 18:
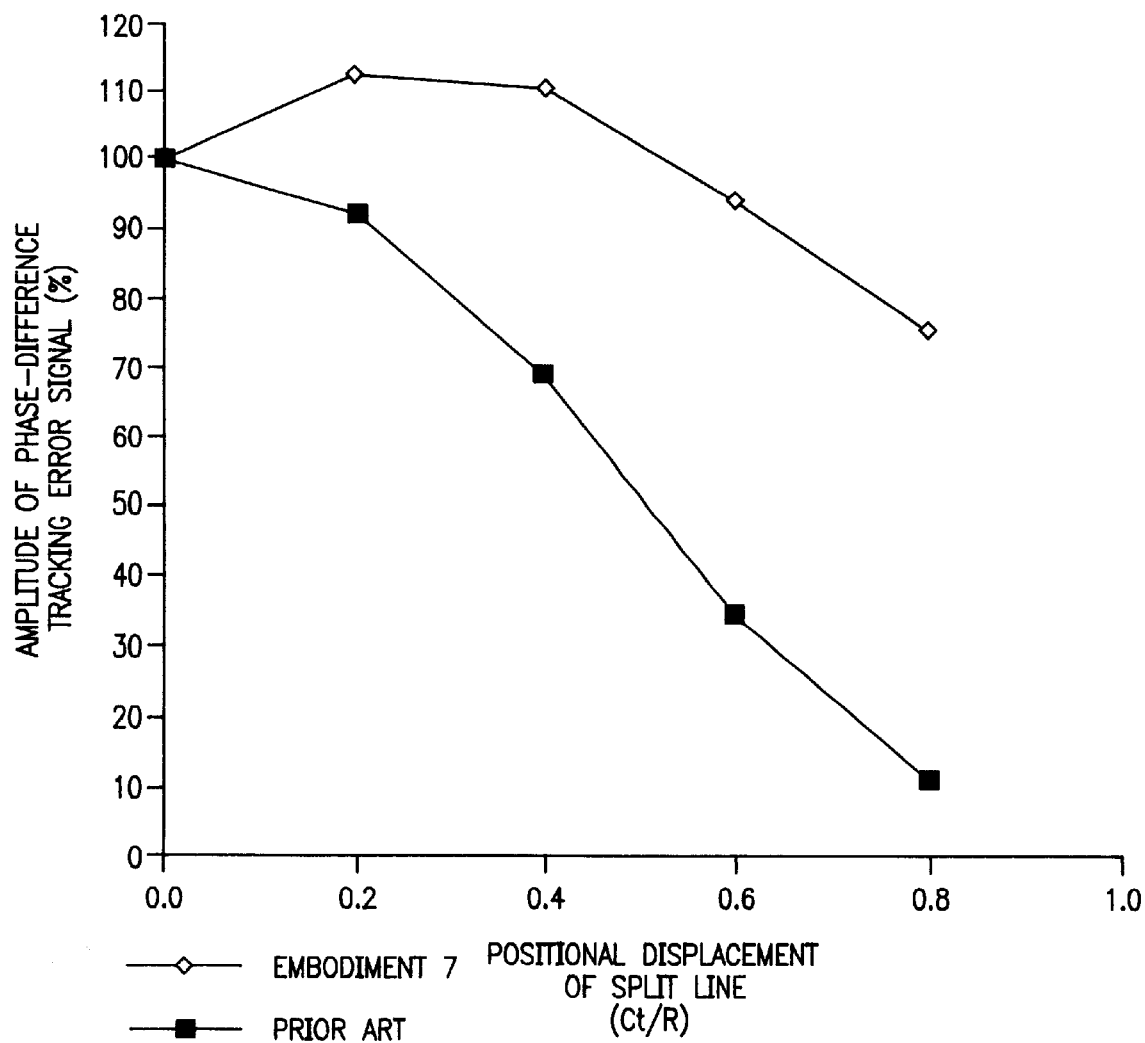
FIG. 18 is a diagram showing the amplitude variation of the tracking error signal versus the positional displacement of a split line for comparison between the seventh embodiment of the present invention and a prior art example.

FIG. 18 shows the relationship between the amplitude of the tracking error signal obtained by the phase difference method and the positional displacement, in the tangential direction of the track, of the split line 109b substantially perpendicular to the tangential direction of the track, relative to the reflected beam 131a. Here, a DVD disk is assumed for the optical disk 130 and a DVD optical head as the optical head apparatus, and the displacement of the split line 109b in the tangential direction, when the beam is correctly focused on the track, is plotted along the abscissa and the amplitude of the tracking error signal obtained by the phase difference method is plotted along the ordinate.

The positional displacement of the split line 109b is expressed as a ratio to the radius of the cross section of the reflected beam 131a measured in the tangential direction. The amplitude of the tracking error signal is specified as 100% when the split line 109b is free from positional displacement and passes through the center of the cross section of the reflected beam 131a.

As shown in FIG. 18, in the prior art example the amplitude of the tracking error signal drops to 70% when the positional position of the split line 109b is 0.4 relative to the radius in the tangential direction. On the other hand, in the seventh embodiment, even if the split line 109b exhibits a positional displacement of 0.4 relative to the radius in the tangential direction, the amplitude of the tracking error signal does not drop, or rather increases, and for a displacement of 0.6, the amplitude can be maintained at 90% or higher. That is, in the seventh embodiment, the variation of the amplitude of the tracking error signal is small, as shown in FIG. 18. This means that the tracking error signal is detected with good sensitivity even if the displacement of the split line 109b in the tangential direction, when the beam is correctly focused on the track, is large.

As described above, since the amount of decrease in the amplitude of the tracking error signal can be reduced when the split line 109b is displaced, the seventh embodiment offers the enormous advantage that tracking control can be performed stably. This ensures information recording/reproduction on an optical disk at low error rates. This means that the assembling accuracy of the optical head apparatus can be eased. This technique reduces the number of assembling steps through the omission of adjustment steps and eases assembly accuracy, etc., and cost reductions can thus be achieved without compromising the performance of the optical head apparatus.

Furthermore, in the optical information processing apparatus of the seventh embodiment, since the regions from which to obtain the phase-difference tracking error signal are dynamically switched, the effect of the present invention can be obtained in the presence of not only a split position displacement due to initial adjustment errors, etc. but also a split position displacement due to variation over time.

Further, in the optical information processing apparatus of the seventh embodiment, only the signals that are used for the generation of the tracking error signal are used as signals input to the defect detection circuit 310. If the total light amount is used to detect a defect, as in the prior art example, the tracking error signal will be influenced by the defect before the sum signal of the total light amount is influenced, and if such a tracking error signal is held, it is not possible to suppress the influence of the defect. In a configuration in which the tracking error signal is obtained using part of the light, as in the seventh embodiment, this problem can be solved if defect detection is performed using only the signals obtained from the detection regions from which the tracking error signal is obtained. In this case, stable tracking control can be accomplished even if there are dust particles or the like adhering to the optical disk surface.

In the present embodiment, only the tracking error signal is held, but if the focus error signal is held at the same time by using the output signal of the defect detection circuit, an out of focus condition can be prevented from occurring due to a defect. In this case, stable tracking control and stable focus control can be achieved at the same time.

Further, the semiconductor laser 101 as the light source is provided separately from the photodetector 110, and light is combined and split using the beam splitter 103, but the effect of the present embodiment can be equally obtained if an LD-PD module is used that combines the semiconductor laser 101 and the photodetector 110 into one unit.

In the present embodiment, the holographic device is used as the beam splitting means, but other means may be used.

Figure 19:
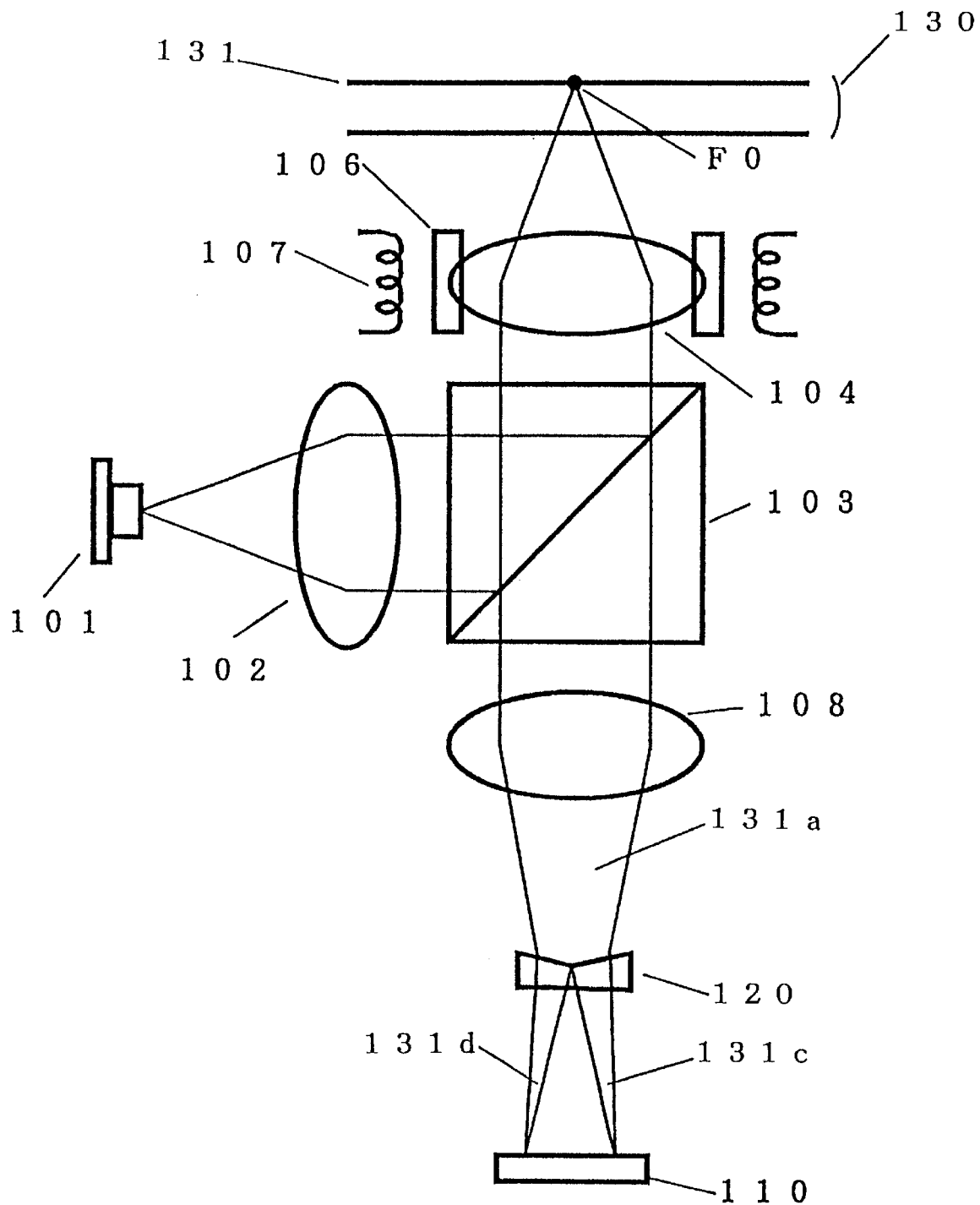
FIG. 19 is a diagram showing the essential parts of another example of the optical system of the optical head apparatus according to the seventh embodiment of the present invention.

FIG. 19 shows a side view of an optical system that uses a stepped prism 120 as the beam splitting means. To describe briefly, the reflected beam 131a from the information layer 131 is split by the stepped prism 120 into split beams 131d and 131e, which are received by the photodetector 110. In the case of this optical system also, the same effect as obtained with the optical system of FIG. 15 can be obtained if it is combined with the circuitry of the seventh embodiment.

Embodiment 8

An optical head apparatus and an optical information processing apparatus according to an eighth embodiment of the present invention will be described below. In this embodiment, the switches in the seventh embodiment are replaced by jumper switches.

Figure 20:
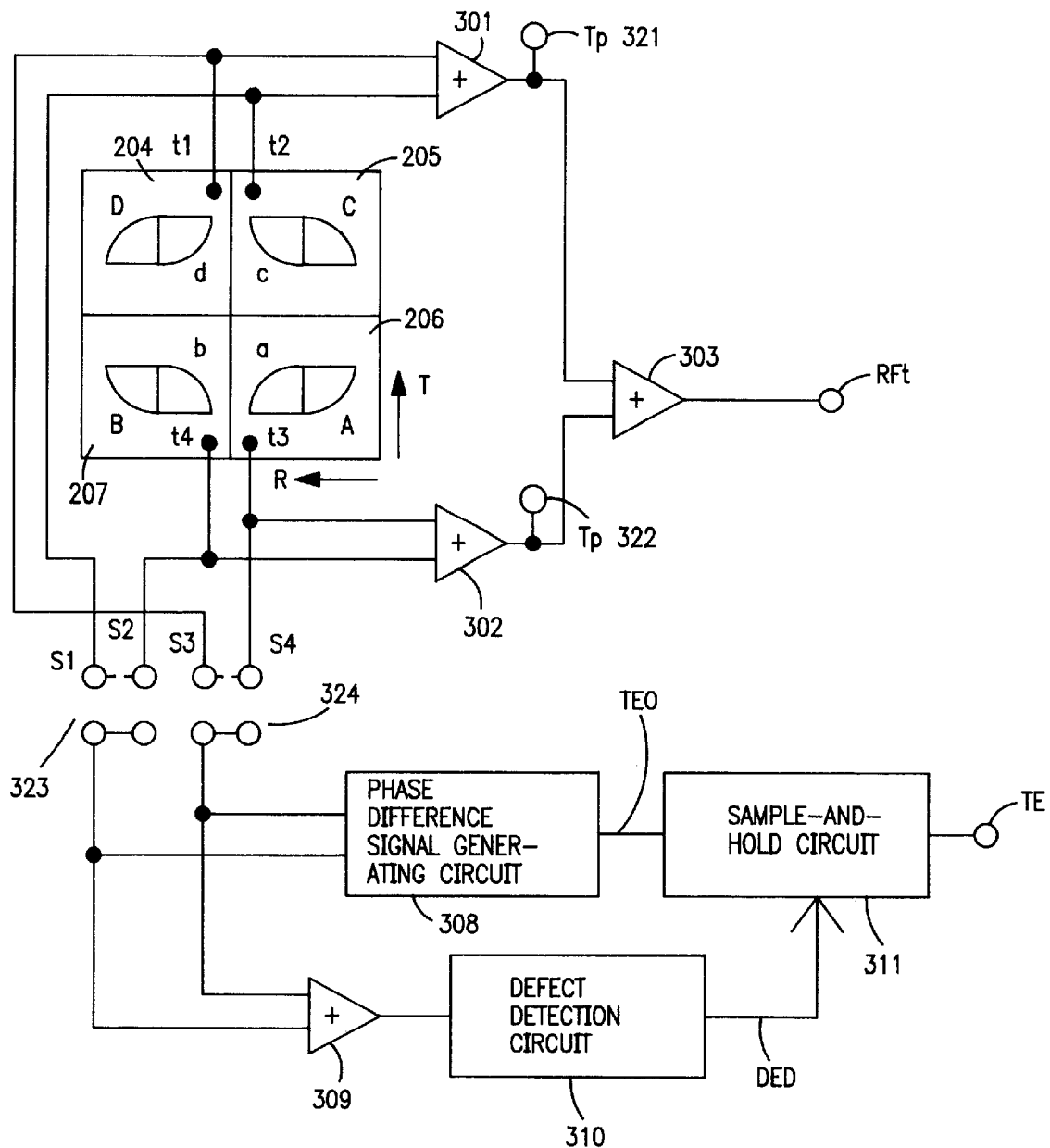
FIG. 20 is a diagram showing the circuit configuration of tracking error signal and defect detection circuits for the optical head apparatus according to the eighth embodiment of the present invention.

FIG. 20 shows the circuit configuration of the eighth embodiment. Elements that are functionally the same as those in the seventh embodiment are designated by the same reference characters.

The adder 301 takes as inputs the signals t1 and t2 obtained according to the amounts of light received at the detection regions 204 and 205 of the photodetector 110, and outputs a signal representing their sum. The adder 302 takes as inputs the signals t3 and t4 obtained according to the amounts of light received at the detection regions 206 and 207, and outputs a signal representing their sum.

The output signal of the adder 301 is obtained at test point Tp 321 and the output signal of the adder 302 at test point Tp 322. The adder 303 takes as inputs the output signals of the adders 301 and 302 and outputs a signal representing their sum. This output signal is derived as the RF signal RFt.

The jumper switch 323 takes the signal t2 at the contact s1 and the signal t4 at the contact s2, and outputs either one of the signals, t2 or t4, depending on the jumper wire position. The jumper switch 324 takes the signal t1 at the contact s3 and the signal t3 at the contact s4, and outputs either one of the signals, t1 or t3, depending on the jumper wire position. The jumper wire positions in the jumper switches 323 and 324 are determined by actually playing back an optical disk at the time of assembling the optical head apparatus, and by comparing the signals obtained at the test points Tp321 and Tp322.

When the low frequency component of the signal at the test point Tp321 is greater than that of the signal at the test point Tp322, the jumper wire in the jumper switch 323 is installed so that the contact s2 is connected to the output terminal, and the jumper wire in the jumper switch 324 is installed so that the contact s4 is connected to the output terminal. On the other hand, when the low frequency component of the signal at the test point Tp321 is smaller than that of the signal at the test point Tp322, the jumper wire in the jumper switch 323 is installed so that the contact s1 is connected to the output terminal, and the jumper wire in the jumper switch 324 is installed so that the contact s3 is connected to the output terminal. That is, the low frequency component of the sum signal of t1 and t2 is compared with that of the sum signal of t3 and t4, and the signals whose sum is smaller than the other sum are output from the jumper switches 323 and 324.

The phase difference signal generating circuit 308 accepts at its inputs the output signals from the jumper switches 323 and 324, detects the temporal phase difference between them, and outputs the tracking error signal TE0. The operation of the defect detection circuit 310 and the sample-and-hold circuit 311 is the same as that described in the seventh embodiment and, therefore, will not be described in detail here.

The eighth embodiment thus eliminates the need for the comparator circuit 308 and the control circuit 305 as used in the seventh embodiment, and simplifies the circuitry. Since the jumper switches are configured according to the setting errors at the time of assembling the optical head apparatus, the same effect as achieved in the seventh embodiment can be obtained.

Further, since the displacement of the split line 109b occurs mostly at the time of assembling the optical head apparatus, a stable tracking error signal can be obtained by once setting the circuitry according to the inherent displacement of the optical head apparatus when the optical head apparatus is connected to the circuitry. This provides an enormous advantage without increasing the burden of the circuitry. As for the defect detection circuit, the description given in the seventh embodiment applies here and, therefore, will not be repeated.

Accordingly, when the jumper switches are used instead of the switches, as in the optical information processing apparatus of the present invention, the same effect as achieved in the seventh embodiment can be obtained by performing defect detection using only the signals that are used for the generation of the tracking error signal.

Embodiment 9

An optical head apparatus and an optical information processing apparatus according to a ninth embodiment will be described. In this embodiment, the beam splitting means is configured to diffract only one half of the beam falling thereon. Elements that are functionally the same as those in the foregoing embodiments are designated by the same reference characters.

Figure 21:
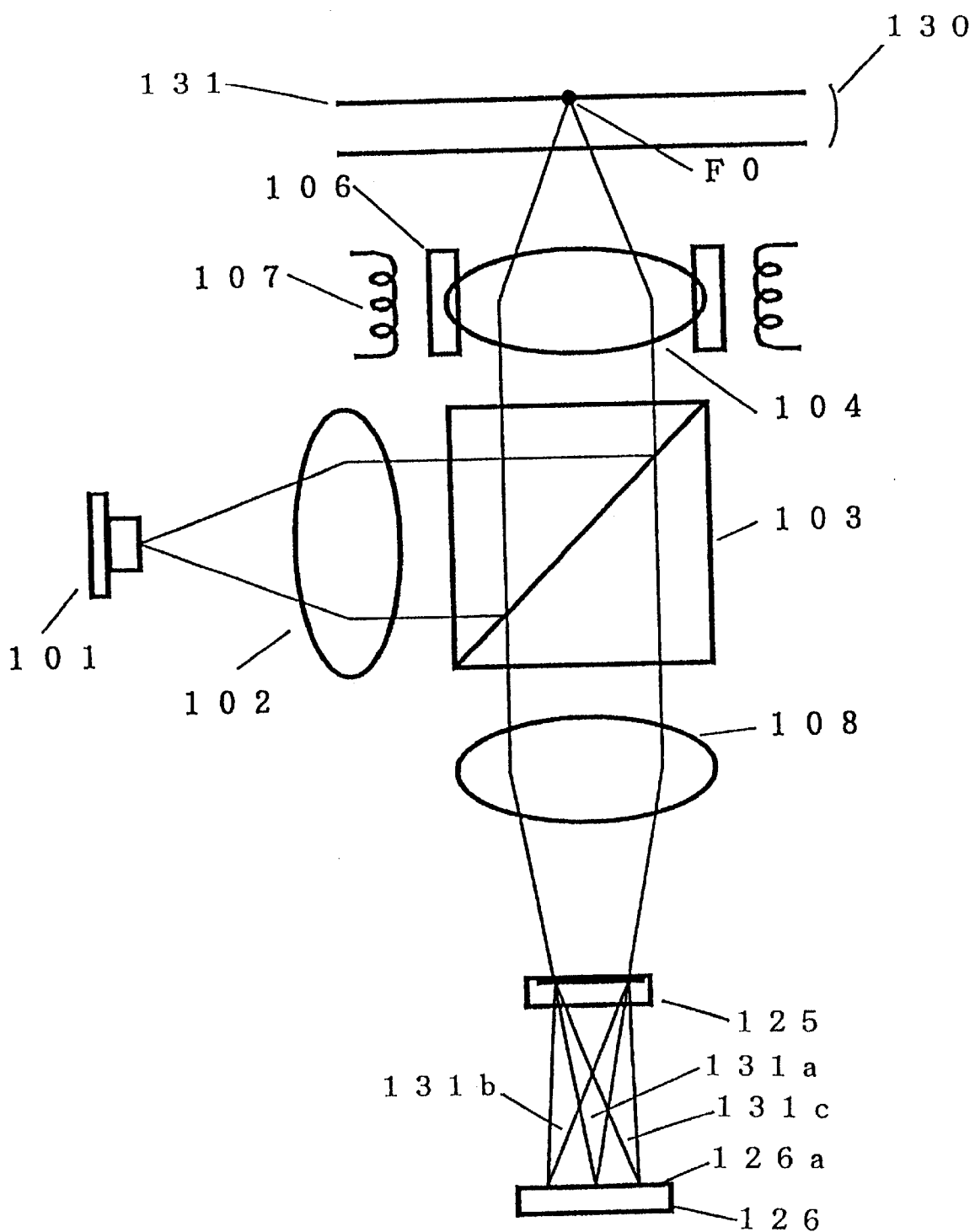
FIG. 21 is a diagram showing the essential parts of the optical system of an optical head apparatus according to a ninth embodiment of the present invention.

FIG. 21 shows a side view of the optical system according to the ninth embodiment. The basic operation is the same as that of the seventh embodiment shown in FIG. 15, and will not be described in detail here. The reflected beam 131a is diffracted by the holographic device 125, and the diffracted light is received by the photodetector 126.

Figure 22:
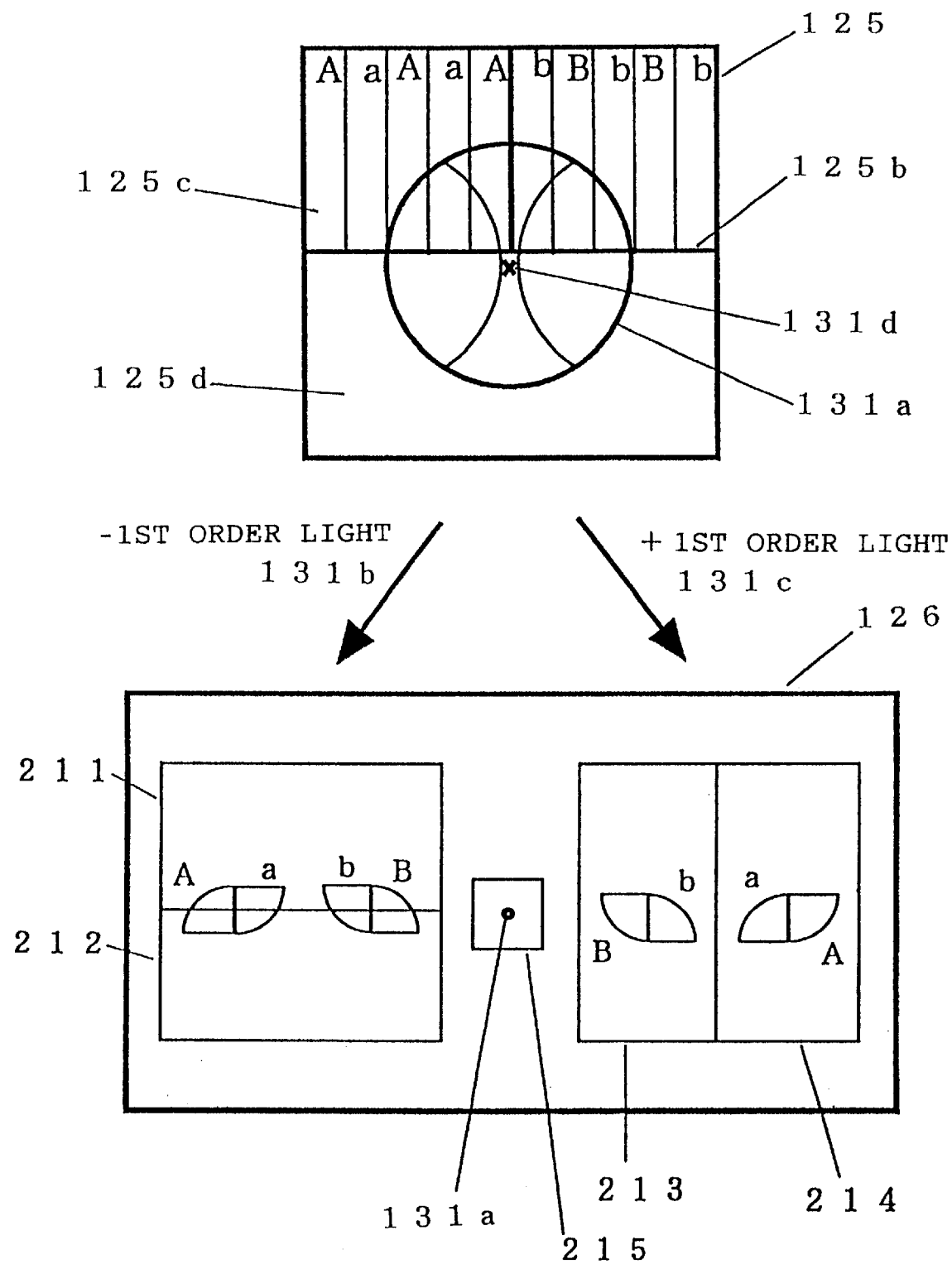
FIG. 22 is a front view showing the relationship between the zone splitting of the holographic device and the cross sections of diffracted rays of light on the photodetector in the optical head apparatus according to the ninth embodiment of the present invention.

FIG. 22 shows the zone splitting pattern of the holographic device 125 and the detection region pattern of the photodetector 126 according to the ninth embodiment. The holographic device 125 is split into two regions 125c and 125d by a split line 125b substantially perpendicular to a tangent line to the track on the optical disk 130. A holographic diffraction grating is formed in the region 125c, and the reflected beam 131a falling on this region generates diffracted rays of light 131b and 131c. The diffraction grating is not formed in the region 125d, so that the reflected beam 131a passes through it without diffraction and falls on a detection region 215 of the photodetector 126. The −1st order diffracted light 131b, diffracted by the region 125c, is used for the detection of the focus error signal, and the +1st order diffracted light 131c is used for the detection of the tracking error signal.

Symbols attached to the respective zones correspond to the symbols attached to the cross sections of the diffracted rays on the photodetector 126 in FIG. 22. The −1st order diffracted light 131b generated from the zones with the uppercase characters A and B is brought to a focus rearwardly of the detection surface 126a of the photodetector 126, as viewed from the detection lens 108. On the other hand, the −1st order diffracted light 131b generated from the zones with the lowercase characters a and b is brought to a focus forwardly of the detection surface 126a of the photodetector 126, as viewed from the detection lens 108. The holographic device 125 is so designed that when the focal point F0 of the objective lens 104 is at the information surface 131 of the optical disk 130, the detection spot designated by each uppercase character on the photodetector 126 is equal in size to the detection spot designated by each lowercase character.

Signals obtained according to the amounts of light received at the detection regions 211 and 212 are denoted by f1 and f2, respectively. The focus error signal FE is then obtained by calculating the equation $$FE = f1 - f2$$

The +1st order diffracted light 131c is detected at the detection regions 213 and 214. Signals obtained according to the amounts of light received at the detection regions 213 and 214 of the photodetector 126 are denoted by t1 and t2, respectively. The tracking error signal TE according to the phase difference method is then obtained by comparing the temporal phase of the signal t1 with that of the signal t2.

The RF signal for reproducing information is given by $$RF = f1 + f2 + t1 + f2 + s0$$

In the ninth embodiment, the optical system is designed so that the principal ray 131d parallel to the optical axis of the reflected beam 131a and passing through the center of the objective lens 104 as a converging optical system will not fall on the region 125c. With this design, the tracking error signal is generated from the smaller half portion of the reflected beam 131a split along the split line 125b.

In this case, since the amount of light falling on the region 125c is smaller than the amount of light falling on the region 125d, the variation of the amplitude of the tracking error signal is small for the positional displacement of the reflected beam 131a relative to the split line 125b, as previously shown in FIG. 18 in the seventh embodiment, and stable tracking control can thus be achieved. Accordingly, the optical information processing apparatus of the present embodiment can record/reproduce information at low error rates.

Further, since the above design allows a greater margin for positional displacement, the effect is that the setting accuracy of the holographic device 125 and the adjustment accuracy of the optical system can be relaxed, and cost reductions can thus be achieved without compromising the performance of the optical head apparatus.

In the ninth embodiment, a holographic device is used as the beam spitting means, but it will be appreciated that the same effect can be obtained if a beam splitting means such as a stepped prism is used.

Embodiment 10

An optical head apparatus and an optical information processing apparatus according to a 10th embodiment will be described. In this embodiment, astigmatism is used as the method of obtaining the focus error signal, and the phase difference as the method of obtaining the tracking error signal, and the beam is split by the split lines of the detection regions of the photodetector. Elements that are functionally the same as those in the foregoing embodiments are designated by the same reference characters.

Figure 23:
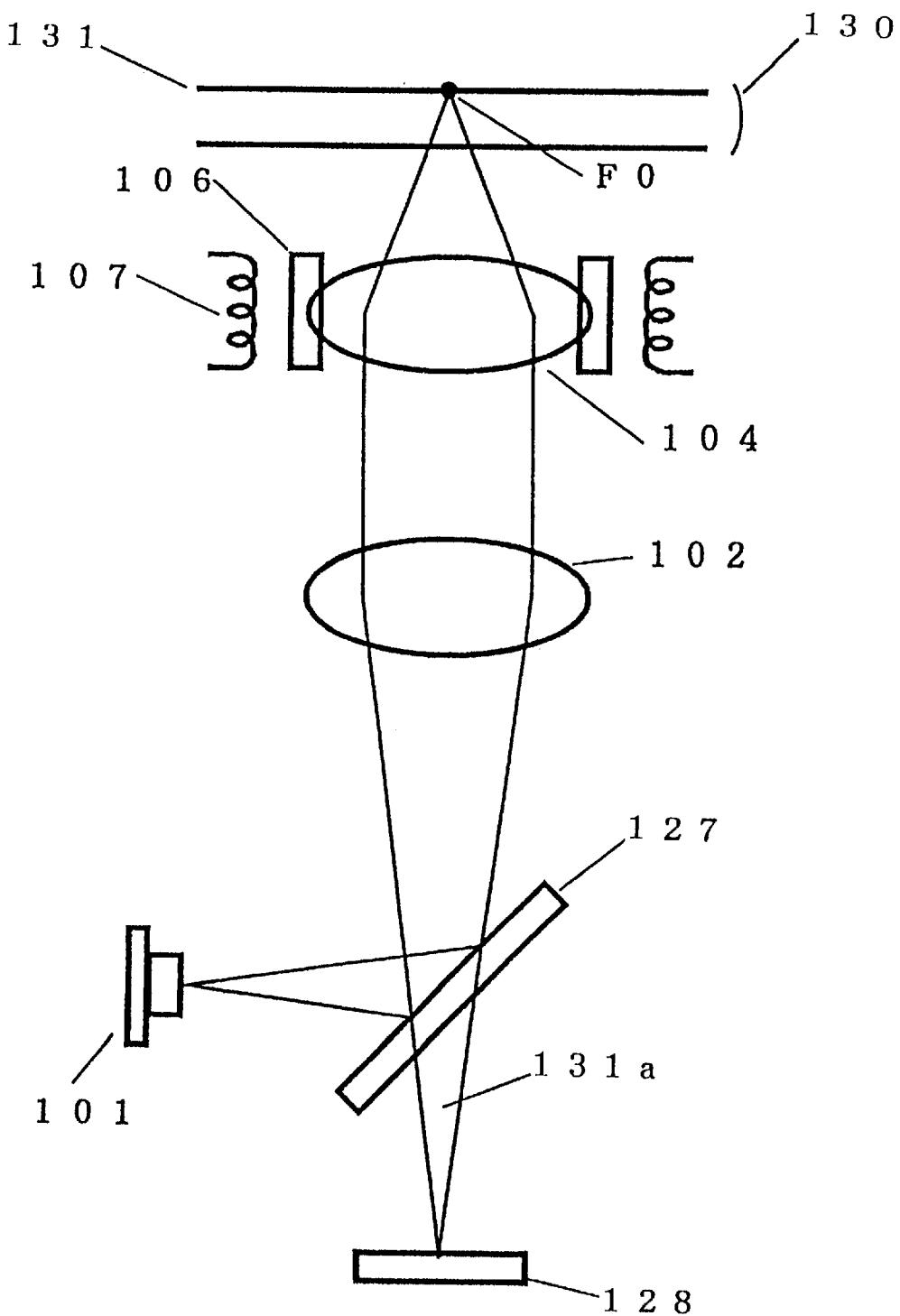
FIG. 23 is a diagram showing the essential parts of the optical system of an optical head apparatus according to a 10 embodiment of the present invention.

FIG. 23 shows a side view of the optical system according to the 10th embodiment. Light emitted from the semiconductor laser 101 as the light source is reflected by a plane parallel plate 127, and converted by the collimator lens 102 into a parallel beam of light. The parallel beam is converged by the objective lens 104, a converging optical system, onto the information layer 131 on the optical disk 130 as an information storage medium. The focal point of the beam converged by the objective lens 104 is denoted by F0. The actuator 107 moves the objective lens 104, together with its holding means 106, in such a manner as to follow disk movements associated with the surface warping and eccentricity of the optical disk 130.

The reflected beam 131a, produced by diffraction/reflection at the information layer 131, is again passed through the objective lens 104 and becomes a parallel beam of light. This parallel beam is converged by the collimator lens 102, and astigmatism is produced when the beam passes through the plane parallel plate 127. The reflected beam 131a with the thus produced astigmatism is converted by the photodetector 128 into an electrical signal.

Figure 24:
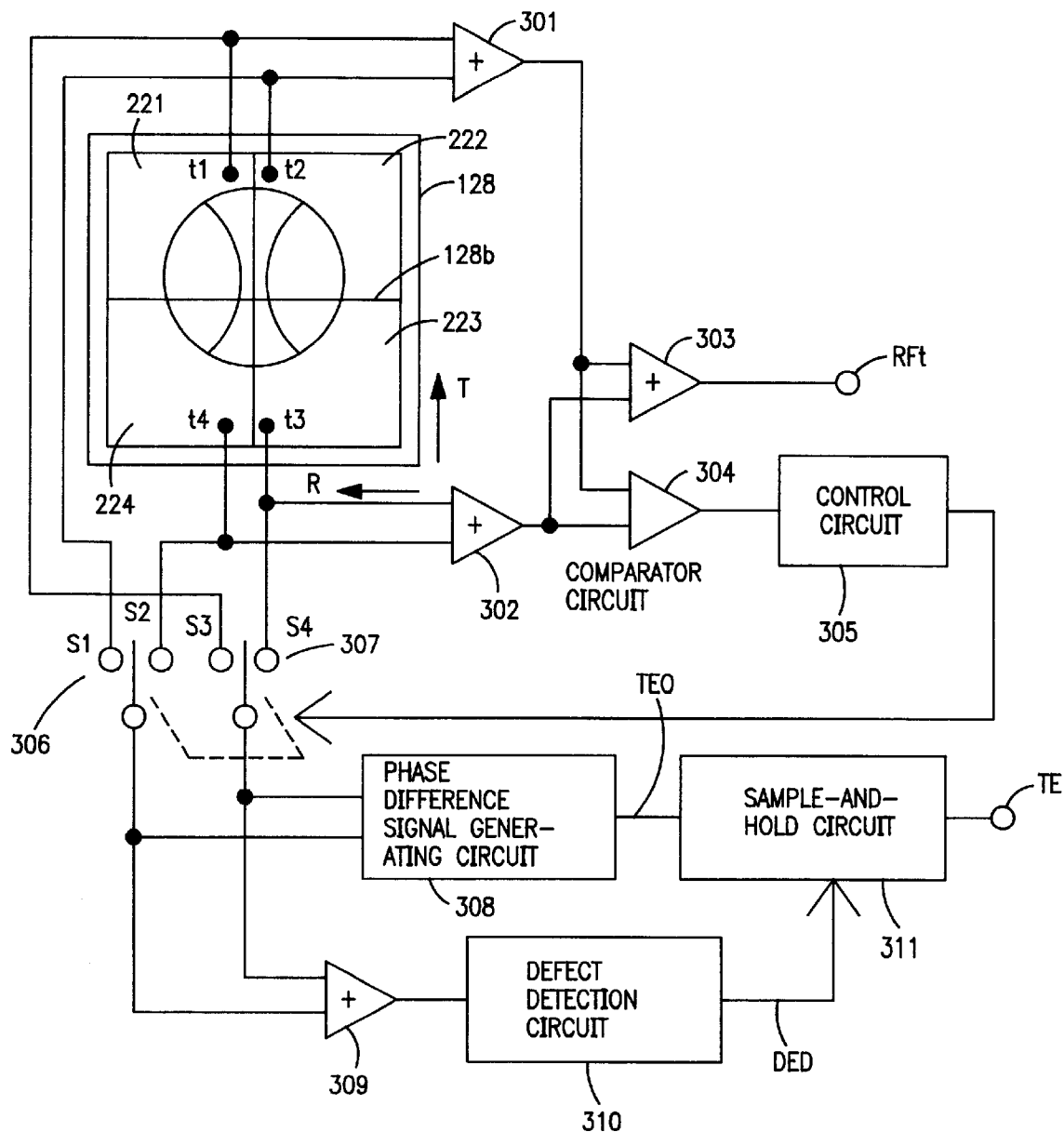
FIG. 24 is a diagram showing the circuit configuration of tracking error signal and defect detection circuits for the optical head apparatus according to the 10th embodiment of the present invention.

FIG. 24 shows a circuit configuration for obtaining the tracking error signal and a circuit configuration for defect detection. The photodetector 128 has detection regions 221 to 224. The photodetector 128 is arranged so that when the focal point F0 of the beam output from the objective lens is at the information layer 131 on the optical disk 130, the cross section of the reflected beam 131a from the information layer 131 becomes substantially circular when projected on the detection surface 128a of the photodetector 128.

When the distance between the objective lens 104 and the optical disk 130 changes, the cross section of the reflected beam 131a having astigmatism shrinks or expands diametrically on the detection surface 128a. The focus error signal can therefore be obtained by taking the difference between the sum signals of the diametrically opposed detection regions of the photodetector 128.

When the signals obtained according to the amounts of light received at the detection regions 221 to 224 of the photodetector are denoted by t1 to t4, respectively, the focus error signal FE is given by the equation $$FE = (t1 + t3) - (t2 + t4)$$

The adder 301 takes as inputs the signals t1 and t2 obtained according to the amounts of light received at the detection regions 221 and 222 of the photodetector 128, and outputs the signal representing their sum. The adder 302 takes as inputs the signals t3 and t4 obtained according to the amounts of light received at the detection regions 223 and 224, and outputs the signal representing their sum. The adder 303 takes as inputs the output signals of the adders 301 and 302 and outputs the signal representing their sum. This output signal is derived as the RF signal RFt.

The remainder of the circuit operation is the same as that described in the seventh embodiment, and will not be described in detail here, but briefly, the operation of the control circuit 305 and the switches 306 and 307 is such that the low frequency component of the sum signal of t1 and t2 is compared with that of the sum signal of t3 and t4 and the signals whose sum is smaller than the other sum are output from the switches 306 and 307.

Figure 35:
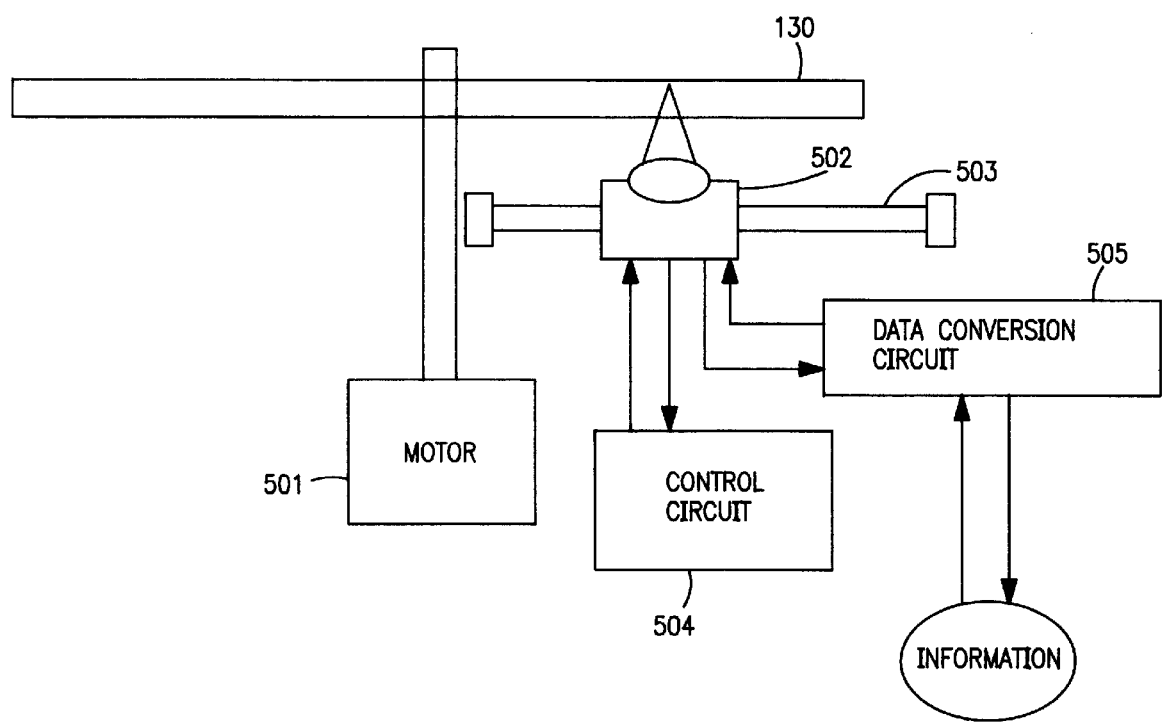
FIG. 35 is a diagram showing the construction of an optical disk drive according to the embodiments of the present invention and the prior art example.

The construction of the optical information processing apparatus is the same as that of the prior art example shown in FIG. 35 and, therefore, will not be described in detail here.

With this optical system also, when it is configured as shown in the 10th embodiment, stable tracking control can be achieved, since the amount of decrease in the amplitude of the tracking error signal can be reduced when the position of the reflected beam 131a, relative to the split line 128b on the photodetector 128 perpendicular to the tangential direction of the track, is displaced in the tangential direction.

In the 10th embodiment, the circuitry is shown that dynamically switches the signals by using switches, but the optical system of the 10th embodiment may be combined with the circuit of the eighth embodiment that uses jumper switches, in which case stable tracking control can be achieved with simple circuitry.

As described in the seventh to 10th embodiments, the effect of the present invention can be equally obtained whichever method, i.e., the method of splitting the beam using a beam splitting means such as a hologram or the method of splitting the beam on the photodetector, is used as the method for obtaining the tracking error signal by the phase difference method.

Embodiment 11

An optical head apparatus and an optical information processing apparatus according to an 11th embodiment will be described. In this embodiment, the wavefront converting means obtains a focus error signal from about one half of the beam and a tracking error signal by the phase difference method from the remaining half of the beam, and obtains a tracking error signal by a push-pull method from the entire beam. Elements that are functionally the same as those in the foregoing embodiments are designated by the same reference characters. Further, a holographic device 129 is used as the wavefront converting means.

Figure 25:
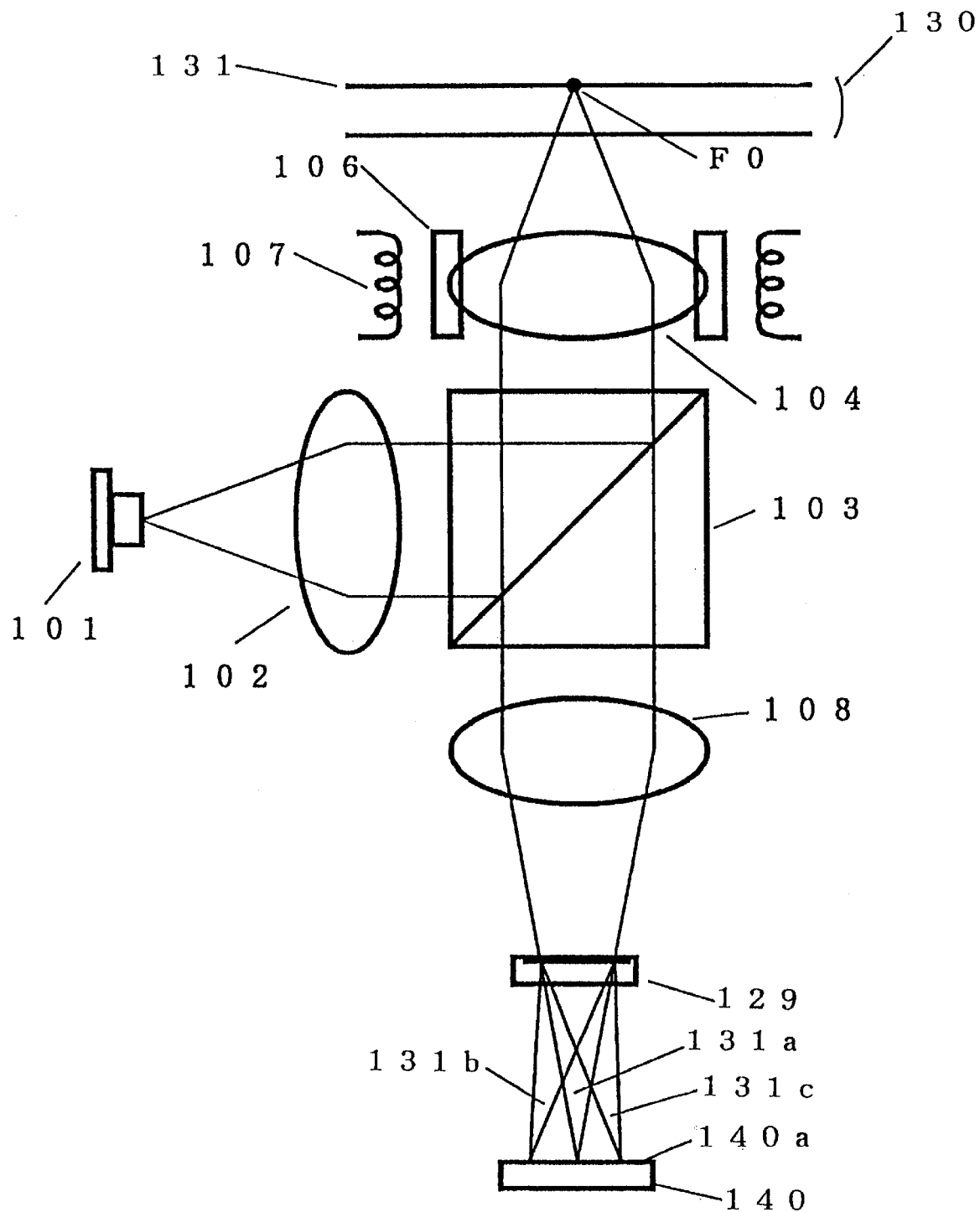
FIG. 25 is a diagram showing the essential parts of the optical system of an optical head apparatus according to an 11th embodiment of the present invention.

FIG. 25 shows a side view of the optical system according to the 11th embodiment. The basic operation is the same as that of the seventh embodiment shown in FIG. 15, and will not be described in detail here. The reflected beam 131a is diffracted by the holographic device 129, and the diffracted light is received by the photodetector 140.

Figure 26:
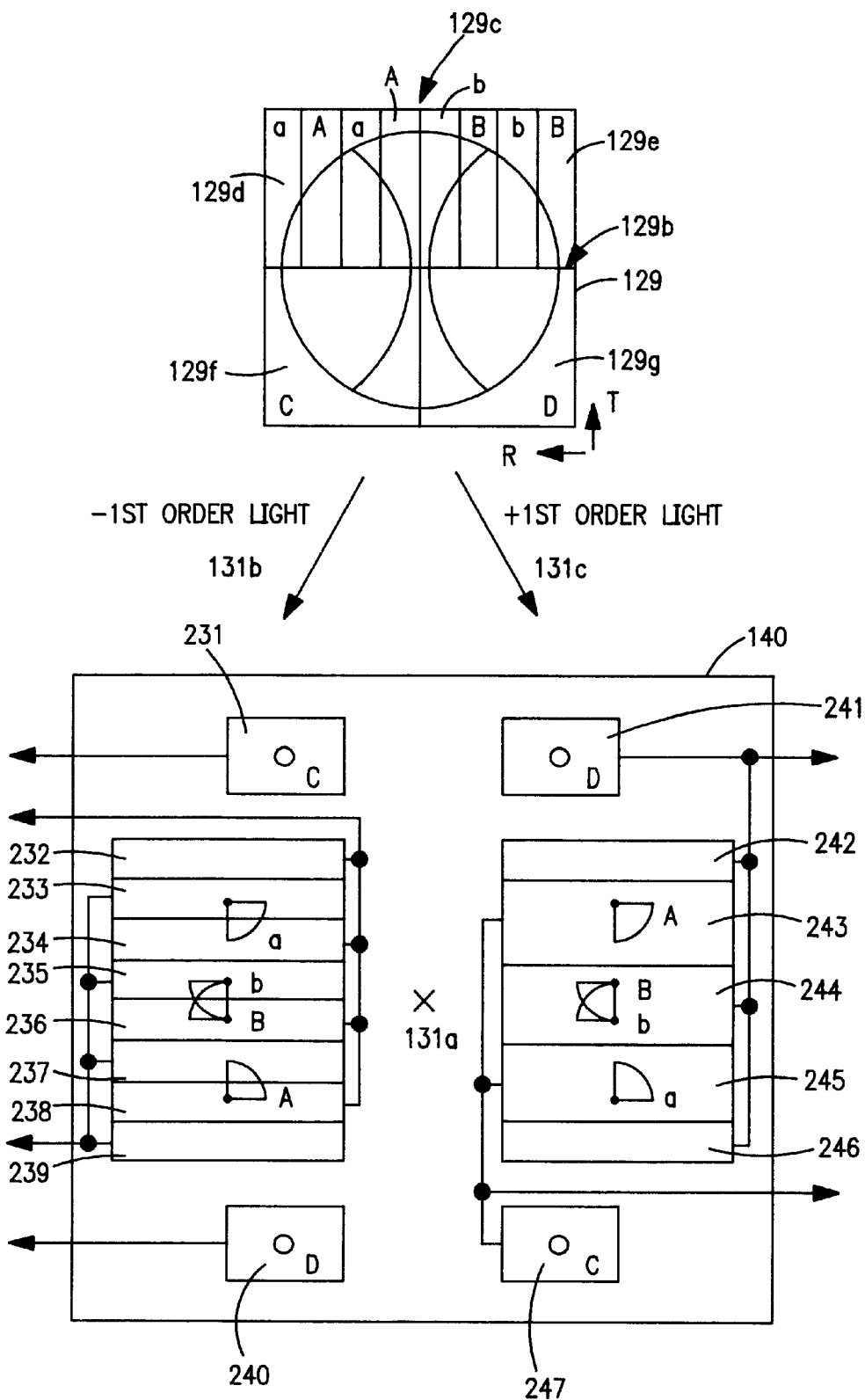
FIG. 26 is a schematic view showing the relationship between the zone splitting of the holographic device and the cross sections of diffracted rays of light on the photodetector in the optical head apparatus according to the 11th embodiment of the present invention.

FIG. 26 shows the zone splitting pattern of the holographic device 129 and the detection region pattern of the photodetector 140 according to the 11th embodiment. The holographic device 129 is split into four regions 129d to 129g by split lines 129b and 129c, the former substantially perpendicular to a tangent line to the track on the optical disk 130 and the latter substantially parallel to the tangent line. A holographic diffraction grating is formed in the regions 129d to 129g, and the reflected beam 131a falling on these regions generates diffracted rays of light 131b and 131c. The −1st order diffracted light 131b diffracted by the regions 129d and 129e is detected at detection regions 232 to 239 and used for the detection of the focus error signal. The −1st order diffracted light 131b diffracted by the regions 129f and 129g is detected at detection regions 231 and 240 and used for the detection of the phase-difference tracking error signal. On the other hand, the +1st diffracted light 131c is detected at detection regions 241 to 247 and used for the detection of the tracking error signal by the push-pull method.

Symbols attached to the respective zones correspond to the symbols attached to the cross sections of the diffracted rays on the photodetector 140 in FIG. 26. The −1st order diffracted light 131b generated from the zones with the uppercase characters A and B is brought to a focus rearwardly of the detection surface 140a of the photodetector 140, as viewed from the detection lens 108. On the other hand, the −1st order diffracted light 131b generated from the zones with the lowercase characters a and b is brought to a focus forwardly of the detection surface 110a of the photodetector 126, as viewed from the detection lens 108. The holographic device 109 is so designed that when the focal point F0 of the objective lens 104 is at the information surface 111 of the optical disk 105, the detection spot designated by each uppercase character on the photodetector 140 is equal in size to the detection spot designated by each lowercase character.

Signals obtained according to the amounts of light received at the detection regions 231 to 240 are denoted by f1 to f10, respectively. The focus error signal FE is then obtained by calculating the equation FE=(f2+f4+f6+f8)−(f3+f5+f7+f9)

The tracking error signal TE1 according to the phase difference method is obtained by comparing the temporal phase of the signal t1 with that of the signal t10.

The +1st order diffracted light 131c is detected at the detection regions 241 to 247. Signals obtained according to the amounts of light received at the detection regions 241 to 247 of the photodetector 140 are denoted by t1 to t7, respectively. The tracking error signal TE2 according to the push-pull method is then obtained by calculating the equation TE2=(t1+t2+t4+t6)−(t3+t5+t7)

The RF signal for reproducing information is given by RF1 or RF2 below or by RF1+RF2.

RF1=f1+f2+f3+f4+f5+f6+f7+f8+f9+f10

RF2=t1+t2+t3+t4+t5+t6+t7

The construction of the optical information processing apparatus is fundamentally the same as that of the prior art example shown in FIG. 35 and, therefore, will not be described in detail here.

Figure 27:
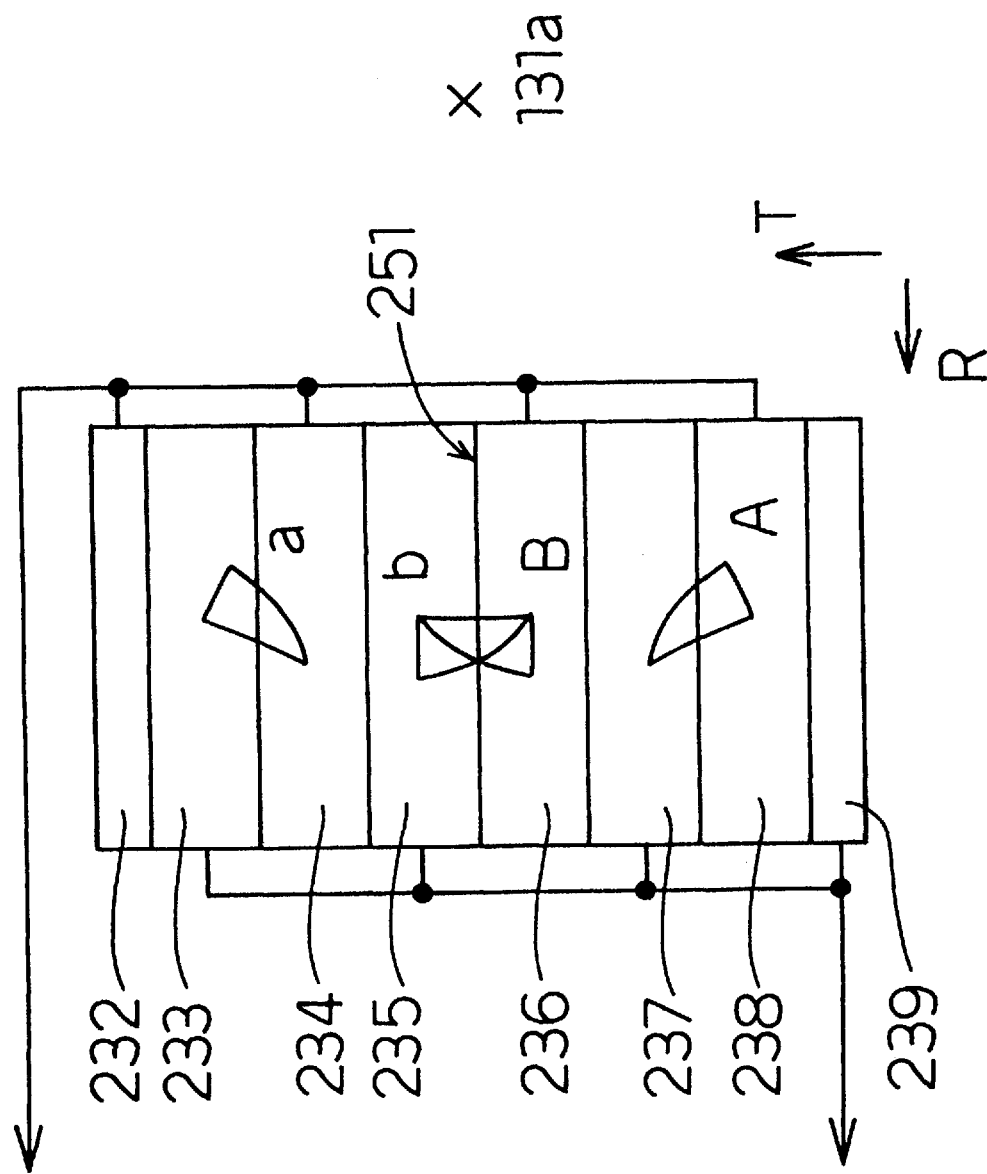
FIG. 27 is a diagram showing the relationship between the photodetector and the cross sections of diffracted rays of light on the photodetector in the optical head apparatus according to the prior art example.
Figure 28:
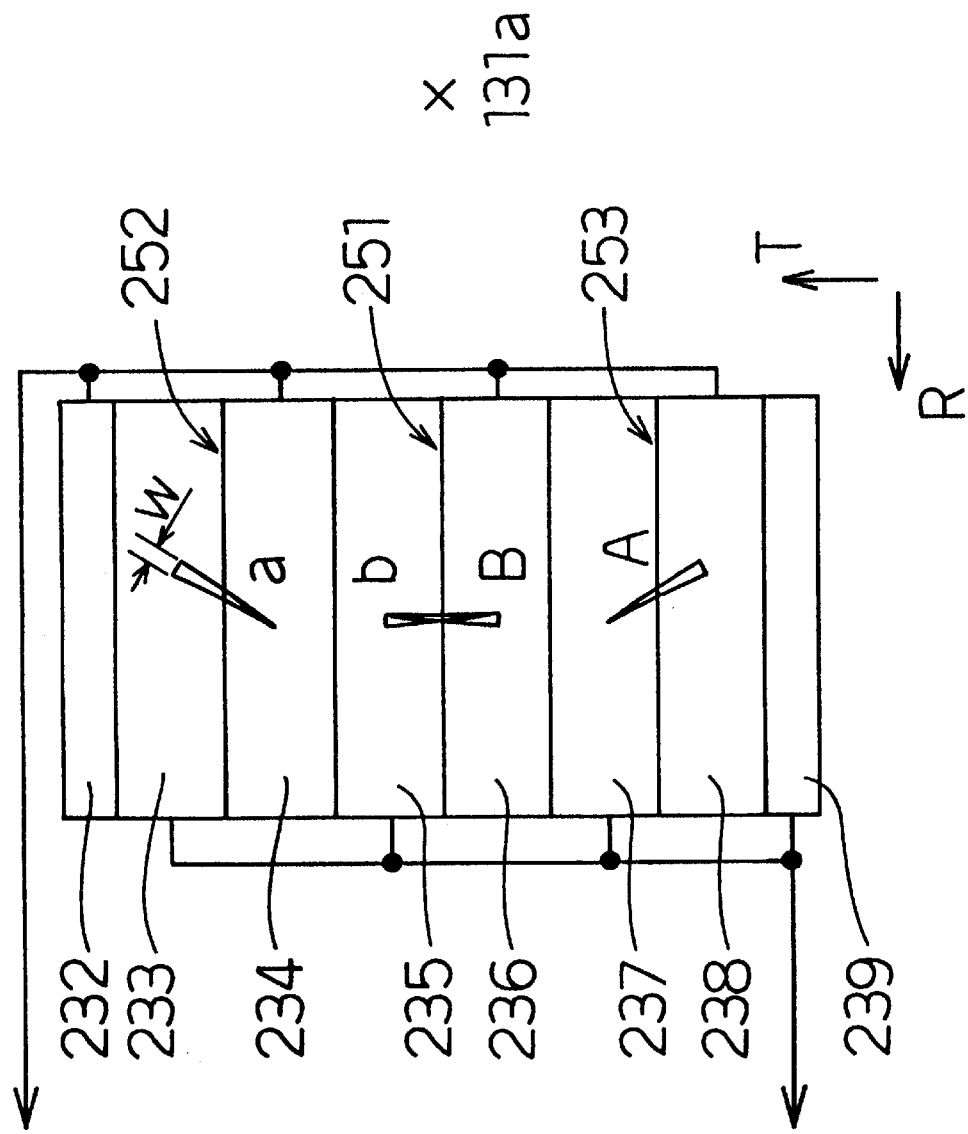
FIG. 28 is a diagram showing the relationship between the photodetector and the cross sections of diffracted rays of light on the photodetector in the optical head apparatus according to the 11th embodiment of the present invention.
Figure 29:
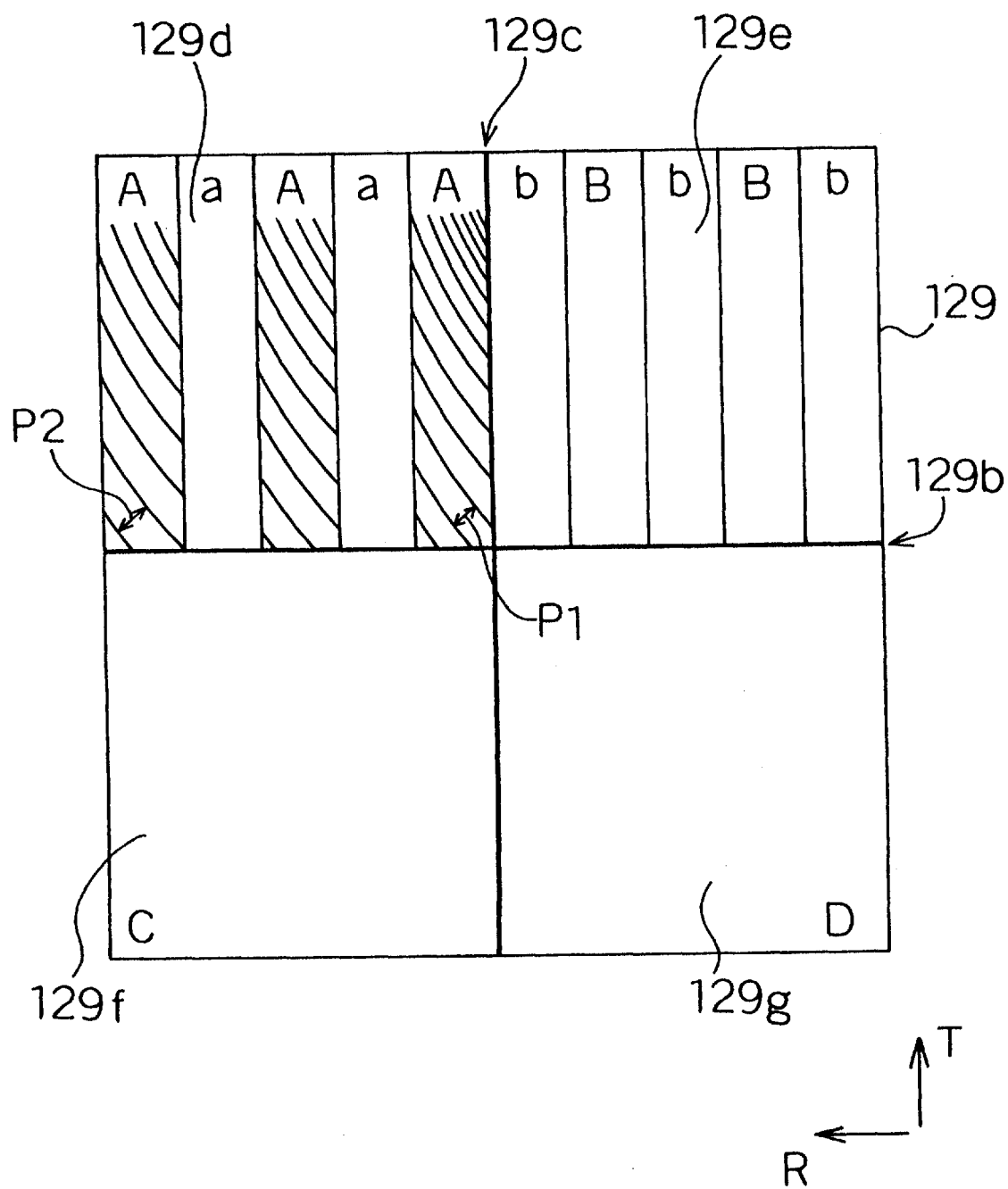
FIG. 29 is a schematic view showing in simplified form the zone splitting and grating spacing of the holographic device in the optical head apparatus according to the 11th embodiment of the present invention.

FIG. 27 shows the cross sections of the light beams projected on the detection regions 232 to 239 of the detection surface 140a according to the prior art. It is assumed that the converging point of the 0th order beam 131a not diffracted by the holographic device 129 is on the split line 251 between the detection regions 235 and 236. The beam thrown to a position located away from the split line 251 in the direction of T has a cross section rotated as shown in FIG. 27. In the 11th embodiment, the cross sections of the light beams projected on the detection surface 104a are converged in a direction perpendicular to the track, as shown in FIG. 28. The width w of each light beam, measured in the direction perpendicular to the track, is determined by the numerical aperture of the converging detection optics and the wavelength. In the 11th embodiment, to form the light beams with the cross sectional shapes shown in FIG. 28, the holographic elements, designated A, a, B, and b, of the holographic device 129 are designed so that, between the holographic elements with the same uppercase or lowercase alphabetical character, the grating interval of the diffraction grating at the same distance from the split line 129b is varied in the direction (R direction) substantially perpendicular to the track according to the distance from the split line 129c, as shown in FIG. 29. For example, in the region 129d of the holographic device 129, the grating interval at a given distance from the split line 129b, in the holographic element marked A located closest to the split line 129c, is denoted by p1, and the grating interval at the same distance from the split line 129b, in the holographic element marked A located farther away from the split line 129c, is denoted by p2. Since the holographic elements A focus the beam rearwardly of the detection surface, the width, in the direction of the track, of the cross section of the beam projected on the detection surface can be reduced by making p2 larger than p1. Further, within the same holographic element, the grating interval is progressively decreased as the distance from the split line 129b increases. Though not shown in detail in FIG. 29, the grating interval of the diffraction grating is varied in the same manner in the other zones a, B, and b.

By forming the beams with such a cross sectional shape, an offset does not occur in the focus even if the objective lens moves in the direction perpendicular to the track due to eccentricity, etc. of the optical disk causing a change in the beam's position relative to the split line. When p1 p2 in the prior art example, a 400 μm movement of the objective lens causes an offset of about 0.5 μm; on the other hand, with the beam is cross sectional shape shown in FIG. 28 in the 11th embodiment, if the objective lens moves 400 μm, the focus offset can be held within 0.1 μm.

Further, in the 11th embodiment, a and A and b and B are arranged symmetrically about the split line 251, as shown in FIG. 28. This arrangement is done at the time of designing the optical head apparatus. Here, the split line 251 is a straight line which is substantially perpendicular to the track and on which the converging point of the 0th order beam 131a not diffracted by the holographic device 129 is located. This arrangement serves to reduce the fluctuation caused in the focus error signal when the spot on the optical disk crosses the track, even if the distance between the beams varies in the direction of T due to a deviation of the light source wavelength or to a change in the distance between the holographic surface and the detection surface of the photodetector.

Figure 31:
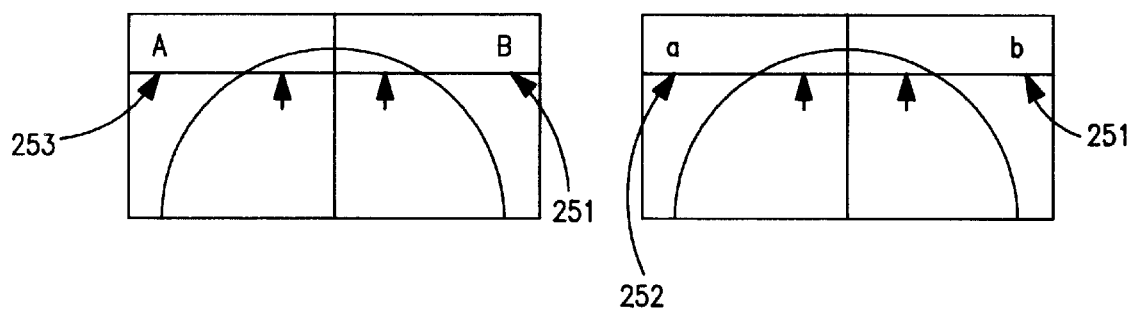
FIG. 31 is a diagram showing the positions of the split lines of the photodetector on the holographic device from the relationship between the split lines and the spot on the photodetector when there is a wavelength deviation, etc. in the optical head apparatus according to the 11th embodiment of the present invention.

FIG. 30 shows the positional relationship between the cross sections of the beams at the front and rear focal points and their associated split lines 251 to 253 when there is no deviation. The actual positions of the split lines 251 to 253 are as shown in FIG. 28. FIG. 30 is a diagram showing the split lines that are projected on the holographic surface 129a while maintaining the relationship between each beam and its associated split lines. As the wavelength increases, or as the distance between the holographic surface and the detection surface of the photodetector increases, the distance between the beams on the detection surface increases. At this time, the split lines 251, 252, and 253 move farther away from the base of the semicircle, as shown in FIG. 31. The amount and the direction of the movement are the same between the front focal point and the rear focal point. In this way, the balance between the front focal point and the rear focal point is maintained, so that no offset is caused in the focus. The fluctuation caused in the focus error signal when the spot on the optical disk crosses the track is also reduced.

It is assumed that the wavelength of the light source is 650 nm, the pitch of the holographic device is 2 μm, and the distance from the holographic surface to the detection surface is 1.6 mm. As a prior art example, when the arrangement is not symmetric about the split line 251, the fluctuation caused in the focus error signal by a wavelength deviation of 20 nm is about 9% of the amplitude of the focus S curve. On the other hand, with the arrangement shown in FIG. 28 in the 11th embodiment, for a wavelength deviation of 20 nm the fluctuation can be held within 1% of the amplitude of the focus S curve.

In this way, since the variation of the focus error signal is reduced for a wavelength deviation as well as for a height displacement, stable focus control is achieved, and the optical information processing apparatus of the present embodiment is capable of reproducing information at low error rates.

In the detailed description given above, the term recording/reproduction means recording and/or reproduction, and the effect of the present invention is not limited for the case of recording only or for the case of reproduction only.

What is claimed is:

1. An optical head apparatus comprising:
   a light source for emitting light;
   a front-end converging optical system for converging the light emitted from said light source onto a multi-layer information storage medium;
   a back-end converging optical system for reconverging the light reflected from a layer on said multi-layer information storage medium;
   wavefront converting means for accepting said reconverged light, and for forming a wavefront to enable detection of a focus error signal and a tracking error signal; and
   a photodetector for receiving the light from said wavefront converting means, and for outputting a signal proportional to the amount of said received light,
   wherein h is greater than two times the product of tmax and β, where tmax is an optical distance between two information layers located farthest apart on said multi-layer information storage medium, β is a longitudinal magnification of optics leading from said multi-layer information storage medium to said photodetector, K is a point to which the light reflected from a desired information layer on said multi-layer information storage medium is reconverged by said back-end converging optical system when said light emitted from said light source is focused on said desired information layer by said front-end converging optical system, and h is an optical distance between said wavefront converting means and said point K.

2. An optical head apparatus according to claim 1, wherein said wavefront converting means is a holographic device.

3. An optical head apparatus according to claim 1, wherein said wavefront converting means is a stepped prism.

4. An optical head apparatus comprising
   a light source for emitting light;
   a front-end converging optical system for converging the light emitted from said light source onto a multi-layer information storage medium;
   a back-end converging optical system for reconverging the light reflected from a layer on said multi-layer information storage medium;
   wavefront converting means for accepting said reconverged light, and for forming a wavefront to enable detection of a focus error signal and a tracking error signal; and
   a photodetector for receiving the light from said wavefront converting means, and for outputting a signal proportional to the amount of said received light,
   wherein h is smaller than two times the product of tmin and β, where tmin is a minimum value of an optical distance between two adjacent information layers on said multi-layer information storage medium, β is a longitudinal magnification of optics leading from said multi-layer information storage medium to said photodetector, K is a point to which the light reflected from a desired information layer on said multi-layer information storage medium is reconverged by said back-end converging optical system when said light emitted from said light source is focused on said desired information layer by said front-end converging optical system, and h is an optical distance between said wavefront converting means and said point K.

5. An optical head apparatus according to claim 4, wherein said distance h is 2.1 mm or smaller.

6. An optical head apparatus comprising
   a light source for emitting light;
   a front-end converging optical system for converging the light emitted from said light source onto a multi-layer information storage medium;
   a back-end converging optical system for reconverging the light reflected from a layer on said multi-layer information storage medium;
   wavefront converting means for accepting said reconverged light, and for forming a wavefront to enable detection of a focus error signal and a tracking error signal; and
   a photodetector for receiving the light from said wavefront converting means, and for outputting a signal proportional to the amount of said received light,
   wherein magnification converting means for accepting the light reflected from said multi-layer information storage medium, and for varying magnification in a particular direction, is provided in an optical path leading from said light source to said wavefront converting means, and wherein h is greater than two times the product of tmax and β1, where tmax is an optical distance between two information layers located farthest apart on said multi-layer information storage medium, β1 is a largest longitudinal magnification of optics leading from said multi-layer information storage medium to said photodetector, said longitudinal magnification varying according to the direction thereof, K is a point to which the light reflected from a desired information layer on said multi-layer information storage medium is reconverged by said back-end converging optical system when said light emitted from said light source is focused on said desired information layer by said front-end converging optical system, and h is an optical distance between said wavefront converting means and said point K.

7. An optical head apparatus according to claim 1 or 6, wherein said distance h is 4.3 mm or greater.

8. An optical head apparatus comprising
   a light source for emitting light;
   front-end converging optical system for converging the light emitted from said light source onto a multi-layer information storage medium;
   a back-end converging optical system for reconverging the light reflected from a layer on said multi-layer information storage medium;
   wavefront converting means for accepting said reconverged light, and for forming a wavefront to enable detection of a focus error signal and a tracking error signal; and
   a photodetector for receiving the light from said wavefront converting means, and for outputting a signal proportional to the amount of said received light;
   wherein a split line on said wavefront converting means is arranged at an angle with respect to a straight line parallel to an X-axis direction which is a direction perpendicular to a direction in which the longitudinal magnification of said back-end converging optical system is largest.

9. An optical head apparatus according to claim 8, wherein said split line is arranged in a rectangular wave-like shape.

10. An optical head apparatus according to claim 8, wherein said split line makes an angle of 5 degrees or greater relative to said X-axis direction.

11. An optical head apparatus according to any one of claims 8 to 10, wherein magnification converting means for accepting the light reflected from said multi-layer information storage medium, and for varying magnification in a particular direction, is provided in an optical path leading from said light source to said wavefront converting means.

12. An optical head apparatus comprising
   a light source for emitting light;
   a front-end converging optical system for converging the light emitted from said light source onto a multi-layer information storage medium;
   a back-end converging optical system for reconverging the light reflected from a layer on said multi-layer information storage medium;
   wavefront converting means for accepting said reconverged light, and for forming a wavefront to enable detection of a focus error signal and a tracking error signal; and
   a photodetector for receiving the light from said wavefront converting means, and for outputting a signal proportional to the amount of said received light;
   wherein said wavefront converting means is constructed from a holographic device, and wherein when said light emitted from said light source is focused by said front-end converging optical system onto a desired information layer on said multi-layer information storage medium, the size of a light beam reflected from an information layer other than said desired information layer, and projected on said holographic device by being reconverged by said back-end converging optical system, is larger than the grating interval of said holographic device.

13. An optical information processing apparatus comprising a control circuit for performing tracking and/or focus control by receiving a signal from an optical head apparatus as described in claim 1.

14. An optical head apparatus comprising:
   a light source for emitting light;
   a converging optical system for converging the light emitted from said light source onto an information storage medium having a track;
   beam splitting means for splitting the light reflected from said information storage medium;
   a photodetector for receiving the light reflected from said information storage medium, and for outputting four signals proportional to the amount of said received light, said photodetector having a first split line substantially perpendicular to said track and a second split line substantially parallel to said track, and also having first, second, third, and fourth regions split by said first and second split lines;
   comparing means for comparing some of the signals output from said photodetector with the other signals output therefrom;
   selecting means for selecting two signals from among said four signals output from said photodetector, based on the result of the comparison in said comparing means; and
   tracking error signal outputting means for outputting a tracking error signal by using the signals selected by said selecting means, and where in:
      said comparing means compares the magnitude of the sum of the signals from said first and second regions with the magnitude of the sum of the signals from said third and forth regions, where said first and second regions are contained in one of two areas split by said first split line and said third and fourth regions are contained in the other of said two areas;
      said selecting means selects the two signals from the two regions the sum of which is smaller in magnitude than the other sum when compared in said comparing means; and
      said tracking error signal outputting means compares temporal phases of said two signals selected by said selecting means, and outputs said tracking error signal.

15. An optical head apparatus comprising:
   light source for emitting light;
   a converging optical system for converging the light emitted from said light source onto an information storage medium having a track;
   beam splitting means for splitting the light reflected from said information storage medium;
   a photodetector for receiving the light reflected from said information storage medium, and for outputting four signals proportional to the amount of said received light, said photodetector having a first split line substantially perpendicular to said track and a second split line substantially parallel to said track, and also having first, second, third, and fourth regions split by said first and second split lines;
   selecting means for selecting two signals from among said four signals output from said photodetector; and tracking error signal outputting means for outputting a tracking error signal by using the signals selected by said selecting means, and wherein:

when the magnitude of the sum of the signals from said first and second regions is compared with the magnitude of the sum of the signals from said third and forth regions, where said first and second regions are contained in one of two areas split by said first split line and said third and fourth regions are contained in the other of said two areas, said selecting means selects the two signals from the two regions the sum of which is smaller in magnitude than the other sum; and said tracking error signal outputting means compares temporal phases of said two signals selected by said selecting means, and outputs said tracking error signal.

16. An optical head apparatus according to claim 14 or 15, further comprising defect detection signal outputting means for outputting a defect detection signal when the sum of said two signals selected by said selecting means becomes smaller than a predetermined value.

17. An optical head apparatus according to claim 16, further comprising tracking control holding means for holding tracking control in response to said defect detection signal.

18. An optical head apparatus according to claim 14 or 15, further comprising defect detection signal outputting means for outputting a defect detection signal when the value of a signal component contained in the sum of said two signals selected by said selecting means, and lower in frequency than the frequency band of a signal recorded on said information storage medium, drops below a predetermined value.

19. An optical head apparatus according to claim 18, further comprising focus control holding means for holding focus control in response to said defect detection signal.

20. An optical head apparatus comprising:
   a light source for emitting light;
   a converging optical system for converging the light emitted from said light source onto an information storage medium having a track;
   beam splitting means for splitting the light reflected from said information storage medium;
   a photodetector for receiving the light split by said beam splitting means, and for outputting a signal proportional to the amount of said received light; and
   tracking error signal outputting means for outputting a tracking error signal by using said signal output from said photodetector, and wherein:
      said beam splitting means has a first split line substantially to said track, one of two areas split by said split line on said beam splitting orthogonal to said track and a second split line substantially parallel to said track, wherein said light is split by said first split line into two beams A and B, said beam A being further split by said second split line into two beams A1 and A2, said first split line being disposed so that a principal ray passing through the center of said converging optical system is contained in said beam B;
      said photodetector has two light receiving regions for receiving said beam A1 and said beam A2, respectively; and
      said tracking error signal is obtained by comparing time phases of the signals obtained from said two light receiving regions.

21. An optical head apparatus according to claim 20 wherein said beam splitting means is a holographic device.

22. An optical head apparatus according to claim 20 wherein said beam splitting means is a stepped prism.

23. An optical head apparatus according to claim 20, further comprising defect detection signal outputting means for outputting a defect detection signal when the sum of the two signals output from said first and second regions becomes smaller than a predetermined value.

24. An optical head apparatus according to claim 23, further comprising tracking control holding means for holding tracking control in response to said defect detection signal.

25. An optical head apparatus according to claim 20, further comprising defect detection signal outputting means for outputting a defect detection signal when the value of a signal component contained in the sum of the two signals output from said first and second regions, and lower in frequency than the frequency band of a signal recorded on said information storage medium, drops below a predetermined value.

26. An optical head apparatus according to claim 25, further comprising focus control holding means for holding focus control in response to said defect detection signal.

27. An optical information processing apparatus comprising a control circuit for performing tracking and/or focus control by receiving a signal from an optical head apparatus as described in claims 20.

28. An optical head apparatus comprising:
   a light source for emitting light;
   a converging optical system for converging the light emitted from said light source onto an information storage medium having a track;
   wavefront converting means for accepting the light reflected from said information storage medium, and for forming a wavefront to enable detection of a focus error signal and a tracking error signal; and
   a photodetector for receiving the light from said wavefront converting means, and for outputting a signal proportional to the amount of said received light;
   wherein said wavefront converting means converts a light beam used for detection of said focus error signal so that the cross sectional shape of said light beam, when projected on a light detection surface of said photodetector, is converged in a direction substantially perpendicular to the direction of said track, and
   wherein said wavefront converting means is a holographic device having a plurality of holographic elements, and a grating interval in each holographic element is progressively varied according to a distance from a designated location within the holographic element.

29. An optical head apparatus comprising:
   a light source for emitting light;
   a converging optical system for converging the light emitted from said light source onto an information storage medium having a track;
   wavefront converting means for accepting the light reflected from said information storage medium, and for forming a wavefront to enable detection of a focus error signal and a tracking error signal; and
   a photodetector for receiving the light from said wavefront converting means, and for outputting a signal proportional to the amount of said receiving light;
   wherein said wavefront converting means converts a light beam used for detection of said focus error signal so that the cross sectional shape of said light beam, when projected on a light detection surface of said photodetector, is converged in a direction substantially perpendicular to the direction of said track, and wherein said wavefront converting means is a holographic device having a plurality of holographic elements, and wherein between corresponding holographic elements, the grating interval in one holographic element, at a given position, is different from the grating interval in an other holographic element, at a corresponding position in the direction of said track.

30. An optical head apparatus according to claim 29, wherein within said one holographic device, said grating interval is progressively varied in a direction substantially perpendicular to said track.

31. An optical head apparatus comprising:

a light source for emitting light;

a converging optical system for converging the light emitted from said light source onto an information storage medium having a track;

wavefront converting means for accepting the light reflected from said information storage medium, and for forming an wavefront to enable detection of a focus error signal and/or a tracking error signal; and a photodetector for receiving the light from said wavefront converting means, and for outputting a signal proportional to the amount of said received light, and wherein:

said wavefront converting means has a first region and a second region adjacent to each other, said first region generating a first wavefront converging forwardly of said photodetector and said second region generating a second wavefront converging rearwardly of said photodetector; and two light beams generated by said first and second regions, when projected on a light detection surface of said photodetector, have cross sectional shapes one symmetric to the other with respect to a straight line containing thereon the converging point of a 0th order beam and substantially perpendicular to said track.

32. An optical head apparatus according to claim 31, wherein said focus error signal is obtained from said first and second regions belonging to one area on said wavefront converting means split by a split line substantially perpendicular to a tangential direction of said track.

* * * * *

UNITED STATES PATENT AND TRADE MARK OFFICE
CERTIFICATE OF CORRECTION

PATENT NO. : 6,091,690
DATED : July 18, 2000
INVENTOR(S) : Sano et al.

It is certified that error appears in the above-identified patent and that said Letters Patent is hereby corrected as shown below:

Column 31, line 13, before "front-end" insert --a--.

Column 32, line 8, delete "1" and insert --12--.

Column 32, line 34, delete "where in" and insert --wherein--.

Column 32, line 51, before the first occurrence of "light" insert --a--.

Column 33, lines 54-55, before "substantially" insert --orthogonal to said track and a second split line--.

Signed and Sealed this

First Day of May, 2001

Attest:

NICHOLAS P. GODICI

*Attesting Officer*     *Acting Director of the United States Patent and Trademark Office*